(12) United States Patent
Ku et al.

(10) Patent No.: US 11,003,325 B2
(45) Date of Patent: May 11, 2021

(54) MOBILE TERMINAL AND METHOD FOR CONTROLLING THE SAME

(71) Applicant: LG ELECTRONICS INC., Seoul (KR)

(72) Inventors: Hyerim Ku, Seoul (KR); Namki Kim, Seoul (KR); Kyungjin Moon, Seoul (KR); Kyunghye Seo, Seoul (KR); Yoonseok Yang, Seoul (KR); Jungmin Park, Seoul (KR); Jaehwa Lee, Seoul (KR); Eunhye Kim, Seoul (KR); Cheongha Park, Seoul (KR); Taehoon Cho, Seoul (KR); Mose Jueng, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 163 days.

(21) Appl. No.: 15/723,452

(22) Filed: Oct. 3, 2017

(65) Prior Publication Data
US 2018/0164963 A1   Jun. 14, 2018

(30) Foreign Application Priority Data

Dec. 8, 2016   (KR) .................. 10-2016-0166865
Dec. 30, 2016  (KR) .................. 10-2016-0184415

(51) Int. Cl.
*G06F 3/0483*  (2013.01)
*G06F 3/0488*  (2013.01)
(Continued)

(52) U.S. Cl.
CPC .......... *G06F 3/0483* (2013.01); *G06F 1/1626* (2013.01); *G06F 3/041* (2013.01);
(Continued)

(58) Field of Classification Search
CPC .. G06F 3/0483; G06F 3/0482; G06F 3/04883; G06F 1/1626; G06F 3/04886;
(Continued)

(56) References Cited

U.S. PATENT DOCUMENTS 8,386,955 B1 * 2/2013 Weber ................. G06F 3/04817
                                                        715/781
8,761,513 B1 * 6/2014 Rogowski .............. G09G 5/246
                                                        382/181
(Continued)

FOREIGN PATENT DOCUMENTS

EP   2 341 412 A1   7/2011
EP   2 557 492 A1   2/2013
(Continued)

OTHER PUBLICATIONS

The Verge: "Google Now on Tap is a killer new feature of Android M", You Tube, Oct. 5, 2015. p. 1, XP054977654, Retrieved from the Internet: URL:https://www.youtube.com/watch?v=N65930cEtds.

*Primary Examiner* — Jose R Soto Lopez
(74) *Attorney, Agent, or Firm* — Birch, Stewart, Kolasch & Birch, LLP

(57) ABSTRACT

Disclosed are a mobile terminal and a method for controlling the same. The mobile terminal includes a touch screen configured to display a first page; and a controller configured to generate a panel region having a predetermined transparency on a preset region of the touch screen, if a preset touch gesture is applied to the touch screen while the first page is being displayed, and configured to display, on the panel region, at least one first function icon corresponding to information displayed on the first page. If the first page is converted into a second page, the at least one first function icon displayed on the panel region is changed to at least one second function icon corresponding to information displayed on the second page.

10 Claims, 56 Drawing Sheets

(51) Int. Cl.
*G06F 3/0484* (2013.01)
*G06F 3/041* (2006.01)
*G06F 3/0481* (2013.01)
*G06F 3/0482* (2013.01)
*G06F 1/16* (2006.01)

(52) U.S. Cl.
CPC ........ *G06F 3/0482* (2013.01); *G06F 3/04812* (2013.01); *G06F 3/04842* (2013.01); *G06F 3/04883* (2013.01); *G06F 3/04886* (2013.01); *G06F 2203/04803* (2013.01); *G06F 2203/04804* (2013.01)

(58) Field of Classification Search
CPC .. G06F 3/04842; G06F 3/041; G06F 3/04812; G06F 2203/04804; G06F 2203/04803; G06F 3/04817; G06F 3/04845; G06F 3/0488
See application file for complete search history.

(56) References Cited

U.S. PATENT DOCUMENTS

| | | | |
|---|---|---|---|
| 2007/0198947 A1* | 8/2007 | Cox | G06F 3/0483 715/786 |
| 2009/0249247 A1* | 10/2009 | Tseng | G06F 3/0481 715/808 |
| 2010/0271312 A1* | 10/2010 | Alameh | G06F 3/0421 345/173 |
| 2011/0004327 A1* | 1/2011 | Bonnat | G06F 3/0346 700/83 |
| 2011/0246943 A1* | 10/2011 | Fujibayashi | G06F 3/0488 715/833 |
| 2012/0192095 A1 | 7/2012 | Bamford et al. | |
| 2012/0236037 A1* | 9/2012 | Lessing | G06F 3/0488 345/661 |
| 2014/0019895 A1* | 1/2014 | Honda | G06F 3/0488 715/765 |
| 2014/0115455 A1 | 4/2014 | Kim | |
| 2014/0160073 A1 | 6/2014 | Matsuki | |
| 2014/0237402 A1 | 8/2014 | Pang et al. | |
| 2014/0282208 A1* | 9/2014 | Chaudhri | G06F 3/04817 715/779 |
| 2014/0351748 A1* | 11/2014 | Xia | G06F 3/0481 715/798 |
| 2014/0359522 A1* | 12/2014 | Kim | G06F 3/04817 715/781 |
| 2015/0067513 A1* | 3/2015 | Zambetti | G06F 3/0488 715/716 |
| 2015/0378592 A1* | 12/2015 | Kim | G06F 3/0482 715/765 |
| 2016/0026272 A1* | 1/2016 | Park | G06F 3/03545 345/173 |
| 2016/0313966 A1* | 10/2016 | Jeong | G06F 1/1626 |
| 2017/0205990 A1* | 7/2017 | Ma | G06F 3/04817 |

FOREIGN PATENT DOCUMENTS

| | | |
|---|---|---|
| EP | 2 806 339 A1 | 11/2014 |
| EP | 2 985 889 A1 | 2/2016 |

\* cited by examiner

MOBILE TERMINAL AND METHOD FOR CONTROLLING THE SAME

CROSS-REFERENCE TO RELATED APPLICATION

Pursuant to 35 U.S.C. § 119(a), this application claims the benefit of an earlier filing date of and the right of priority to Korean Application No. 10-2016-0166865 filed on Dec. 8, 2016, and No. 10-2016-0184415 filed on Dec. 30, 2016, the contents of which are incorporated by reference herein in its entirety.

BACKGROUND OF THE INVENTION

1. Field of the Invention

This specification relates to a mobile terminal including a bezel-less type touch screen or a touch screen having a thin bezel portion, and a method for controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions may include data and voice communications, capturing images and video through a camera, recording audio, playing music files through a speaker system, and displaying images and video on a display unit. Some mobile terminals additionally provide functions such as playing an electronic game, or executing a function of multimedia players. Especially, recent mobile terminals may receive multicast signal for providing visual content such as broadcasts, videos, or television programs.

As it becomes multifunctional, a mobile terminal can be allowed to capture still images or moving images, play music or video files, play games, receive broadcast and the like, so as to be implemented as an integrated multimedia player.

Nowadays, a mobile terminal having a structure of a bezel-less type display unit where no hard keys are provided on a front surface of the mobile terminal, is being presented in order to enhance design of the mobile terminal, and in order to provide a larger screen. In this case, a user frequently has an inconvenience in performing a touch input to control information output to an upper end or a lower end of the display unit. Especially, in case of controlling information output to an upper side and a lower side of the display unit with one hand, or in case of controlling the information by alternately touching the upper side and the lower side with two hands, a sense of grip may be lowered, and the operation is very unstable and inconvenient. Further, there is an inconvenience in selectively interacting with a part of the displayed information. Also, a malfunction may occur as the information output to the display unit is erroneously selected, or the mobile terminal may drop on the floor.

SUMMARY OF THE INVENTION

Therefore, an aspect of the detailed description is to provide a mobile terminal capable of providing a UI and a UX which can allow a user to control information output to a bezel-less type display unit or a display unit having a thin bezel portion, with one hand, and a method for controlling the same.

Another aspect of the detailed description is to provide a mobile terminal capable of providing content-related information output to a bezel-less type display unit or a display unit having a thin bezel portion, to a supplementary region having a short fingering distance, and capable of performing a multi-tasking through an interaction with the supplementary region, and a method for controlling the same.

Another aspect of the detailed description is to provide a mobile terminal capable of providing various UXs of a panel region which can perform a multi-interaction with a partial region or an entire region of a screen being currently executed, and a method for controlling the same.

To achieve these and other advantages and in accordance with the purpose of this specification, as embodied and broadly described herein, there is provided a mobile terminal, including: a touch screen configured to display a first page; and a controller configured to generate a panel region having a predetermined transparency on a preset region of the touch screen, if a preset touch gesture is applied to the touch screen while the first page is being displayed, and configured to display, on the panel region, a first function icon corresponding to information displayed on the first page, wherein if the first page is converted into a second page, the controller changes the first function icon displayed on the panel region, into a second function icon corresponding to information displayed on the second page.

In an embodiment, the controller may convert the first page into the second page, in response a drag touch input applied to the panel region in one direction while the first page is being displayed.

In an embodiment, if the preset touch gesture is applied while the first and second pages are being displayed on a plurality of tabs, the controller may recognize a tab of a currently displayed page, and may provide quick icons of a plurality of menus included in the recognized tab to the panel region.

In an embodiment, if a scroll signal is received on the panel region while one of the first and second pages is being displayed, the displayed page and the function icon provided to the panel region may be simultaneously scrolled.

In an embodiment, if one of the first and second function icons is selected while the panel region is being displayed, the controller may maintain the panel region, and may apply an execution result of a menu corresponding to the selected function icon to one of the first and second pages.

In an embodiment, the controller may control an entered degree into a detailed item related to the selected function icon, based on a touch degree of a touch input applied to the selected function icon, and may display an indicator indicating the detailed item on at least one of the panel region and the first and second pages.

In an embodiment, while a plurality of application icons are being displayed on the first page, application icons having unchecked events among the plurality of application icons displayed on the first page may be provided to the panel region in a collected manner.

In an embodiment, if an icon of a specific application is selected from the panel region, information related to unchecked events of the application may be provided to the panel region. And if the information provided to the panel region disappears, a graphic change indicating a checked state of the unchecked events may be applied to the application icons displayed on the panel region and the first page.

In an embodiment, if a touch input applied to the first function icon is dragged into the first page out of the panel region, an image having its size changed gradually may be generated on the panel region, and an execution screen corresponding to the first function icon may be displayed within the image.

In an embodiment, if the execution screen is displayed on an entire region of the touch screen, the controller may control the panel region to disappear.

In an embodiment, if the preset touch gesture is applied while the first page is being displayed, the controller may display, on the panel region, first search information obtained by searching information included in the first page according to a first reference. If a touch input in one direction is applied to the panel region while the first search information is being displayed, the controller may convert the first search information into second search information obtained by searching the information included in the first page according to a second reference. And while the first search information and the second search information are being displayed on the panel region, the controller may maintain the displayed state of the first page.

In an embodiment, while an edition screen of a home screen including a plurality of icons is being displayed on the first page, the plurality of icons may be displayed on the panel region in a deletable manner. And if a touch input applied to a specific icon on the panel region is received, the controller may delete the specific icon from the panel region and the first page, and may output an indicator indicating the deleted state of the specific icon from the home screen, to the first page.

In an embodiment, the deleted specific icon may be moved to another tab menu generated within the panel region.

In an embodiment, the controller may provide an application result of a function related to the first page to the panel region, and if a size of the panel region is changed based on a touch input, the controller may control the function related to the first page to be differently applied.

In an embodiment, if a drag input is applied to the panel region, an application range of a function related to the first page may be changed along a path of the drag input.

In an embodiment, if a drag input is applied to the panel region, an image having its size changed gradually may be generated within the panel region along a path of the drag input, and an application result of the function related to the first page may be displayed within the image.

If a part of the first page covered by the panel region is changed along the path of the drag input, the function related to the first page may be gradually applied to the part of the first page, or the applied function may be released.

In an embodiment, the first page may include a plurality of objects, and at least part of the objects may be provided with a notification object indicating occurrence of an event. And if the part of the first page may be changed along the path of the drag input so as to include the object having the notification object, the controller may provide event information corresponding to the notification object to the panel region.

In an embodiment, the first page may correspond to a list including a plurality of items. And the controller may slide the panel region up and down based on a drag input applied to the panel region, may recognize a specific item included in the list and contacting a top line of the slid panel region which slides, and may provide detailed information of the recognized specific item to the panel region.

In an embodiment, if a preset touch gesture is applied to the touch screen while the first page is being displayed, the controller may extract first type information from the first page, may reconfigure the first page based on the first type information, and may output notification information indicating the reconfigured state of the first page to the panel region.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
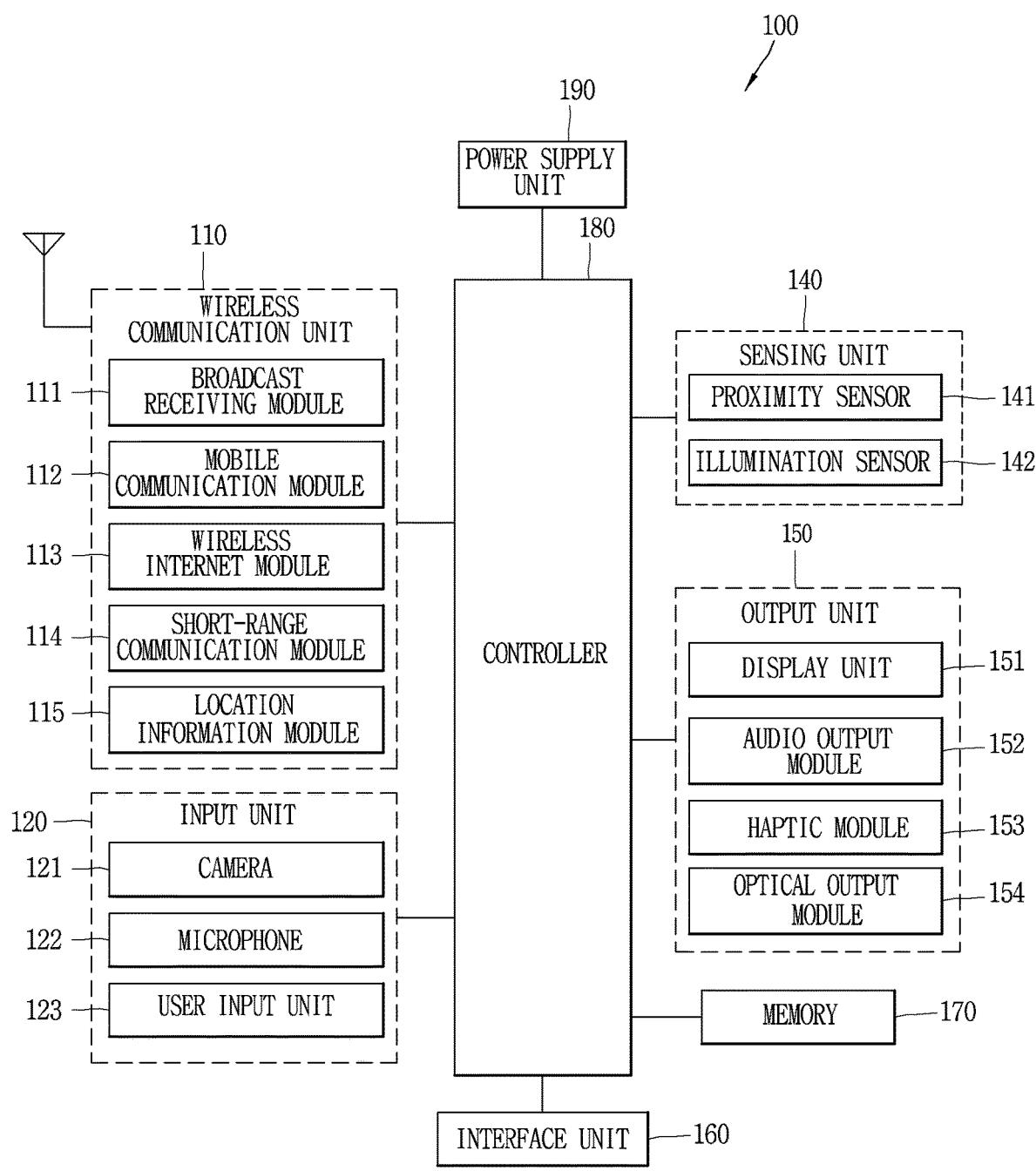
FIG. 1A is a block diagram of a mobile terminal in accordance with one exemplary embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 1B:
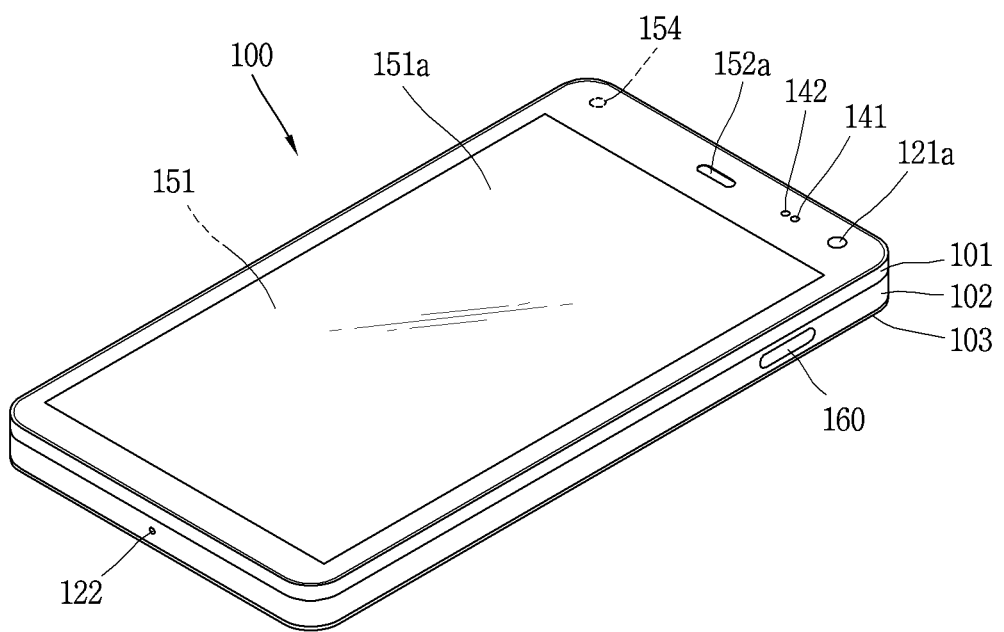
FIGS. 1B and 1C are conceptual views of one example of a mobile terminal according to the present invention, which are viewed from different directions.
Figure 1C:
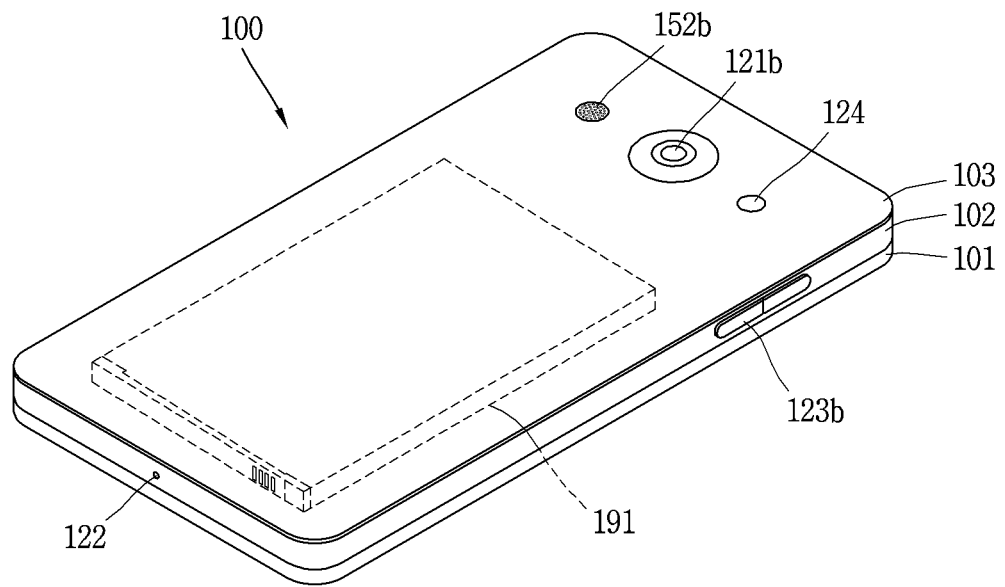

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband COMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

A magnetic sensor 143 indicates a sensor configured to detect an object approaching a predetermined surface or an object which exists nearby, and a position and a direction of the object, using a force of a magnetic field. That is, the magnetic sensor 143 indicates a sensor configured to measure a size and a direction of a peripheral magnetic field or a line of magnetic force. In the present invention, a plurality of 3-axis magnetic sensors 143a, 143b are provided at the mobile terminal 100 to more precisely sense a position and a direction of an object which generates a magnetic field.

For this, the plurality of 3-axis magnetic sensors 143a, 143b may be independent from each other, and may be spaced from each other in different directions. The controller 180 may execute a differentiated operation based on a size of a magnetic field measured by the plurality of 3-axis magnetic sensors 143a, 143b. More specifically, the controller 180 may detect a position, a direction, an angle, etc. of an object which generates a magnetic field, based on a size of a magnetic field measured by the plurality of 3-axis magnetic sensors 143a, 143b.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tab) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors.

The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 10, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

A third camera 121c may be further provided on a front surface of the terminal body. In this case, the third camera 121c may be disposed near the first camera 121a, or near the opposite side to the first camera 121a (i.e., the optical output unit 154).

The third camera 121c may be provided with a wide angle lens. In this case, the third camera 121c may support a wider viewing angle than the first camera 121a. In a general angle mode, the first camera 121a may be activated for capturing. And in a wide angle mode, the third camera 121c may be activated for capturing. An image captured by the third camera 121c may include a larger number of subjects than an image captured by the first camera 121a. However, in this case, distortion occurs toward a peripheral part of a frame.

The third camera 121c may be activated together with or independently from the first camera 121a when the first camera 121a is activated. If the third camera 121c is activated together when the second camera 121b formed on a rear surface of the terminal body is activated, an image captured by the third camera 121c may be used to compensate for a white balance reference value of an image captured by the first camera 121a.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The display unit 151 will be explained again. A bezel portion, which encloses a peripheral portion of the display unit 151, may be formed to be vary thin, or no bezel portion may be formed, in order to provide a larger screen and to implement a more sophisticated design. For this, an additional region where a home key, etc. are arranged is not provided on a lower end and/or an upper end of the display unit 151, but keys may be provided within the display unit 151 in the form of touch keys. In this case, when a user contacts his or her finger to information displayed on an upper end or a lower end of the display unit 151 or the touch key, sliding of the finger, etc. may occur frequently. Further, if the display unit 151 is formed to have no bezel portion, an up and down length of the display unit 151 becomes long. This may cause a difficulty in controlling information output to the display unit 151 with a single hand.

Accordingly, the mobile terminal 100 of the present invention, which has the aforementioned display unit, may provide a panel region for easily controlling information output to the display unit 151, within the display unit 151. And the mobile terminal 100 may perform various interactions with respect to information output to the display unit 151, by using the panel region. Hereinafter, various operations to generate, remove and transform a panel region on the display unit 151, will be explained in more detail with reference to the drawings. Hereinafter, the display unit 151 may be referred to as the touch screen 151.

FIGS. 2A~2D and 3A~3C are exemplary views illustrating various examples to generate, remove and transform a panel region on a touch screen, according to an embodiment of the present invention.

Figure 2A:
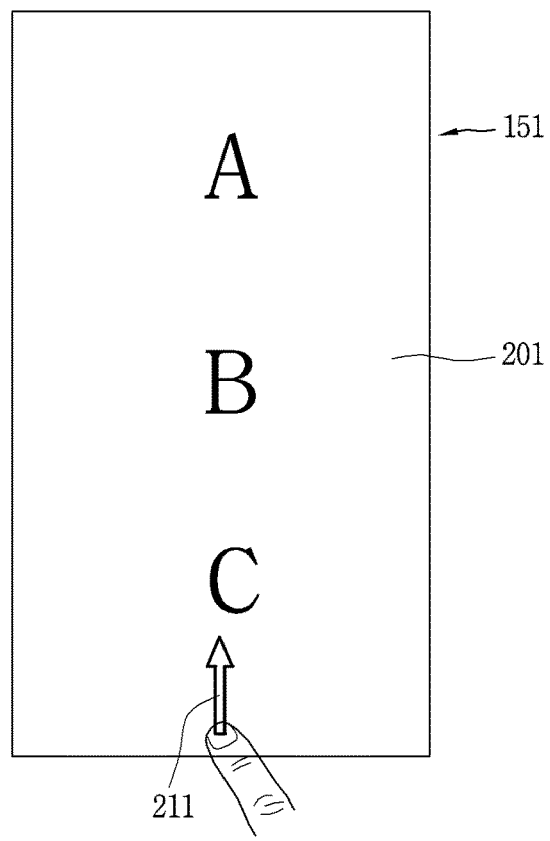
FIGS. 2A~2D and 3A~3C are exemplary views illustrating various examples to generate, remove and transform a panel region on a touch screen, according to an embodiment of the present invention.

FIG. 2A illustrates an example to generate a panel region within the touch screen 151. While first screen information 201 is being displayed within the touch screen 151, if a preset touch gesture (e.g., an upward touch input starting from a lower end of the touch screen 151) is dragged (211), the controller 180 of the mobile terminal 100 may recognize the touch gesture as an input of a control command for generating a panel region.

Figure 2B:
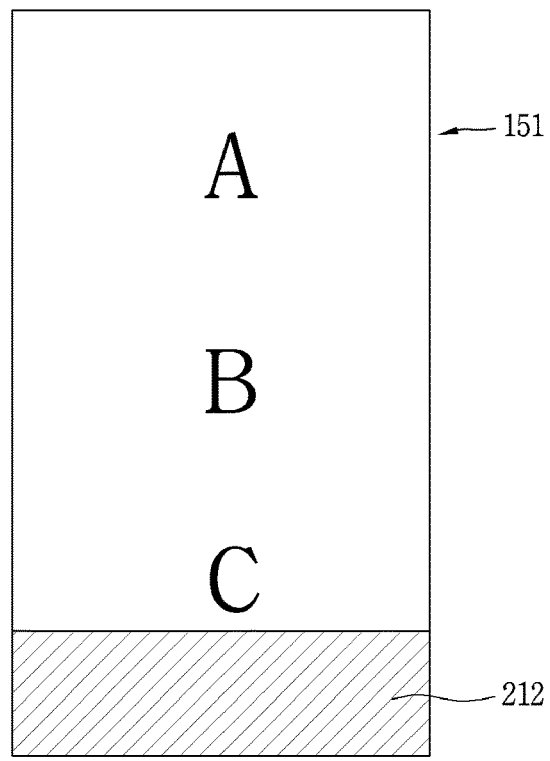

Accordingly, as shown in FIG. 2B, a region having a predetermined transparency is gradually withdrawn from the lower end of the touch screen 151, along a path of the drag input applied to the touch screen 151, thereby covering part of first screen information 201 (212). While the region is being withdrawn, the display state of the first screen information 201 is maintained. If the region is withdrawn from the lower end of the touch screen 151 up to a predetermined line, the region is fixed to a corresponding region (hereinafter, will be referred to as a 'panel region') as shown in FIG. 2C (220).

The panel region 220 is displayed on a first part of the touch screen 151, and the first screen information 201 is continuously output to a second part of the touch screen 151. Both of the first and second parts of the touch screen 151 maintain an activated state. A user may control information output to the panel region 220 based on a touch input applied to the first part, and may control the first screen information 201 based on a touch input applied to the second part.

Figure 2C:
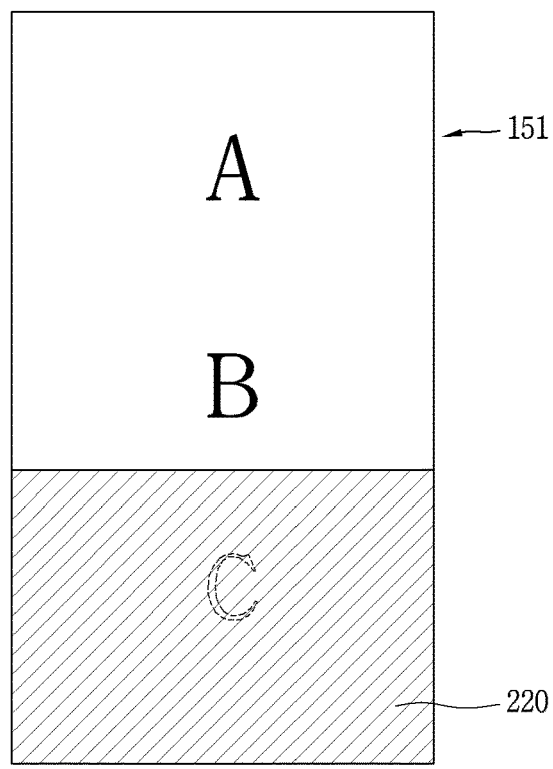

As shown in FIG. 2C, the panel region 220 is disposed at a lower part of the touch screen 151, and is formed to cover part of the first screen information 201. And the panel region 220 may be formed to have a predetermined transparency, such that a part ('C') of the first screen information 201 being displayed on the touch screen 151 may be viewed as glass through the panel region 220. That is, the part ('C') of the first screen information 201, covered by the panel region 220, may be viewed semi-transparently As shown in FIG. 2C, the panel region 220 may be generated to a horizontal length equal to a horizontal length of the touch screen 151, i.e., may be formed to have a structure to cover all of right and left side surfaces of the touch screen 151. As another example, the panel region 220 may be generated to a horizontal length shorter than the horizontal length of the touch screen 151, i.e., may be formed to have a structure where at least one of the right and left side surfaces of the touch screen 151 has a space of a predetermined gap. In this case, the first screen information 201 may be continuously displayed on the space of the predetermined gap, while the panel region 220 is being displayed.

Information related to the first screen information 201 may be output to the panel region 220. A touch input may be applied to the panel region 220, and information output to the panel region 220 may be controlled based on the applied touch input.

Figure 2D:
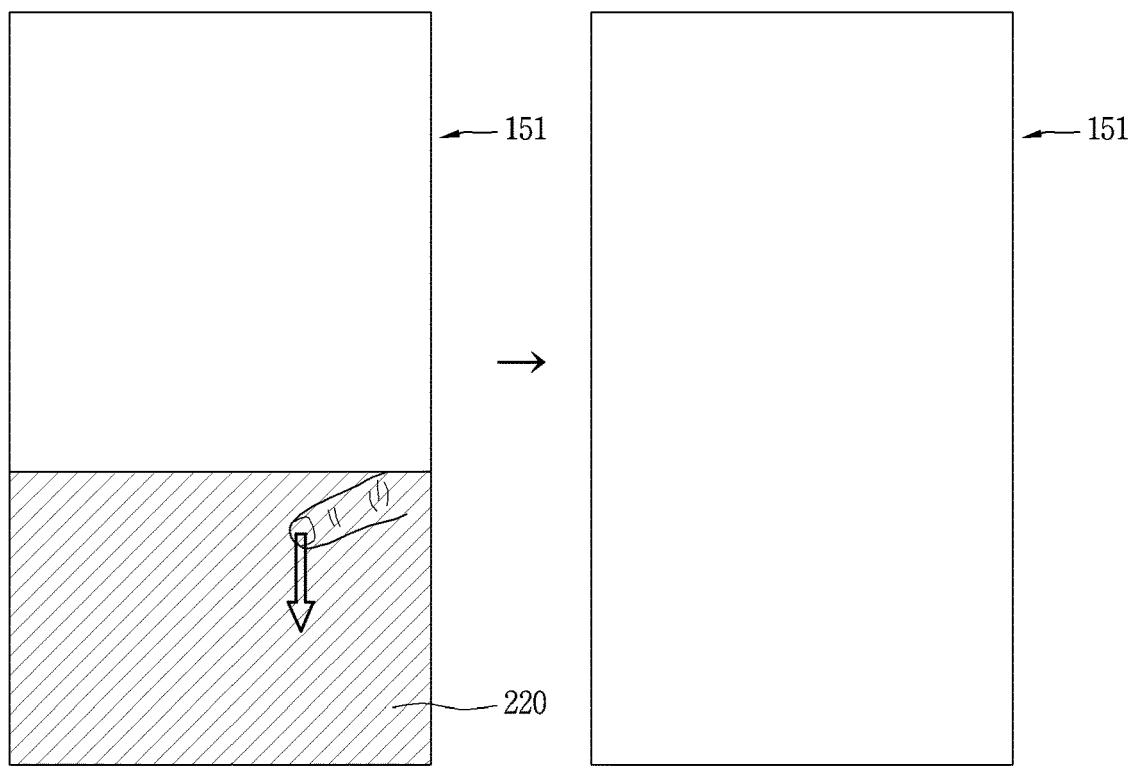

FIG. 2D illustrates an example to remove a panel region formed within the touch screen 151. While the panel region 220 is being displayed within the touch screen 151, if a preset touch gesture (e.g., a downward touch input starting from any point of the panel region 220) is dragged, the controller 180 of the mobile terminal 100 may recognize the touch gesture as an input of a control command for removing the panel region. Accordingly, with a visual effect that the panel region 220 is gradually inserted into the lower end of the touch screen 151, the panel region 220 disappears from the touch screen 151 completely. If the panel region 220 disappears, the first screen information 201 is displayed on an entire region of the touch screen 151.

Figure 3A:
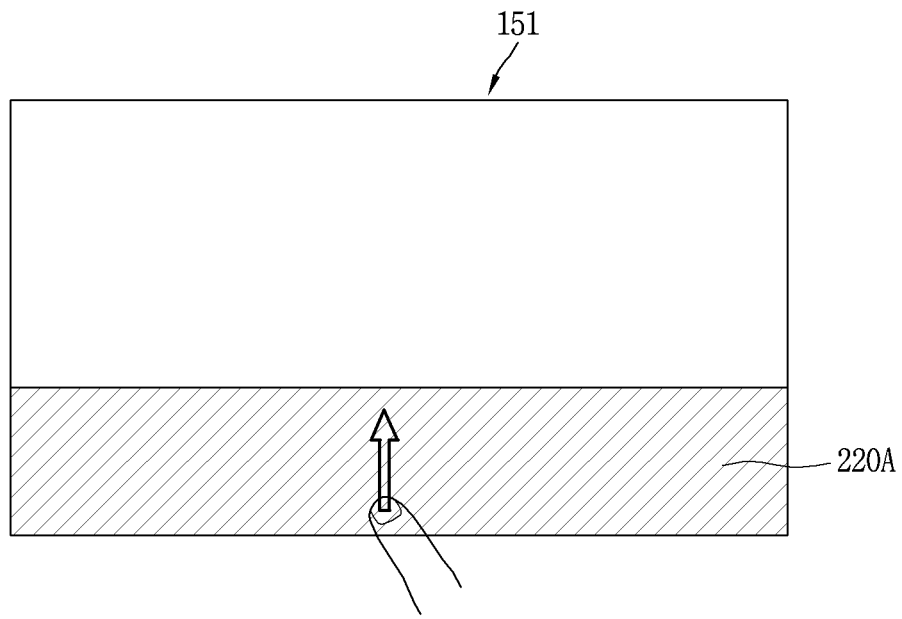
Figure 3B:
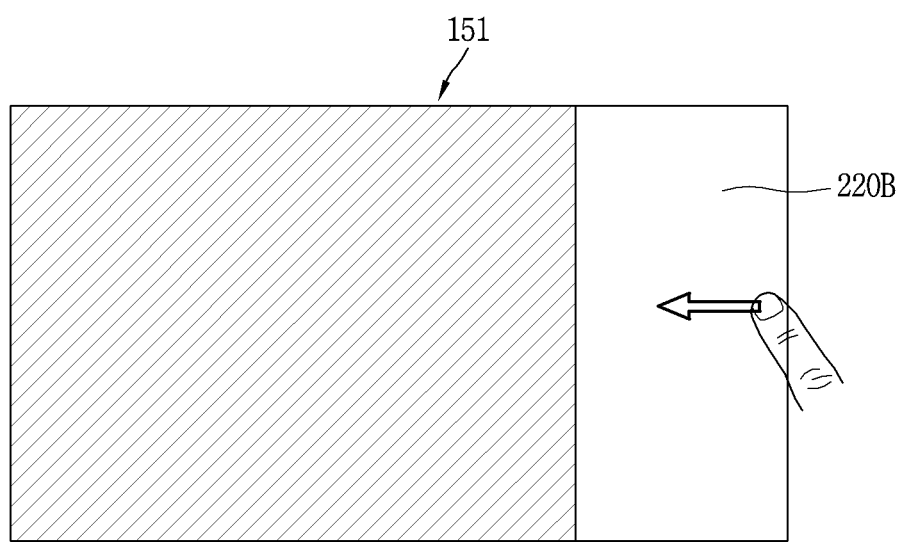

FIGS. 3A and 3B show examples to generate a panel region on a different position when the touch screen 151 undergoes a mode conversion into a horizontal mode. FIG. 3A shows a first panel region 220A withdrawn by an upward drag input from a lower end of the touch screen 151, in a horizontal mode of the touch screen 151. The first panel region 220A may be arranged in a state where a ratio between a horizontal length and a vertical length has been controlled, in correspondence to the horizontal mode of the touch screen 151. As another example, FIG. 3B shows a second panel region 220B withdrawn according to a drag input applied from a right or left end toward the center, in a horizontal mode of the touch screen 151. In this case, if the touch screen 151 is converted into a vertical mode, the first panel region 220A or the second panel region 220B may be converted into the panel region 220 shown in FIG. 2C.

Figure 3C:
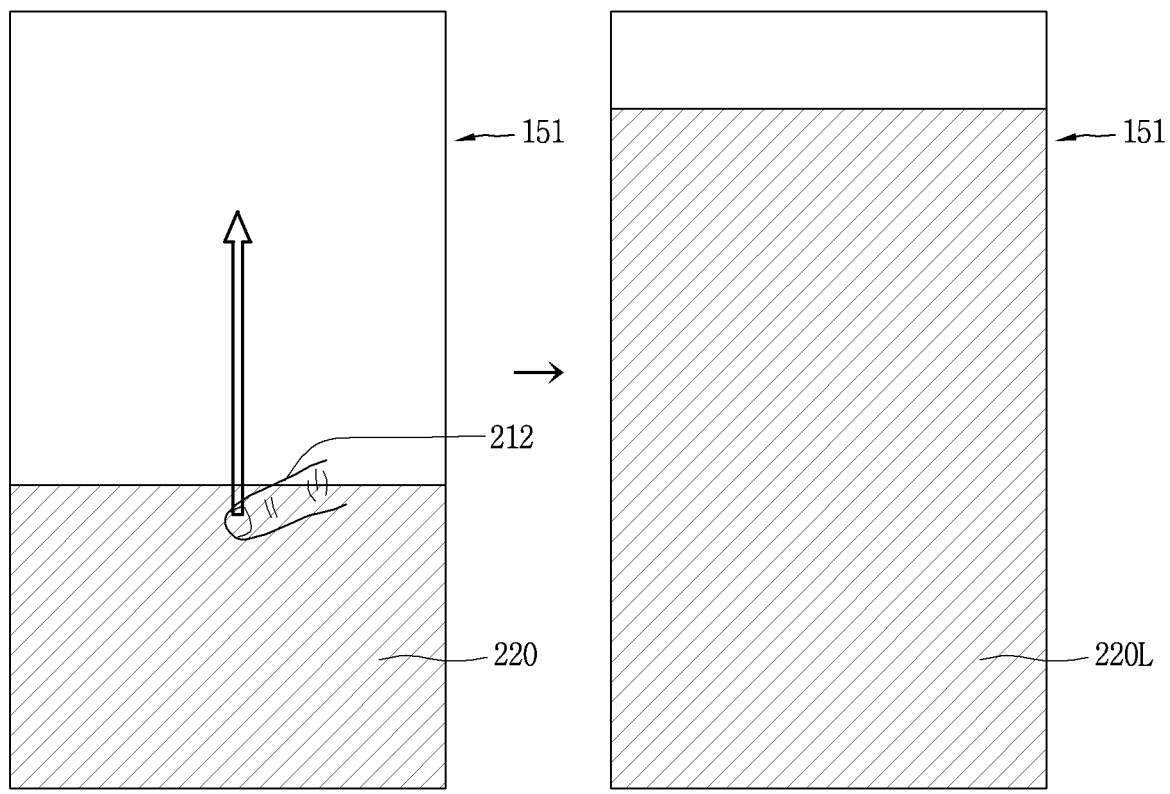

FIG. 3C shows an example to change a size of the panel region 220 based on a drag touch input. Referring to FIG. 3, while the panel region 220 is being displayed within the touch screen 151, if a drag touch input applied to any point of the panel region 220 or applied to an upper end bar is dragged towards an upper end of the touch screen 151, a position of the upper end bar of the panel region 220 is changed along a path of the drag touch input. As a result, an up and down length or a height of the panel region is more increased (hereinafter, will be referred to as an 'extended panel region'). The controller 180 may determine an up and down length or a height of a panel region 220L extended in correspondence to a release point of the drag touch input applied to the panel region 220. Alternatively, the controller 180 may generate a different control command according to a release point of the drag touch input applied to the panel region 220.

Figure 4:
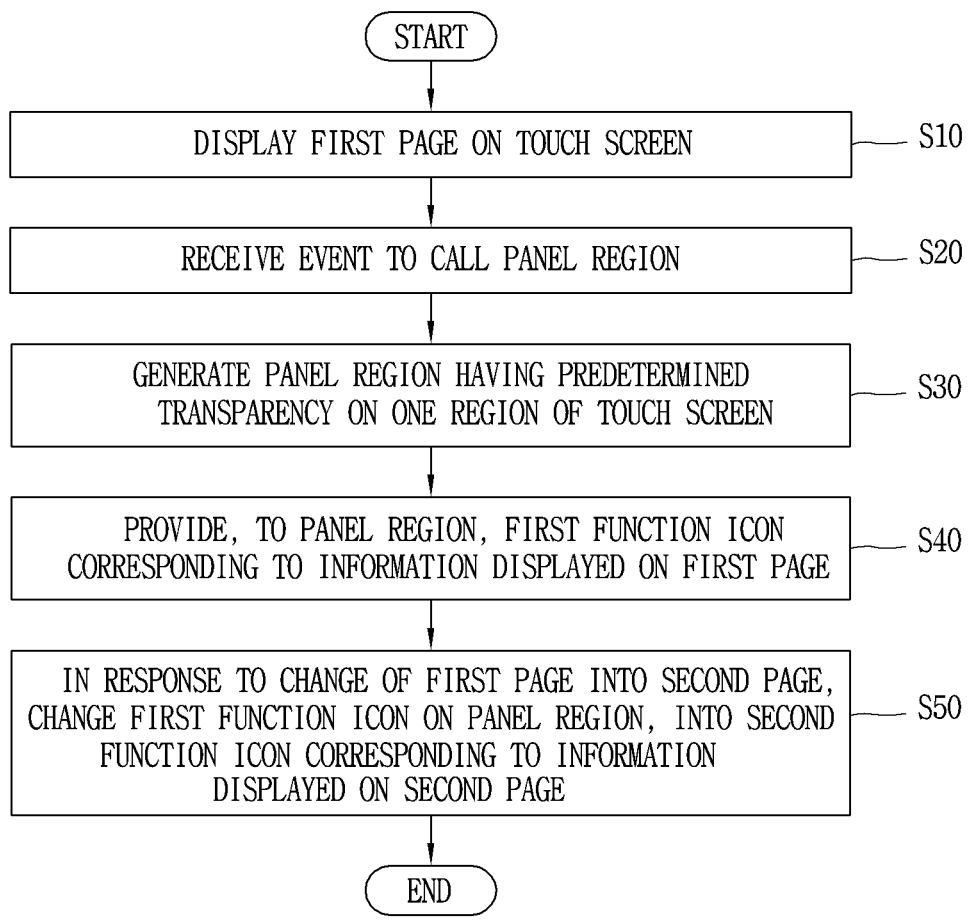
FIG. 4 is a representative flowchart for explaining an operation of a mobile terminal according to an embodiment of the present invention.

FIG. 4 is a representative flowchart for explaining an operation of the mobile terminal according to an embodiment of the present invention.

Firstly, a first page is displayed on the touch screen 151 of the mobile terminal 100 according to the present invention (S10). Here, the first page may have any type. The first page may be an initial screen of a specific application, a screen of a specific execution step, or a home screen. Alternatively, the first page may be a screen corresponding to one of a plurality of tabs.

While the first page is being displayed on the touch screen 151, the mobile terminal 100 may sense occurrence of an event which calls a panel region (S20).

The panel region may be defined as a supplementary screen region for providing information related to a screen displayed on the touch screen 151. The event which calls a panel region may be generated in response to a preset touch gesture applied to the touch screen 151. Alternatively, the event which calls a panel region may be generated in response to a preset other type of user input (e.g., a voice command, a hard key push input or a specific gesture input), or in response to occurrence of other type of event (e.g., sensing a connection with a specific mobile terminal, etc.)

If the event which calls a panel region occurs, the controller 180 generates a panel region having a predetermined transparency, on a part of the touch screen 151 (S30).

More specifically, as an image is gradually withdrawn from a lower end of the touch screen 151 along a path of a drag touch input applied to the touch screen 151, a panel region may be generated on a lower part of the touch screen 151. Once the panel region is generated, part of the first page, which was being output to the touch screen 151, is viewed semi-transparently or is scarcely viewed through the panel region. If a soft key such as a home key or a back key was being displayed on a lower region of the touch screen 151, the soft key such as the home key or the back key may be semi-transparently viewed on a part of the panel region corresponding to the lower region. The display state of the first page may be maintained on a part rather than the panel region on the touch screen 151.

Next, the controller 180 provides a first function icon corresponding to information displayed on the first page, onto the generated panel region (S40).

The first function icon may be one of an object, an icon and a menu for executing a specific function, which may match a menu included in the first page one by one or may correspond to a part of the menu included in the first page. Alternatively, the first function icon may correspond to a specific object, icon, menu, etc. for applying a specific function to information displayed on the first page, or for processing the information by correlating with a specific function.

If the first page displayed on the touch screen 151 is converted into a second page, the controller 180 may change the first function icon on the panel region, into a second function icon corresponding to information displayed on a second page (S50).

The conversion of the first page into the second page may be executed based on a touch input applied to the first page, or based on a touch input applied to the panel region.

In the latter case, a user may easily convert the first page output to the touch screen 151 into the second page, through an interaction with a panel region having a short fingering distance. For instance, if the first and second pages are displayed on a plurality of tab menus within the same window, and if the tab menus are displayed on an upper end of the touch screen 151, a tab conversion can be performed by using a panel region having a short fingering distance, resulting in easily performing a page conversion.

When the first page is converted into the second page, if a page turning effect is output, the controller 180 may simultaneously apply the page turning effect to the first and second function icons on the panel region. Accordingly, while a part of the first page and a part of the second page are being simultaneously displayed on the touch screen 151, a part of the first function icon and a part of the second function icon may be simultaneously displayed on the panel region.

Figure 5:
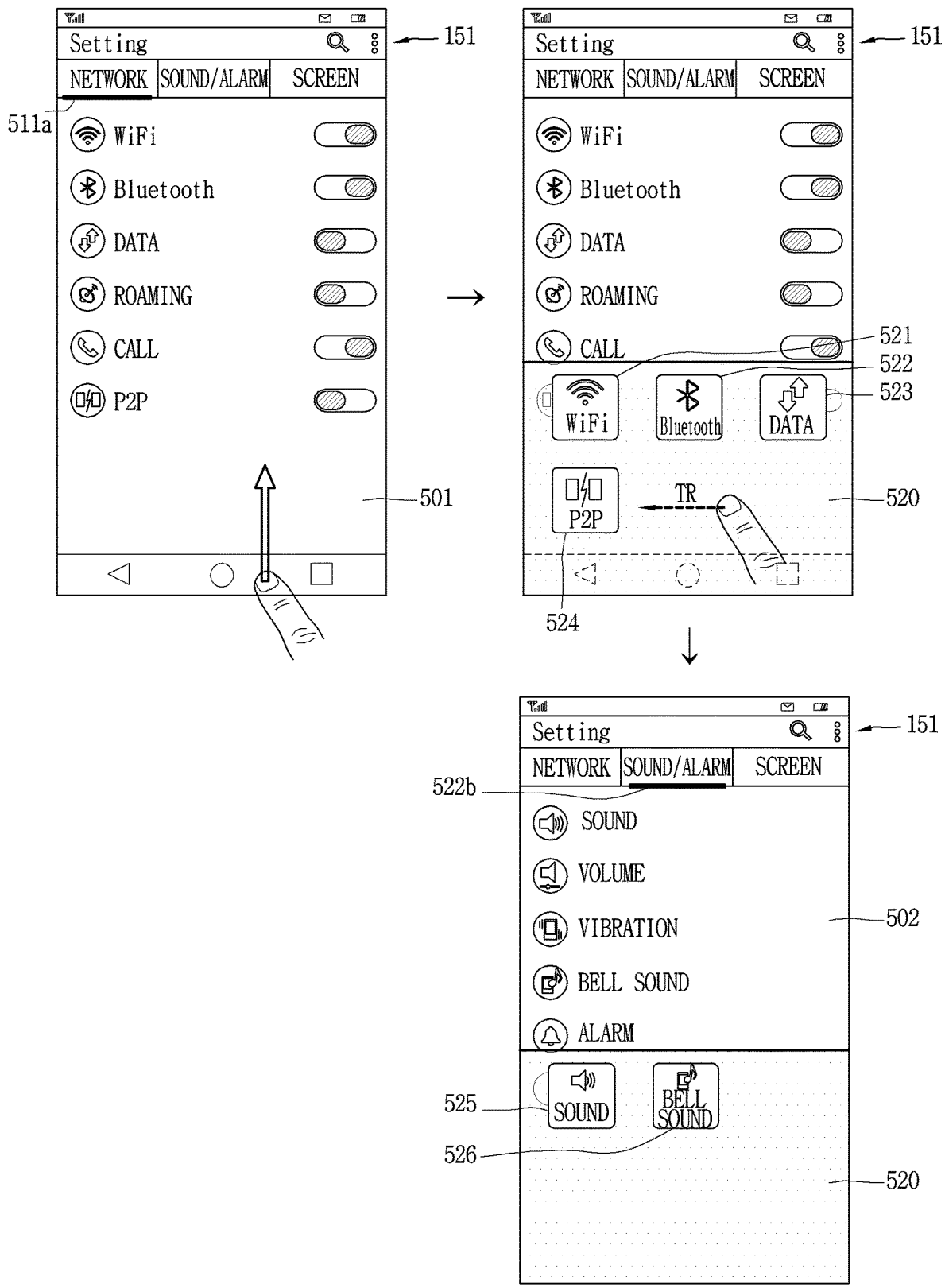
FIG. 5 shows conceptual views for explaining the processes of FIG. 4.

FIG. 5 shows conceptual views for explaining the processes of FIG. 4.

Referring to FIG. 5, as a setting application is executed, a first page corresponding to a first tab among a plurality of tabs, i.e., a network setting screen 501 may be displayed on the touch screen 151.

A long bar type indicator composed of a plurality of regions may be displayed on an upper end of the network setting screen 501. Information about convertible tabs (e.g., sound/alarm, screen, etc.) may be displayed on each of the plurality of regions included in the indicator. For instance, a network setting menu may be displayed on a first region of the indicator, a sound/alarm setting menu may be displayed on a second region of the indicator, and a screen setting menu may be displayed on a third region of the indicator. And a bar type moving object 511*a* indicating a position of a currently-displayed tab menu may be displayed on a lower end of the indicator, or near the lower end of the indicator.

Various menu items related to a network setting, and icons for setting an on/off state of the menu items may be displayed on the network setting screen 501. A currently-set value of a corresponding icon may be changed based on a touch input.

While the network setting screen 501 is being displayed, if an upward drag input starting from a lower end of the touch screen 151 (or a flicking input) is received, a panel region 520 having a predetermined transparency gradually appears along a path of the drag input. More specifically, the panel region 520 is withdrawn from the lower end of the touch screen 151 so as to gradually cover a lower part of the network setting screen 501. Once the panel region 520 is located within a preset region, the panel region 520 is fixed to a corresponding position. Accordingly, the touch screen 151 is divided into a first part where the network setting screen 501 is continuously output, and a second part where the panel region 520 is output.

It can be expressed that the panel region 520 is layered on the network setting screen 501, and the network setting screen 501 is layered below the panel region 520. However, in the present invention, both of the first and second parts of the touch screen 151 maintain an activated state even while the panel region 520 is being displayed. Accordingly, in case of controlling the first part and then controlling the second part, or vice versa, an additional input for selecting one of the first and second parts is not required.

If an upward drag input starting from the lower end of the touch screen 151 (or a flicking input) is received, the controller 180 may recognize a tab of a page currently-displayed on the touch screen 151. And the controller 180 may provide quick icons of a plurality of menus included in the recognized tab, to the panel region 520.

More specifically, quick setting icons 521, 522, 523, 524 corresponding to setting menu items displayed on the touch screen 151 and corresponding to setting icons with respect to the setting menu items may be displayed on the panel region 520. A display order of the quick setting icons 521, 522, 523, 524 corresponds to a display order of the setting menu items displayed on the network setting screen 501 (e.g., Wi-Fi, Bluetooth, data, etc.). On each of the quick setting icons 521, 522, 523, 524, a setting value of a corresponding setting menu item is displayed.

The controller 180 may change the setting value of the corresponding setting menu item, based on a touch input applied to each of the quick setting icons 521, 522, 523, 524. In this case, the changed setting value may be also displayed on the network setting screen 501 layered below the panel region 520. Soft keys such as a back key, a home key and a recent apps-viewing key, which have been displayed before the panel region 520 is generated, are semi-transparently viewed on a lower end of the panel region 520. Accordingly, the controller 180 may control the soft keys layered below the panel region 520 based on a touch applied to the panel region 520 (e.g., a single touch input exceeding a reference pressure), while maintaining the panel region 520.

Although not shown, in an embodiment, only quick setting icons corresponding to some setting menu items which satisfy a preset condition may be provided to the panel region 520 on the network setting screen 501. In this case, the setting menu items displayed on the network setting screen 501 may be reconfigured or may have a size change, based on the quick setting icons displayed on the panel region 520.

As the network-related setting menus displayed on an entire region of the touch screen 151 are re-arranged within the panel region 520 having a short fingering distance, a user's fingering distance becomes short. That is, a user may control the setting menu items displayed on a region having a long fingering distance, using a single hand, based on a touch input applied to the panel region 520.

Next, if a drag touch input in one direction (e.g., a flicking input or a drag touch input towards the left side from the right side) is applied to the panel region 520 (refer to 'TR'), the network setting screen layered below the panel region 520 may be converted into a next tab screen corresponding to a drag direction. More specifically, as shown in FIG. 5, the network setting screen 501 is converted into a second page corresponding to a second tab among the plurality of tabs, i.e., a sound/alarm setting screen 502. With such a configuration, a user needs not directly touch the indicator disposed on an upper end of the network setting screen 501, in order to change a tab screen in a setting application.

When the network setting screen 501 corresponding to the first tab is converted into the sound/alarm setting screen 502 corresponding to the second tab, a screen change corresponding to the tab conversion is output to the panel region 520. More specifically, the quick setting icons 521, 522, 523, 524, corresponding to the setting menu items of the network setting screen 501, are changed into quick setting icons 525, 526 corresponding to setting menu items of the sound/alarm setting screen 502, in a seamless manner.

Here, if the touch input (TR) applied to the panel region 520 is dragged in a reverse direction, the sound/alarm setting screen 502 is converted into the network setting screen 501. As a result, the quick setting icons displayed on the panel region 520 are also changed in a seamless manner.

Figure 6:
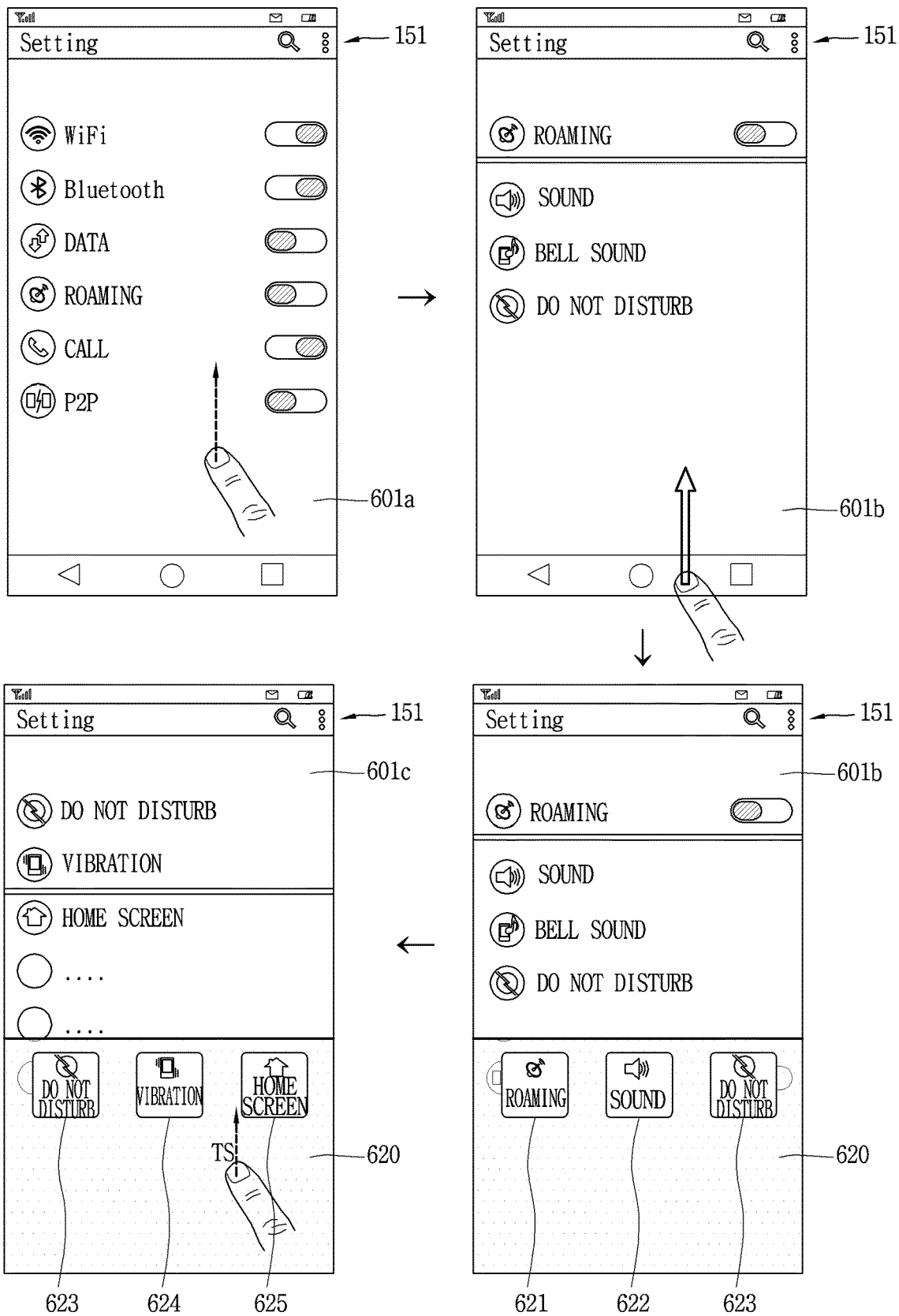
FIGS. 6, 7A and 7B are conceptual views illustrating a method for controlling a screen by using a panel region on an execution screen of a setting application, according to an embodiment of the present invention.

As another embodiment, FIG. 6 shows an operation when a plurality of setting menu items corresponding to an executed setting application are formed as pages which can be scrolled up and down, not a plurality of tabs.

Referring to FIG. 6, while a setting screen 601a corresponding to a first page is being displayed on the touch screen 151, if an up and down scroll operation is applied to the touch screen 151, the first page is scrolled up and down, and a setting screen 601b corresponding to a second page is output. In this case, if a preset touch gesture, e.g., an upward drag touch input (or a flicking touch input) starting from a lower end of the touch screen 151 is applied, a panel region 620 is withdrawn. And quick icons 621, 622, 623 of setting menu items provided onto the second page are displayed on the panel region 620.

Then, if an up and down scroll operation is applied to the panel region 620 (TS), the setting screen 601b corresponding to the second page layered below the panel region 620 is scrolled. As a result, a setting screen corresponding to a third page (e.g., a page including a home screen icon) is gradually output. Unlike in FIG. 5, parts of the plurality of pages may be simultaneously displayed according to a scroll degree of the scroll operation.

While the page scroll is being performed, the quick icons 621, 622, 623 output to the panel region 620 are also scrolled. Information output to the panel region 620 may be scrolled in a direction different from the scroll direction of the touch screen 151, e.g., in a leftward direction. As a result, some (621, 622) of the quick icons 621, 622, 623 disappear sequentially to the left side, and quick icons 624, 625 of new setting menu items may appear sequentially from the right side.

As aforementioned, the present invention provides a UX capable of easily and rapidly controlling objects output to a currently-displayed screen with a single hand, by using a panel region.

Figure 7A:
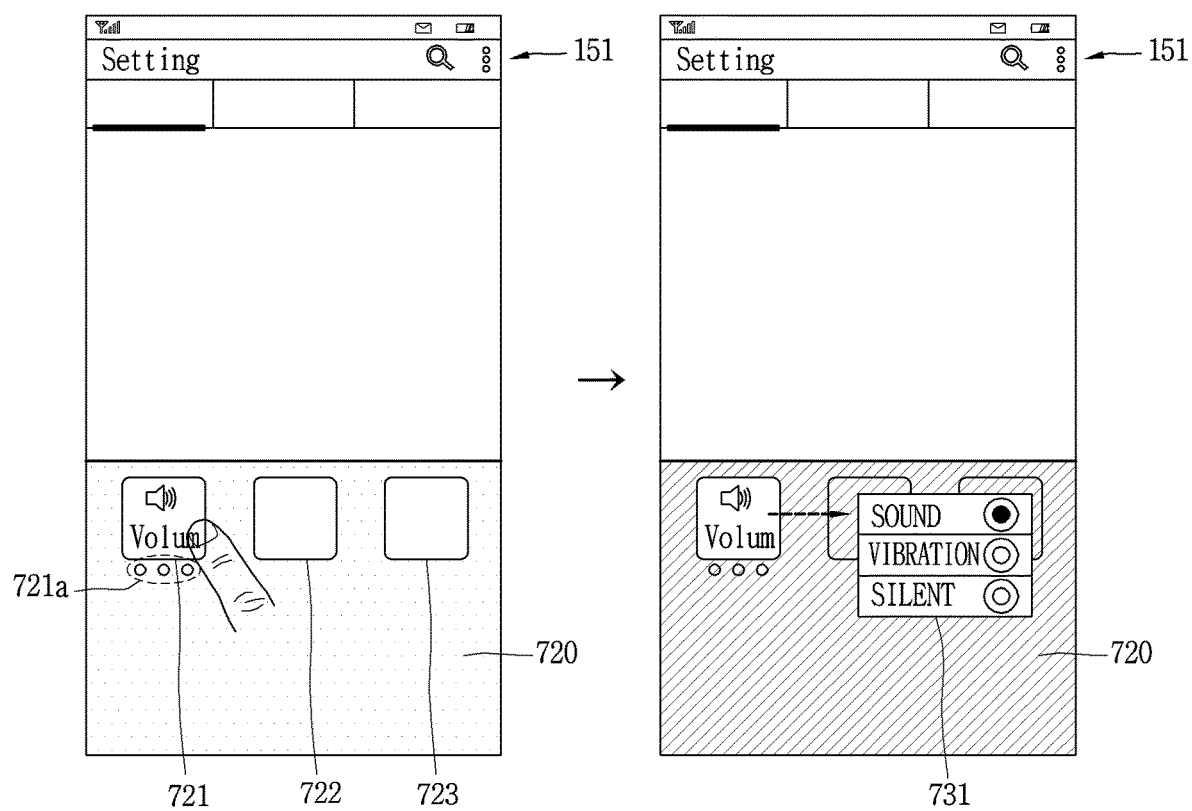
Figure 7B:
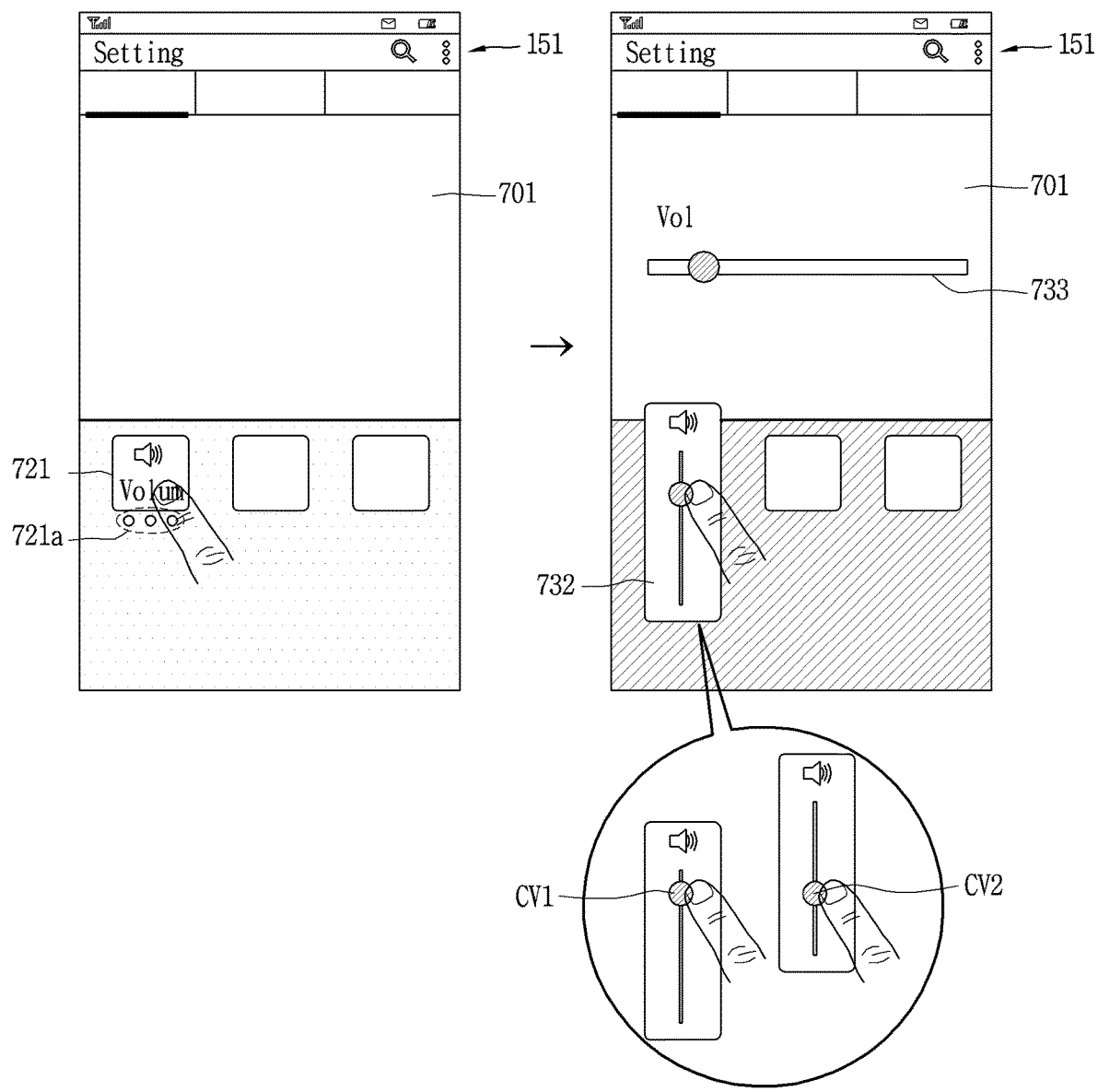

As another embodiment, FIGS. 7A and 7B show examples to rapidly control a setting value of a detailed setting item, with a single hand, by using a panel region on an execution screen of a setting application.

Referring to FIG. 7A, while a panel region 720 is being displayed on a lower part of the touch screen 151, a touch input may be applied to a specific icon 721 among quick setting icons 721, 722, 723 displayed on the panel region 720. Then, a queue image 721a, indicating one or more controllable detailed setting items corresponding to the quick setting icon 721, may be output. For instance, when there are three controllable detailed setting items, a queue image 721a having three dots may appear.

Next, if a continuous touch input is applied to the quick setting icon 721 or if pressure exceeding a reference pressure is sensed on the first touch point, other icons 722, 723 are converted into an inactive state. And a window 731 which displays the detailed setting items corresponding to the quick setting icon 721, is popped-up on the panel region 720. A user may change a current volume setting value by directly touching one of the detailed setting items displayed on the window 731, or by applying a continuous touch input to the quick setting icon 721 in a toggling manner. For instance, based on the number of times that a touch input is applied to the quick setting icon 721, the current volume setting value displayed on the window 731 may be repeatedly changed in order of sound, vibrate, silent, sound . . . .

The controller 180 may apply a control result with respect to the quick setting icon 721 on the panel region 720, to a setting page screen layered below the panel region 720. More specifically, referring to FIG. 7A, if the current volume setting value is changed by directly touching one of the detailed setting items displayed on the window 731, or by applying a continuous touch input to the quick setting icon 721, a notification icon indicating the change of the current volume setting value may be popped-up on a setting page layered below the panel region 720. Alternatively, a display bar formed on an upper end of the touch screen 151 may have a status change. For instance, a bar type indicator, indicating the detailed setting item displayed on the window 731 has changed into 'vibrate' from 'sound', may appear and then disappear on a setting page layered below the panel region 720.

The controller 180 may control an entered degree into a detailed item related to a corresponding function icon, based on a touch degree of a touch input applied to the function icon displayed on the panel region 720.

More specifically, referring to FIG. 7A, if a touch degree of a touch input applied to the quick setting icon 721 (sound setting icon) displayed on the panel region 720 is less than a reference pressure, only the queue image 721a or the window 731 is displayed. On the other hand, if a touch input exceeding the reference pressure is applied to the quick setting icon 721, the mobile terminal may directly enter a volume control step of the current setting value (sound mode) of the quick setting icon 721, as shown in FIG. 7B. As a result, the quick setting icon 721 displayed on the panel region 720 is immediately converted into a volume control bar 732. That is, FIG. 7B illustrates a method of entering a depth at a time, the depth greater than that of the detailed setting item ('sound') of the quick setting icon 721.

The volume control bar 732 includes a moving object indicating a current volume value, and the volume control bar 732 is disposed such that the moving object is located on a touch point of a touch input applied to the quick setting icon 721. That is, the current volume value is located on the touch point, even though a touch applied to the volume control bar 732 is not released. As a result, a user needs not additionally move the touch point of the touch input applied to the quick setting icon 721 for control of a volume value, onto the position of the current volume value within the volume control bar 732.

For instance, as shown in a right and lower region of FIG. 7B, when the current volume value is great (CV1) and is small (CV2), a position of the volume control bar 732 is changed. In some cases, a part of the volume control bar 732 may be displayed on a region rather than the panel region 720. Alternatively, one part of the volume control bar 732 may be displayed on the panel region 720, and another part thereof may be omitted.

Once the volume control bar 732 is displayed, the current volume value may be controlled by dragging a touch input exceeding a reference pressure within the volume control bar 732, without releasing the touch input. That is, the current volume value may be changed by moving a touch point of a touch input exceeding a reference pressure within the volume control bar 732. Here, a bar type indicator 733 indicating the changed current volume value may be real time displayed on a displayed setting page 701.

Although not shown, when a touch degree of a drag touch input applied to the volume control bar 732 is changed, the volume control bar 732 may be converted into the quick setting icon 721.

FIGS. 8A to 8D are views illustrating various examples related to a method for rapidly checking information on applications having unchecked events, with a single hand, by using a panel region.

Figure 8A:
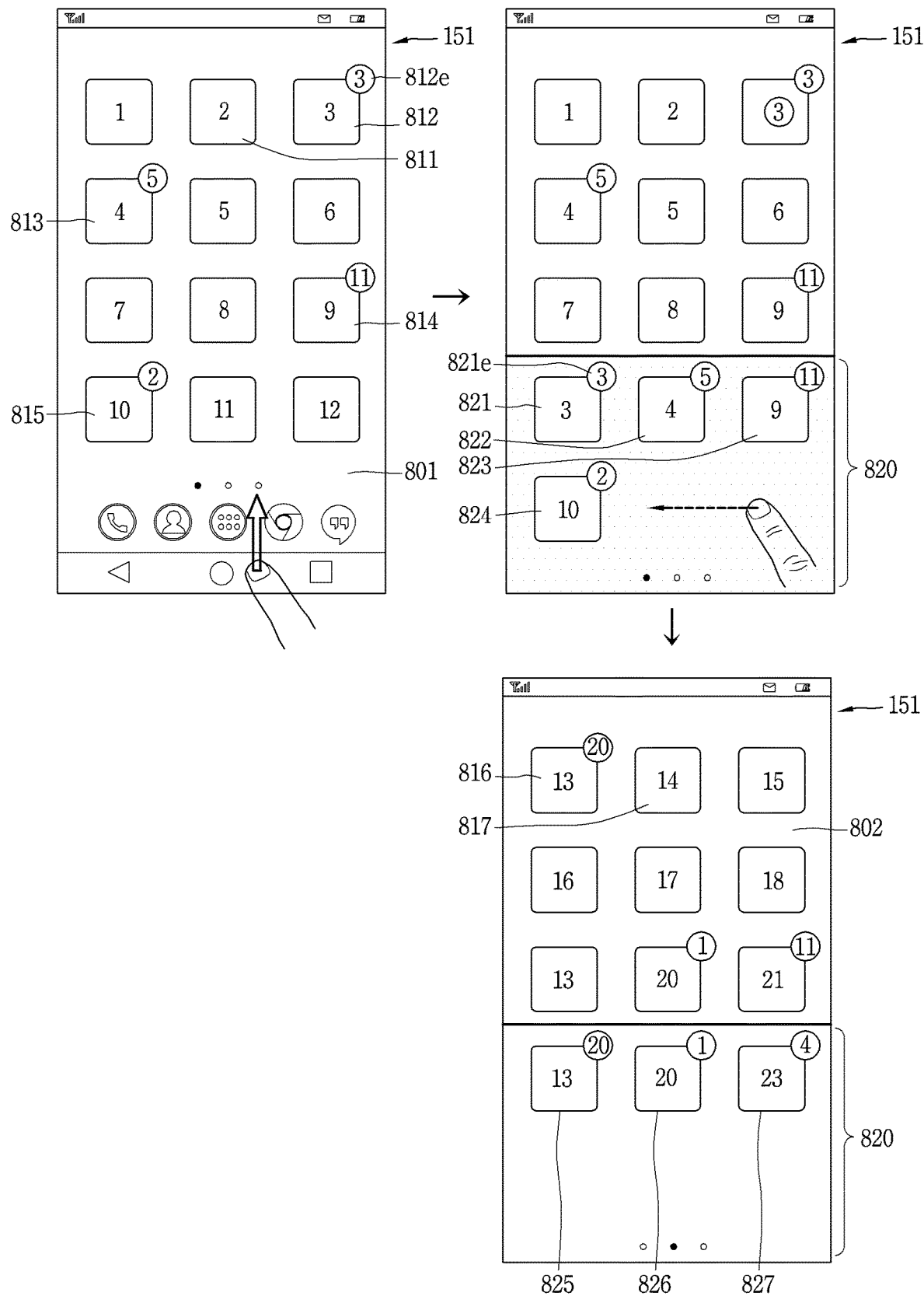
FIGS. 8A to 8D are views illustrating a method for controlling information related to applications having unchecked events, by using a panel region, according to an embodiment of the present invention.

Referring to FIG. 8A, a home screen 801 may be output to a touch screen 151, and the home screen may include a plurality of objects. The plurality of objects may include application icons, widgets, buttons, menus, files, folders, images, links, etc. A graphic object indicating that a corresponding application has an unchecked event may be displayed on some of the plurality of objects. The event may be occurrence of an accident which influences on an operation of at least one application installed at the mobile terminal, occurrence of an accident which changes an item of database (or a data file) related to at least one application, or occurrence of an accident which transmits or receives data to or from an external terminal or an external network through the at least one application. For instance, a 'call reception' or a 'message reception' may be an example of the event. Accordingly, the unchecked event may be an unchecked state of an update completed, a non-response to a call received, an unchecked message received, etc.

Once the unchecked event occurs, a graphic object (e.g., badge-type notification information) indicating one or more unchecked events, may be attached to a specific object (a corresponding object). For instance, it can be seen that a second icon 811 among objects displayed on the home screen 801 has received no event, and a third icon 812 has three unchecked events through notification information 812e attached thereto.

In a state where some objects 812, 813, 814, 815 included in the home screen 801 have been provided with notification information indicating existence of one or more unchecked events, if an upward flicking touch input starting from a lower end of the touch screen 151, the controller 180 recognizes the objects 812, 813, 814, 815 having unchecked events. And said some objects 812, 813, 814, 815 having unchecked events and included in the objects displayed on the home screen 801 are provided onto a withdrawn panel region 820, in a collected manner. For instance, as shown in FIG. 8A, a third icon 821, a fourth icon 822, a ninth icon 823 and a tenth icon 824, which correspond to said some objects 812, 813, 814, 815, respectively, are provided within the panel region 820. Accordingly, a user may check applications having one or more unchecked events at a glance, using the panel region 820, and may rapidly enter a corresponding application using a single hand, as will be explained hereinafter.

Notification information (e.g., 821e) including information on the number of unchecked events may be attached to each of the icons provided onto the panel region 820. A display order of the icons provided onto the panel region 820 corresponds to a display order of the objects displayed on the home screen 801.

In an embodiment, while objects having unchecked events are being displayed on the withdrawn panel region 820 in a collected manner, the objects displayed on the home screen 801 may be reconfigured based on the objects displayed on the panel region 820. For instance, the objects displayed on the panel region 820 may not be displayed on the home screen 151, and objects on the home screen 151 covered (blocked) by the panel region 820 may be moved to an upper side of the panel region 820.

Next, if a drag touch input (or a flicking touch input) is applied to the panel region 820 in a horizontal direction, the controller 180 may perform a page conversion (in case of a plurality of pages) of the home screen 151, along the touch direction. Here, while the drag touch input is applied to the panel region 820, a graphic object (e.g., a dot-type queue image) indicating a current page of the home screen may appear and disappear.

In response to a conversion of the home screen layered below the panel region 820 into a second page 802, the objects displayed on the panel region 820 are changed to correspond to the second page 802. More specifically, if an icon 817 having no event and an icon 816 having an unchecked event are together displayed on the second page 802 of the home screen, the previously-displayed icons 821, 822, 823, 824 disappear from the panel region 820, and icons 825, 826, 827 having one or more unchecked events and displayed on the second page 802 of the home screen are displayed in a collected manner.

If the drag direction of the drag touch input applied to the panel region 820 is changed, a part of the second page 802 and a part of the first page 801 of the home screen may be simultaneously displayed, or the second page 802 may be re-converted into the first page, based on a drag degree. And a dot-type queue image indicating a position of the current page of the home screen may be displayed on a lower end of the panel region 820.

In an embodiment, even when a drag touch input in a horizontal direction is applied to an exposed region of the home screen while the panel region 820 is being displayed, a page conversion of the home screen and a reconfiguration of objects displayed on the panel region 820 may be simultaneously performed.

Although not shown, in an embodiment, if an up and down scroll operation is applied to the panel region 820, only objects having unchecked events displayed on the panel region 820 may be changed while the current page of the home screen is maintained. In this case, while the up and down scroll operation is applied, a scroll bar indicating a current position of the displayed objects may appear according to the number of objects to be displayed on the panel region 820.

Figure 8B:
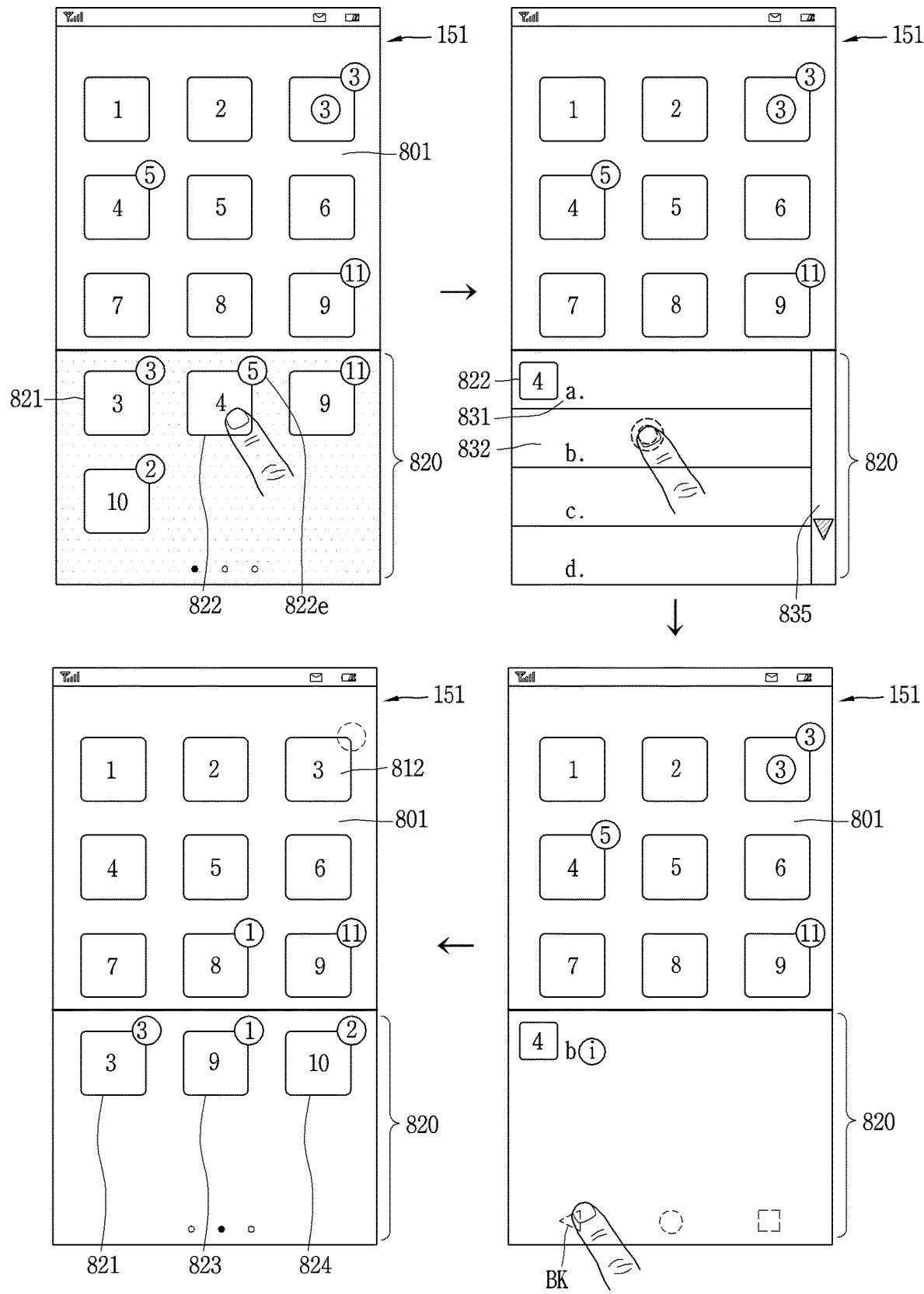

FIG. 8B shows an example to rapidly check an unchecked event, with a single hand, by using a panel region 820.

Referring to FIG. 8B, while icons 821, 822, 823, 824 having one or more unchecked events displayed on a home screen 801 are being displayed on the panel region 820, if a touch input is applied to the specific icon 822, information related to unchecked events of a corresponding application is provided to the panel region 820.

More specifically, when the fourth icon 822 displayed on the panel region 820 is touched, information on unchecked events (a, b, c, d) which have occurred from an application corresponding to the fourth icon 822 is displayed on the panel region 820. In this case, a scroll bar 835 may be displayed on a right side (or a lower end) of the panel region 820, according to an amount of the displayed information on unchecked events. A user of the mobile terminal may select specific event information among the information on unchecked events displayed on the panel region 820 (a, b, c, d), thereby checking detailed information (b☐) of the specific event information. In this case, the displayed state of the home screen 801 layered below the panel region 820 is maintained.

After the detailed information of the unchecked events is checked, the controller 180 may return to a list of objects having one or more unchecked events, based on a touch input applied to the panel region 820 (i.e., may return to the previous step). For instance, as shown in FIG. 8B, a corresponding operation may be performed by using a back key layered below the panel region 820 and viewed semi-transparently at a lower end (on the left side) of the panel region 820. For this, if a touch input is applied to the left side of the lower end of the panel region 820, the controller 180 may recognize the touch input as a touch input with respect to the back key layered below. If a proximity touch applied to the back key is sensed, a transparency of a corresponding position may be increased in order to induce a touch input, or the back key may move to the panel region 820 as if it floats onto a water surface. If a touch input is applied to the back key viewed on the panel region 820, the list of objects having one or more unchecked events is re-displayed on the panel region 820.

When the information related to one or more unchecked events output to the panel region 820 disappears, a graphic change indicating a checked state of the corresponding unchecked event may be simultaneously applied to the panel region 820 and the home screen 801 layered below. For instance, as shown in FIG. 8B, an object having its unchecked events checked, may disappear from the list displayed on the panel region 820, or badge-type notification information attached to a corresponding object 812 may disappear from the home screen 801. In this embodiment, a user may rapidly check unchecked events with a single hand, by using the panel region 820, while a displayed state and an activated state of a current screen are maintained.

Figure 8C:
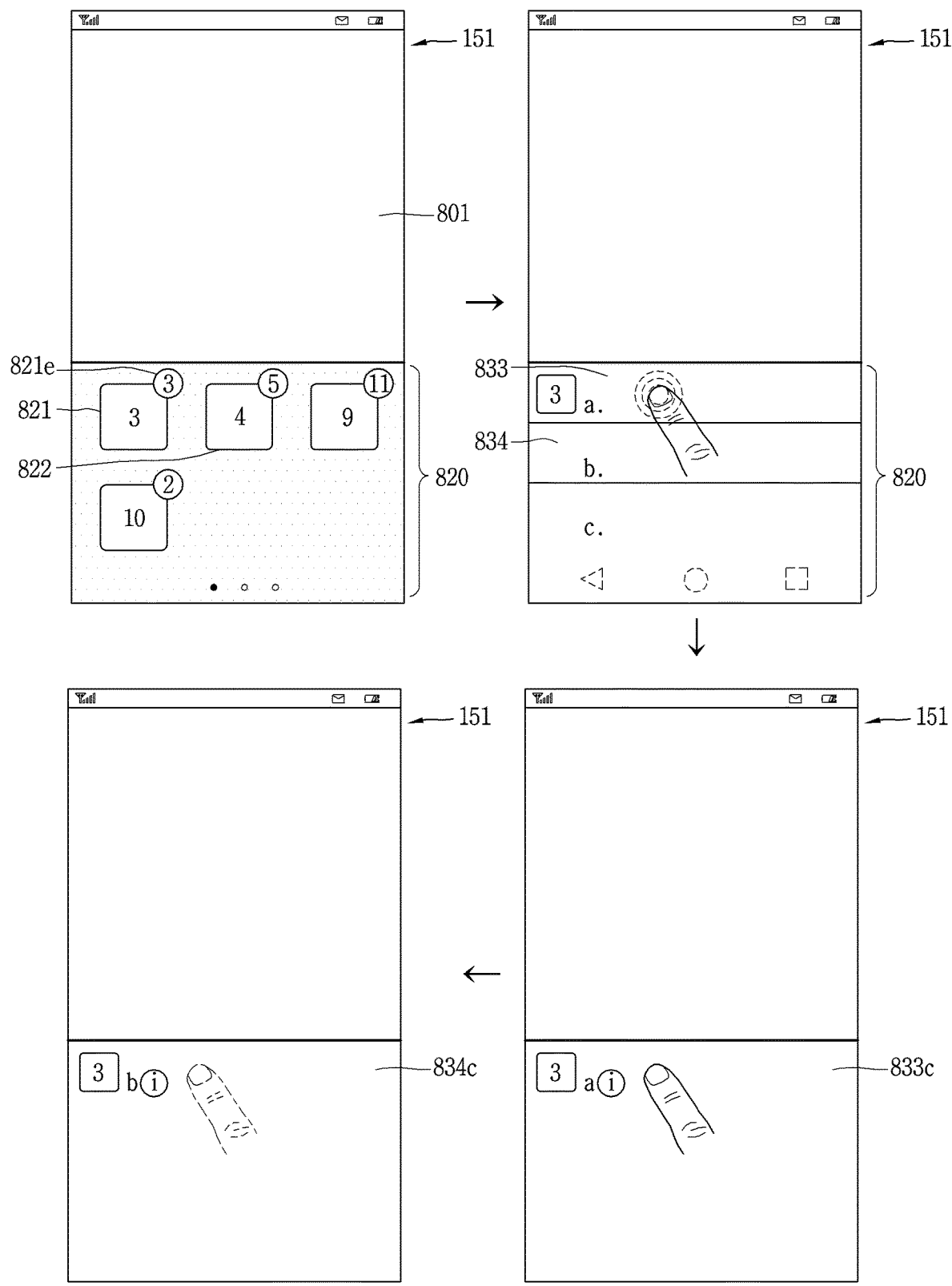

FIG. 8C shows an example to rapidly control information related to an unchecked event, based on a touch input applied to a panel region.

Referring to FIG. 8C, while a list of objects 821, 822 having unchecked events is being displayed on a panel region 820, a user may approach detailed information of the unchecked events, more rapidly, based on a touch degree of a touch input applied to the panel region 820. More specifically, when a touch input is applied to a specific object 821 having three unchecked events 821e on a list, information related to the three unchecked events is provided in the form of a summary or a preview (833, 834).

In this case, the controller 180 may differently control an amount of information related to a corresponding specific event, based on a touch degree of the touch input applied to the panel region 820. For instance, when the touch input applied to the specific object 821 has a large pressure, detailed information 833c on a firstly-occurred event (a) among the three unchecked events, is displayed on the panel region 820. If the detailed information 833c has a large amount, the detailed information may be automatically scrolled while the touch input is maintained, at a predetermined speed or at a speed corresponding to an intensity of the touch input. As another example, if the detailed information 833c has a large amount, a height (or size) of the panel region 820 may be upward extended temporarily, while the touch input is maintained.

If the touch input is maintained even after the detailed information 833c on the firstly-occurred event (a) has been displayed, detailed information 834c on an event (b) next-occurred from the specific object 821 may be sequentially displayed on the panel region 820.

Figure 8D:
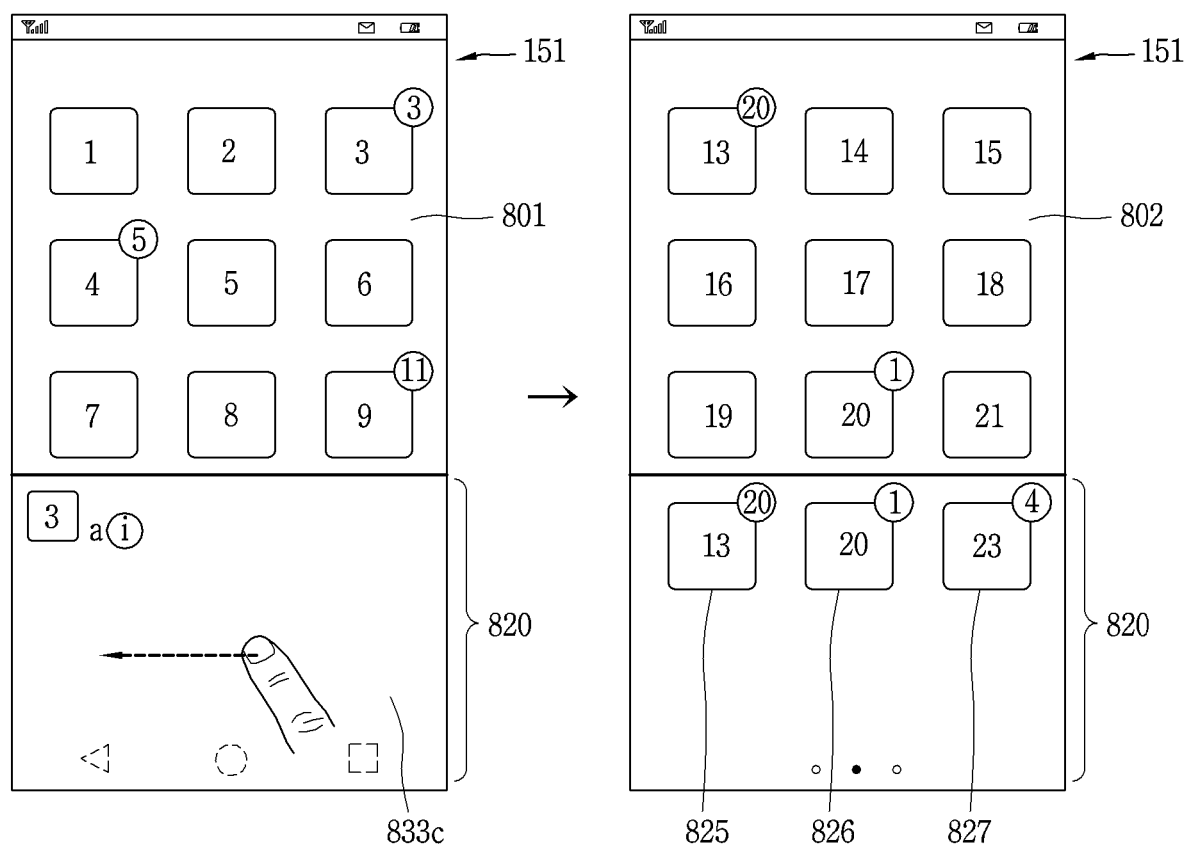

FIG. 8D illustrates an example to rapidly check unchecked events of a next/previous page of a home screen, out of detailed information. More specifically, while detailed information 833c or 834c of unchecked events is being displayed, if a drag touch input (or a flicking touch input/a swipe touch input) is applied to a panel region 820 or a home screen 801 layered below, a next or previous page 802 of the home screen, corresponding to a drag direction, is displayed. As a result, objects 825, 826, 827 having one or more unchecked events, corresponding to the changed page, are displayed on the panel region 820 in a collected manner.

As another example, FIGS. 9 and 10A-10D illustrate various examples of a method for controlling an execution screen of a message application, by using a panel region.

Figure 9:
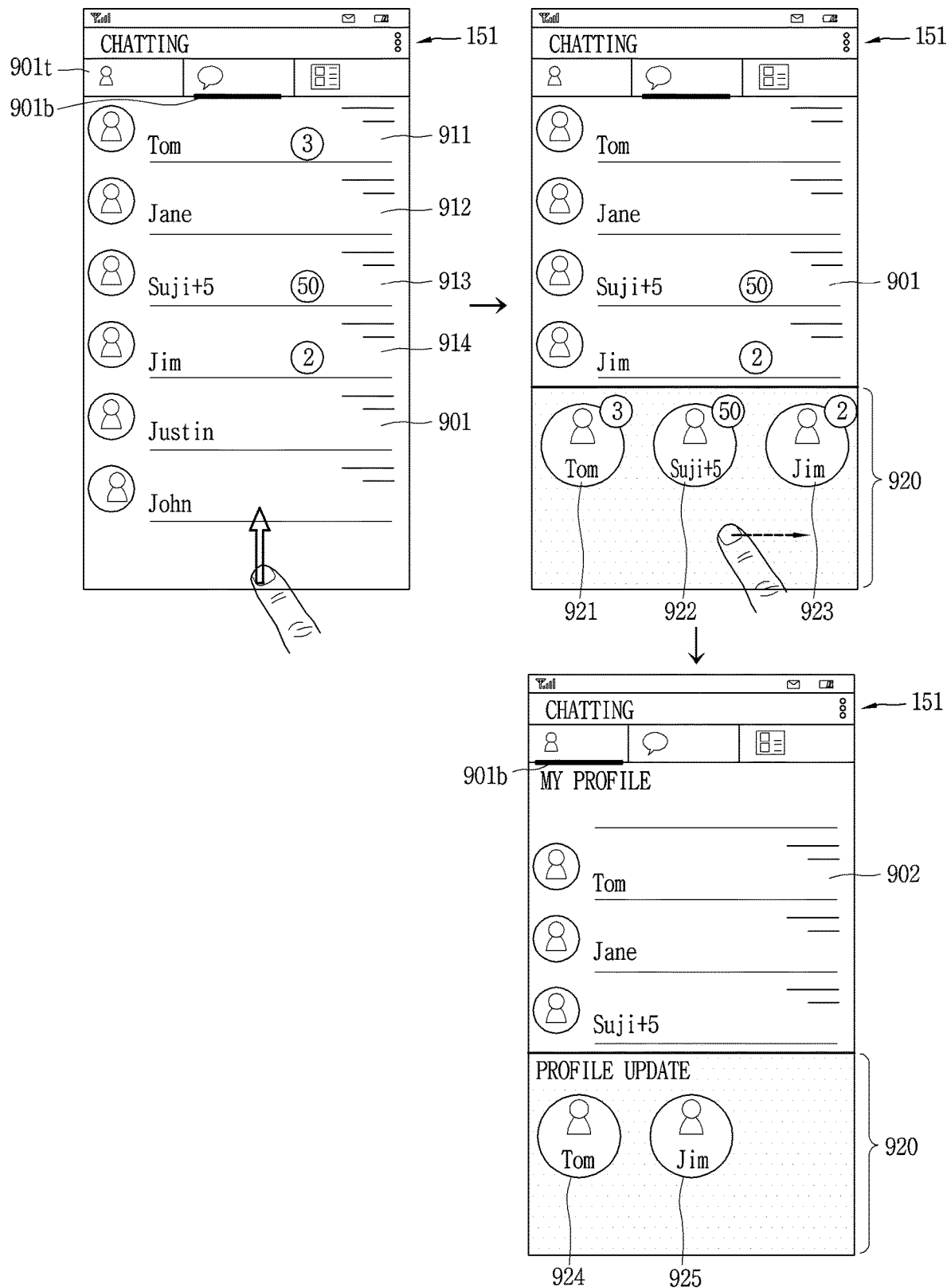
FIGS. 9 and 10A~10D are conceptual views illustrating various examples of a method for controlling an execution screen of a message application, by using a panel region, according to an embodiment of the present invention.

Referring to FIG. 9, an execution screen 901 of a message application may be displayed on the touch screen 151. The execution screen 901 may correspond to one of a plurality of tabs. An indicator bar 901t, including a plurality of regions where tab information has been displayed, may be displayed on an upper end of the execution screen 901. And a moving bar 901b, indicating a position of a current tab, may be displayed on a lower end of the indicator bar 901t.

A list of a plurality of chatting room items 911, 912, 913, 914 corresponding to chatting room tabs, may be displayed on the execution screen 901. Here, if a touch input applied to a lower end of the execution screen 901 is upward dragged, the controller 180 may determine a type of information to be provided to a panel region 920, by recognizing a position of a current tab corresponding to the displayed execution screen 901.

For instance, as shown in FIG. 9, chatting room icons 921, 922, 923 having unchecked messages on a currently-displayed chatting room tab may be selectively provided to the panel region 920. Here, information on the number of unchecked messages may be displayed on each of the chatting room icons 921, 922, 923, in the form of a badge.

Next, if a drag touch input (or a flicking touch input/a swipe input) is applied to the panel region 920 or the execution screen 901 in a horizontal direction, the current tab layered on the panel region 920 is converted into another tab corresponding to a drag direction. For instance, the chatting room tab (first tab) 901 may be converted into another party search tab (second tab) 902. A list of other persons stored in a contact information list of the mobile terminal may be displayed on the second tab 902.

Information provided to the panel region 920 is changed to a type corresponding to a converted tab. Accordingly, as shown in FIG. 9, the chatting room icons 921, 922, 923 having unchecked messages are changed into other person icons 924, 925 which have undergone a profile update process. In this case, while a page turning effect is applied to the panel region 920, a part of the chatting room icons 921, 922, 923 having unchecked messages and a part of said other person icons 924, 925 which have undergone a profile update process may be together displayed, according to a drag degree and a drag direction of a drag touch input applied to the panel region 920 or the execution screen 901.

In an embodiment, in a case where a tab conversion is performed based on a touch input applied to the indicator bar 901t, it is determined that a user is using two hands for control. Accordingly, the panel region serving as a supplementary screen may be removed. In this case, the controller 180 may control a visual effect to be output, the visual effect indicating that the panel region is being gradually inserted into a lower end of the touch screen 151.

Figure 10A:
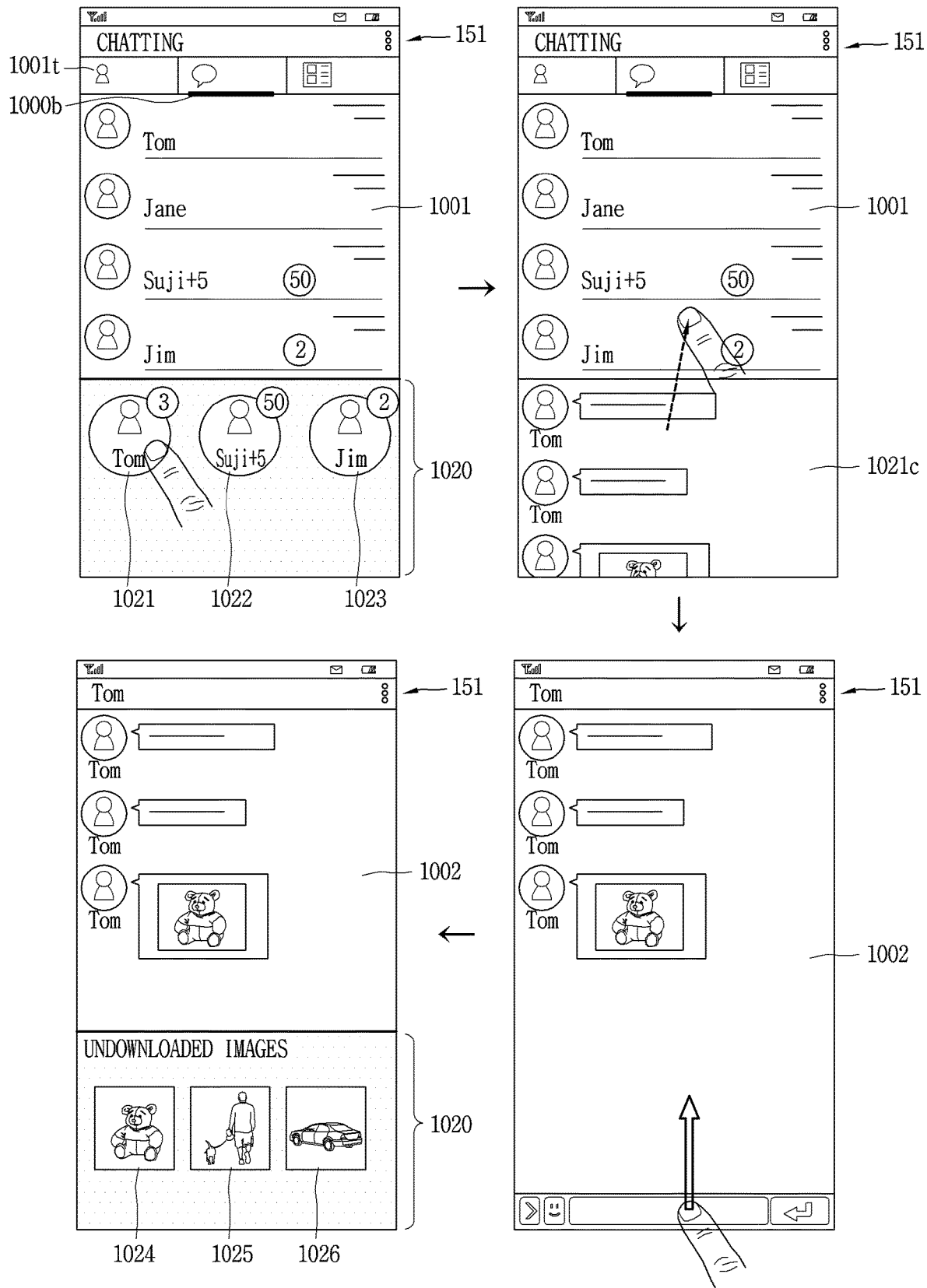
Figure 10B:
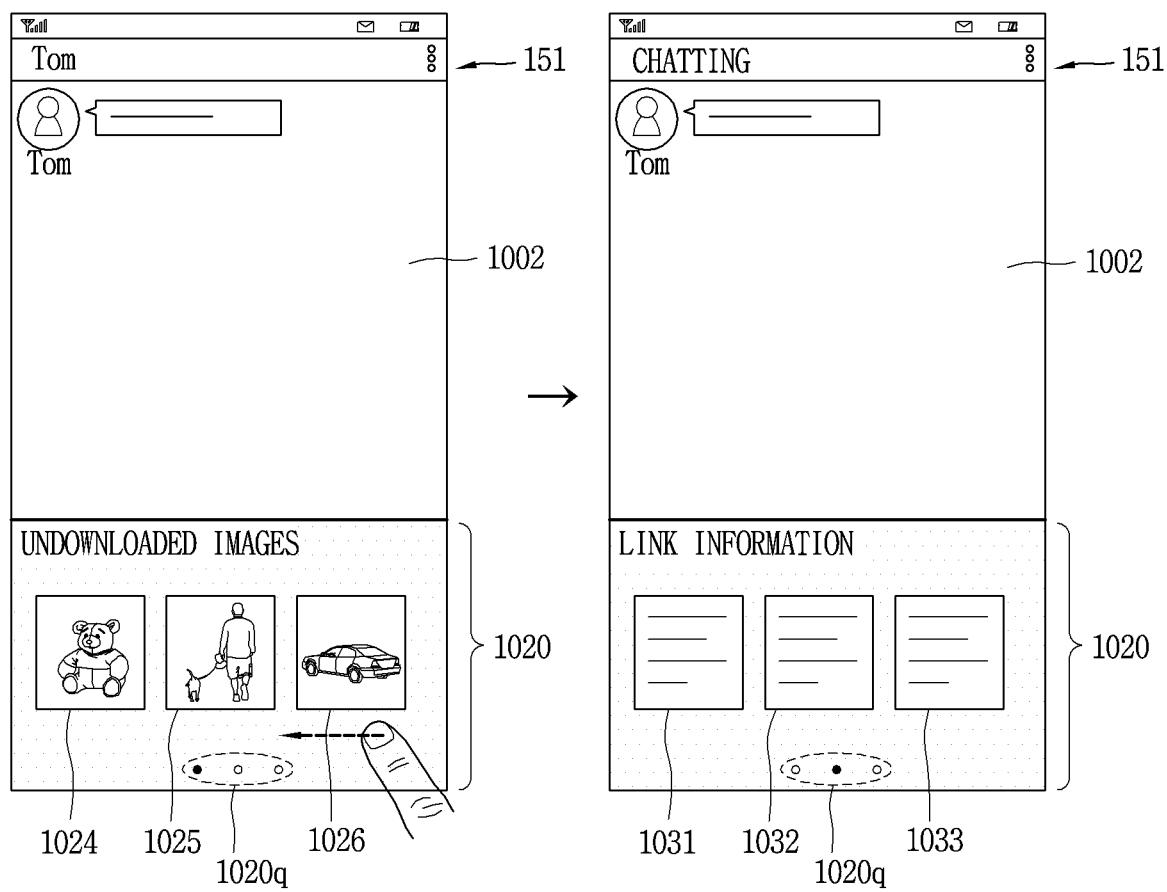
Figure 10C:
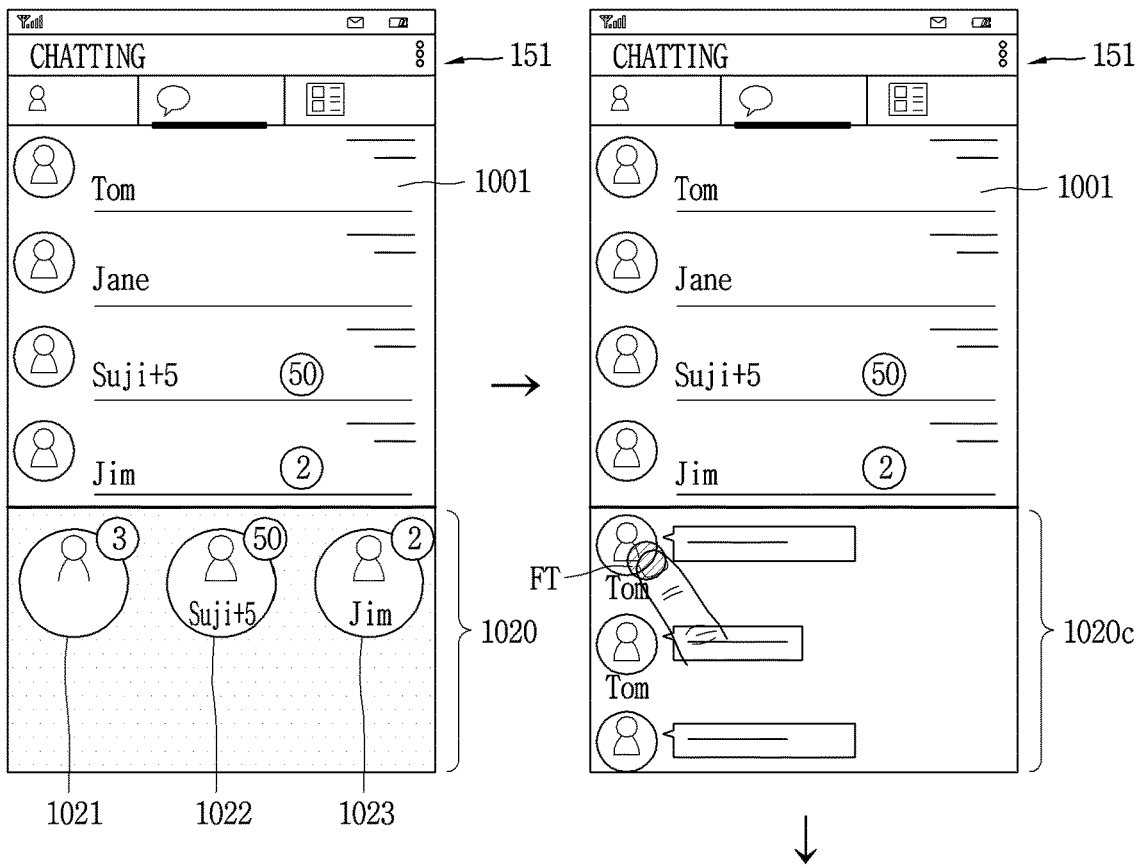

FIGS. 10A and 10B show detailed examples to interact between a panel region and a page layered below the panel region, based on a touch input.

Referring to FIG. 10A, while a moving bar 1000b is fixed to a chatting room tab among a plurality of tabs 1001t corresponding to execution of a message application, a page 1001 which displays a plurality of chatting room items is displayed on a touch screen 151. In this case, chatting room icons 1021, 1022, 1023 having unchecked messages are displayed on a panel region 1020 withdrawn based on a preset touch gesture.

If a touch input is applied to the specific chatting room icon 1021 of which unchecked messages are to be checked, a chatting screen 1021c corresponding to the specific chatting room icon 1021 may be provided onto the panel region 1020, or only unchecked messages may be provided in the form of a preview. Alternatively, unchecked events received from a chatting room corresponding to the specific chatting room icon 1021, e.g., various information such as sending money (remittance), received images, links, presents, schedules and account numbers, are provided onto the panel region 1020. In this case, the display state of the page 1001 layered below the panel region 1020 is maintained.

If the touch input applied to the specific chatting room icon 1021 is not released, or if a touch input consecutively applied to any point on the chatting screen 1021c is dragged to a region on the page 1001 out of the panel region 1020, the controller 180 generates an image having its size increased gradually, on the panel region 1020. And an exposed degree of the chatting screen corresponding to the specific chatting room icon 1021 is gradually increased with the image. That is, an exposed degree of the chatting screen output to the panel region 1020 may be linearly changed. In this case, if a preset color (e.g., light gray) is applied to the panel region 1020, it can be visually seen that a region of the page 1001 blocked by the panel region 1020 is gradually increased, as the size of the panel region 1020 is gradually changed.

The controller 180 may differently process the selected specific chatting room icon 1021 or the chatting screen 1021c, according to a release point of a drag touch input. More specifically, if a release point of a drag touch input applied to the panel region does not exceed the center of the touch screen 151, the exposed degree of the chatting screen may be gradually decreased such that the size of the panel region 1020 may return to the original state. On the other hand, if a release point of a drag touch input applied to the panel region exceeds the center of the touch screen 151, the upper end of the panel region 1020 is fixed to a horizontal line corresponding to the release point of the drag touch input.

If a release point of a drag touch input applied to the panel region exceeds a predetermined range (e.g., about ⅔ of the touch screen), the size of the panel region is enlarged to the entire region of the touch screen 151. Then, if a predetermined time (e.g., 1~2 seconds) lapses, the page layered below the panel region is converted into the chatting screen output to the panel region, and the panel region disappears from the touch screen 151. For instance, a drag touch input applied to the panel region 1020 (e.g., a light gray display region on the panel region 1020) is linearly increased to the entire region of the touch screen 151 along a path of the drag touch input, and then disappears after a predetermined time lapses. As a result, the page layered effect is also removed.

With such a configuration, a user needs not scroll pages repeatedly, in order to search a chatting room where there are old unchecked messages. Further, unchecked messages may be rapidly checked through the panel region while the current page is maintained, and an interesting visual effect may be provided when the mobile terminal enters a chatting room by using the panel region.

Even after entering a specific chatting room 1002 by using the panel region, as shown in FIG. 10A, a user may recall the panel region 1020 by applying an upward drag touch input starting from a lower end of the touch screen 151 (or a flicking touch input).

In this case, the controller 180 may search information included in the displayed chatting room 1002 (e.g., dialogue content) according to a first reference, in response to a preset touch gesture applied to the touch screen 151. And the controller 180 may provide first search information obtained as a result of the search, to the panel region. For instance, the controller 180 may provide undownloaded images 1024, 1025, 1026 among images shared on the displayed chatting room 1002, to the panel region 1020, in a collective manner.

The controller 180 may differently process the first search information provided onto the panel region, based on a type of a touch input applied to the panel region. For instance, when a short touch input is applied to one of the undownloaded images 1024, 1025, 1026 displayed on the panel region 1020, a user may enter a detailed view of the corresponding image through the panel region. As another example, when a long touch or a double-short touch is applied to one of the undownloaded images 1024, 1025, 1026, the images provided to the panel region may be converted into a download execution screen of the corresponding image. As another example, if a touch input applied to one of the undownloaded images 1024, 1025, 1026 is dragged to the displayed chatting room 1002, a chatting screen at a time point when the corresponding image has been shared is displayed on the entire region of the touch screen 151. This may provide another search reference to search for a specific chatting time point with respect to a chatting screen.

FIG. 10B shows an example to rapidly change a search reference based on a touch input applied to a panel region.

Referring to FIG. 10B, while the chatting room 1002 to chat with a specific person ('Tom') is being displayed on the touch screen 151, undownloaded images 1024, 1025, 1026 shared on the corresponding chatting room (hereinafter, 'first search information') may be provided to a panel region 1020 which covers a lower part of the chatting room 1002. In this case, a dot-type queue image 1020q, indicating a position of a current tab and existence of another search reference, may be displayed on a lower end of the panel region 1020.

While the first search information is being displayed on the panel region 1020, if a drag touch input is applied to the panel region 1020, the controller 180 searches for chatting content of the chatting room 1002 layered below the panel region 1020, according to a second reference. Then, the controller 180 converts the first search information provided to the panel region 1020, into second search information corresponding to the second reference. For instance, the controller 180 may provide only link information 1031, 1032, 1033 shared on the chatting room 1002, onto the panel region 1020. In this case, a dot-type image indicating a changed tab position is displayed on a lower end of the panel region 1020.

A method for controlling the link information 1031, 1032, 1033 provided onto the panel region 1020, may be implemented by the examples shown in FIG. 10A. The aforementioned first and second references are merely exemplary. That is, various search references such as a reference set based on content of exchanged messages (e.g., frequently-used keywords) or a reference set based on a chatting time (e.g., a specific date/period) may be applied. With such a configuration, it is possible to check specific type of information in a collective manner, or to rapidly search a chatting time when specific information has been shared, while an activated state of a chatting screen currently displayed is maintained.

Figure 10D:
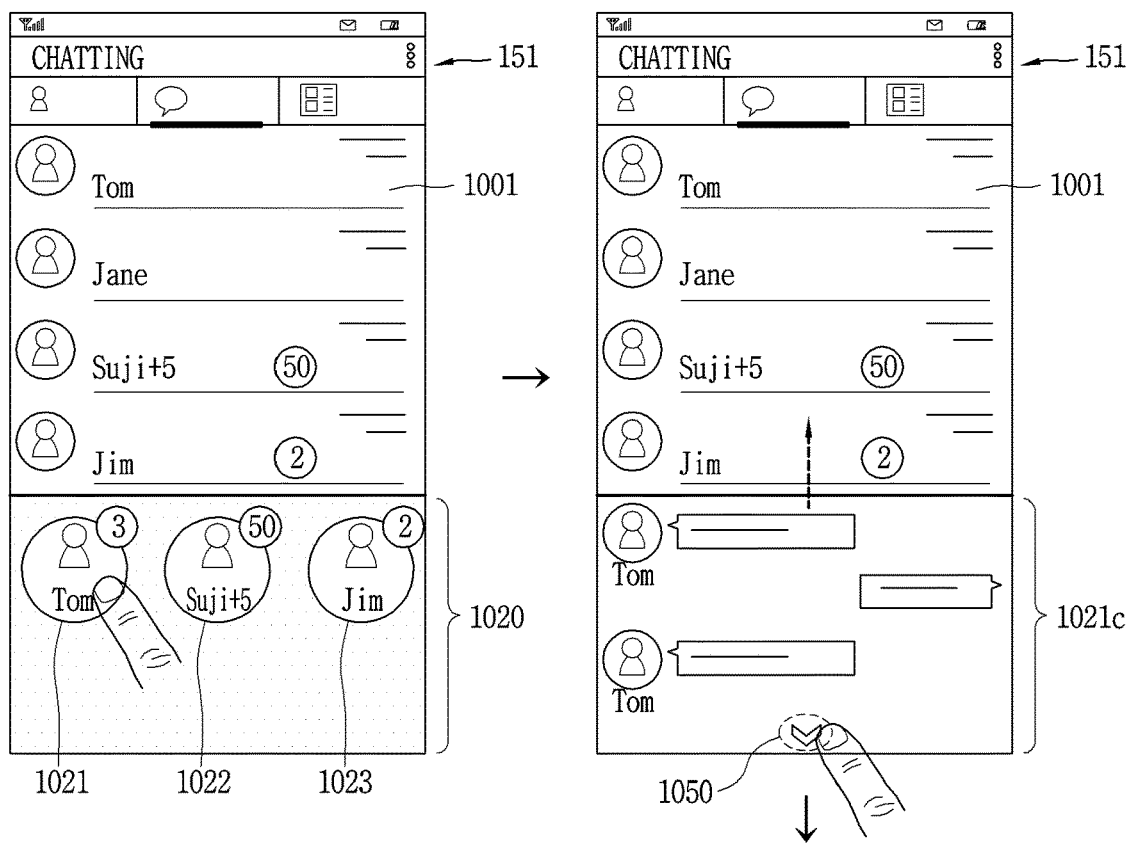
Figure 10D:
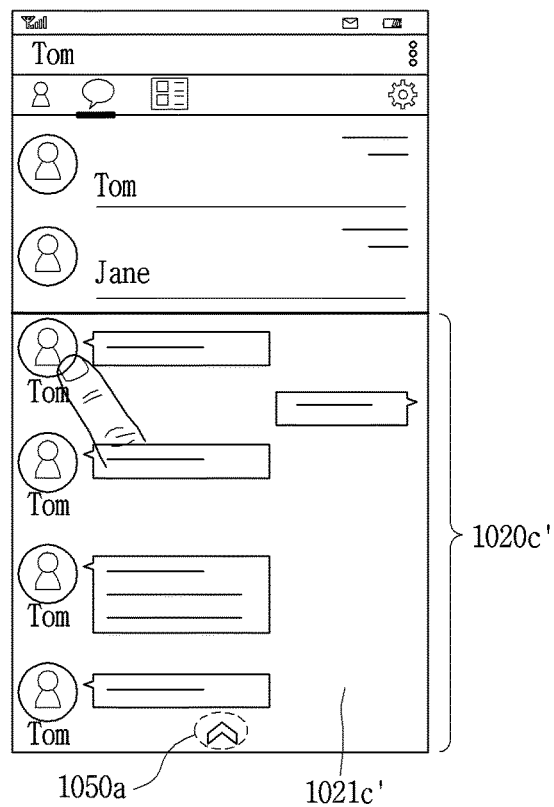

Next, FIGS. 10O and 10D illustrate different examples to change a size of a panel region in order to check detailed information.

Referring to FIG. 10O, in a case where chatting room icons 1021, 1022, 1023 having unchecked messages are selected from a chatting room list 1001 displayed below a panel region 1020 to be provided onto the panel region 1020, chatting rooms having unchecked messages may be accessed based on a touch input applied to the panel region 1020. In this case, a user may enter the chatting rooms having unchecked messages while the activated state of the chatting room list 1001 displayed below the panel region 1020 is maintained.

If a touch input is applied to the specific chatting room icon 1021 among the chatting room icons 1021, 1022, 1023 displayed on the panel region 1020, the controller 180 accesses a chatting room corresponding to the specific chatting room icon 1021, and provides an access result 1020c through the panel region.

In this case, a displayed degree of the access result is variable according to a touch degree of the touch input applied to the specific chatting room icon 1021. For instance, as shown in FIG. 10O, if the touch input applied to the specific chatting room icon 1021 has a high pressure, the height of the panel region is increased 1020' to provide more a larger amount of access result, i.e., a larger amount of content of dialogues exchanged on the corresponding chatting room. In this case, if the pressure of the touch input is decreased, the height of the panel region is decreased to reduce the amount of access result.

As another example, if a touch input is applied to the specific chatting room icon 1021, only a predetermined amount of access result (1021c) may be output to the panel region 1020. In this case, an indicator to check a larger amount of access result, e.g., an arrow-type guide object 1050, may be displayed on a lower end of the panel region. If a user touches the guide object 1050, the height of the panel region may be linearly increased (1020c') while the touched state is maintained, and a larger amount of access result may be provided. Once all of the access result is scrolled, the image of the guide object provided to the lower end of the panel region is changed (1050a) for user's recognition.

Figure 11A:
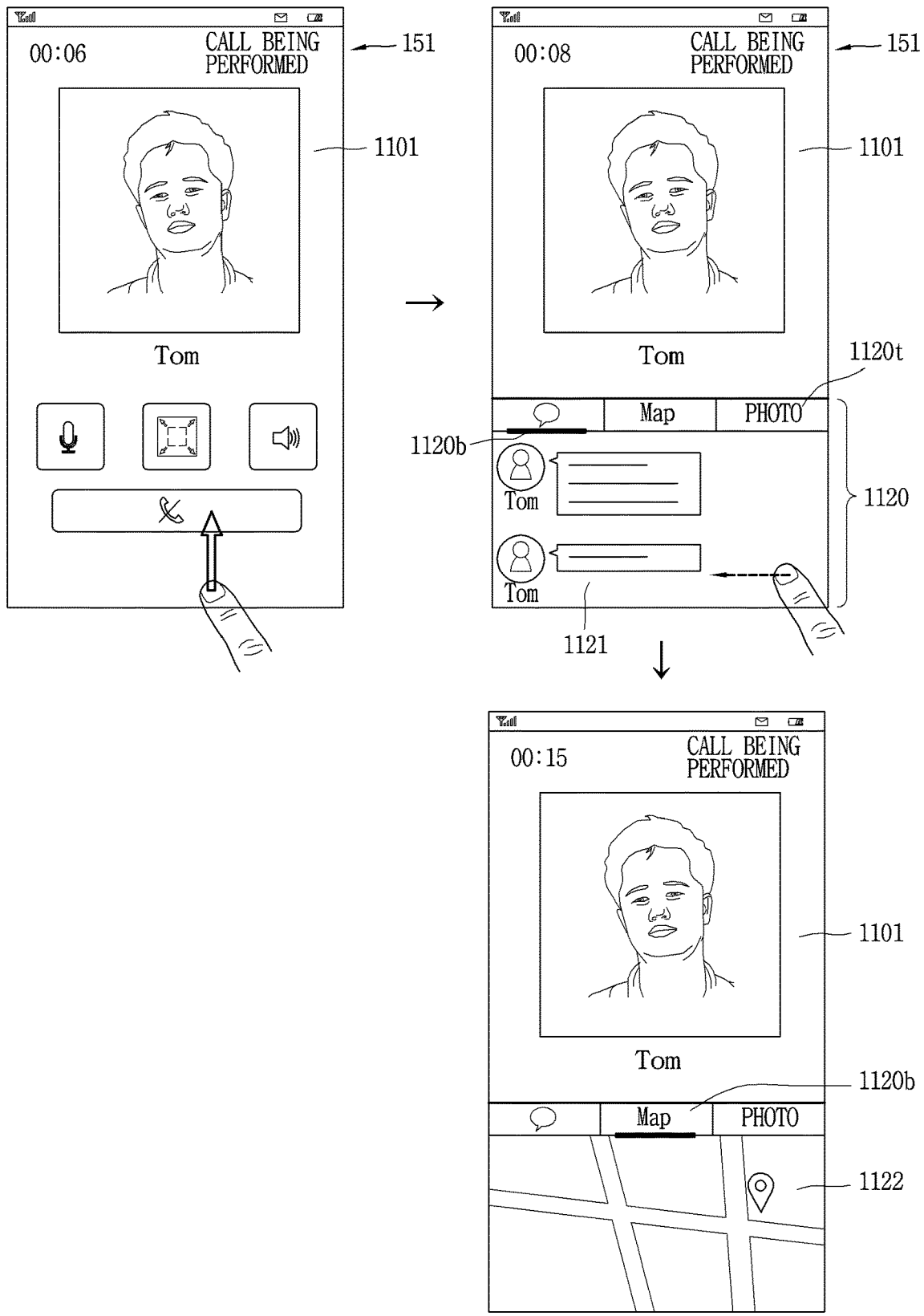
FIGS. 11A and 11B are conceptual views illustrating a method of controlling information related to another party during a call, by using a panel region, according to an embodiment of the present invention.
Figure 11B:
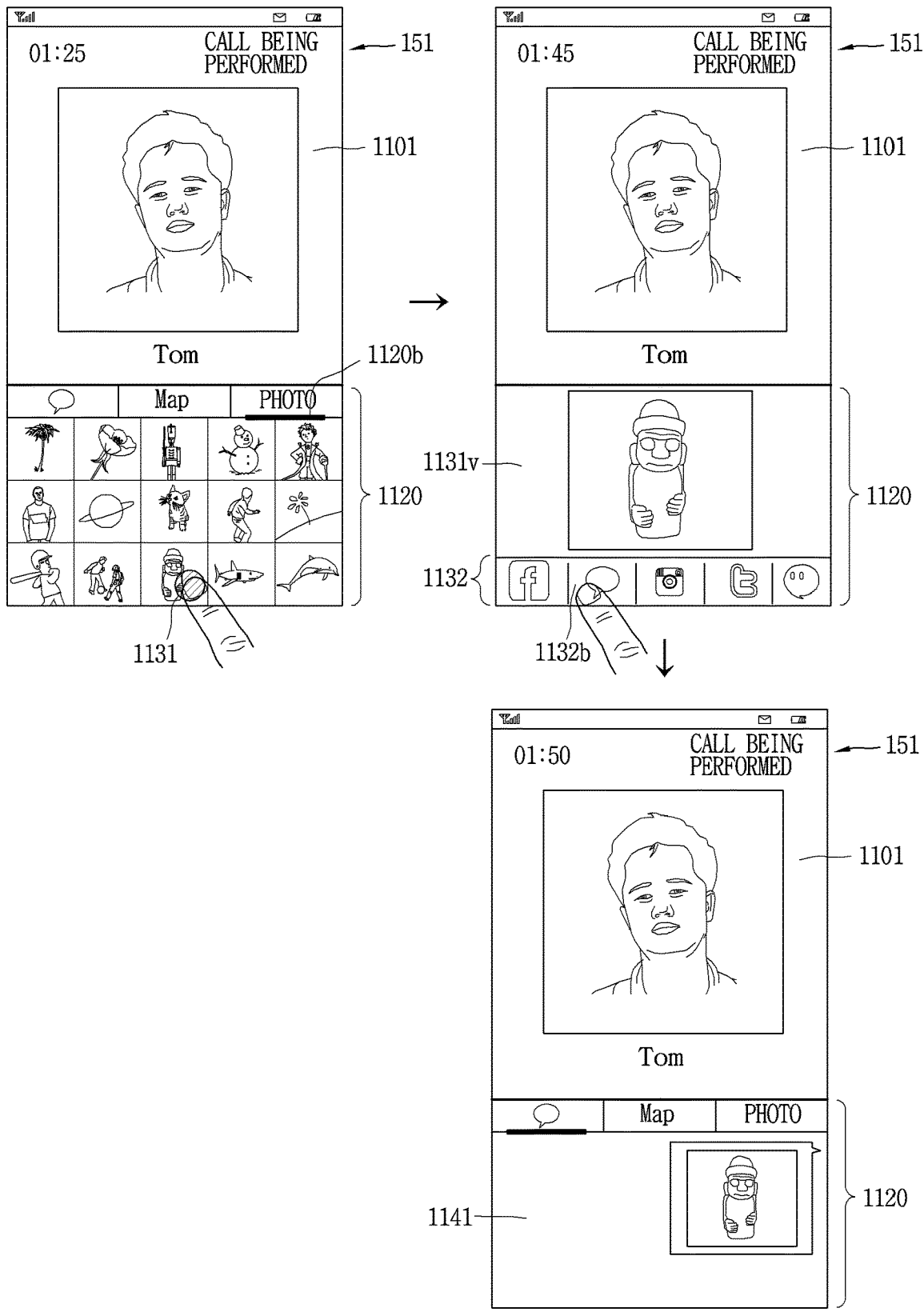

FIGS. 11A and 11B are conceptual views illustrating a method of controlling information related to another party during a call, by using a panel region, according to an embodiment of the present invention.

Referring to FIG. 11A, while a voice/video call is performed by using the mobile terminal, a call screen 1101 may be displayed on the touch screen 151. If a preset touch gesture is applied to the touch screen 151 during a call, a plurality of tab menus 1120t including information on another party may be provided on a panel region 1120. For instance, as shown in FIG. 11A, a message chatting screen 1121 showing messages exchanged with another party may be provided on a first tab menu, and a map screen indicating a current position of said another party may be provided on a second tab menu. And photos shared with said another party may be provided on a third tab menu.

While the message chatting screen 1121 corresponding to the first tab menu is being displayed on the panel region 1120, if a drag touch input (or a flicking input/a swipe input) is applied to the panel region 1120 in a horizontal direction, or if a touch input is applied to the plurality of tab menus, a moving bar 1120b displayed on a lower end of the plurality of tab menus 1120t moves from the first tab menu to the second tab menu. In this case, the displayed state of the call screen 1101 layered below the panel region 1120 is maintained, and only the message chatting screen 1121 on the panel region 1120 is converted into a map screen 1122 corresponding to the second tab menu. This is advantageous in that a user can search information related to another party through the panel region 1120, while continuously performing a video call.

The controller 180 may change a type, an arrangement order, etc. of the tab menus provided on the panel region 1120, according to another party and calling content. For instance, as shown in FIG. 11A, if a user has not much chatted with another party in the form of an instant message, the message chatting screen 1121 corresponding to the first tab menu may not be provided or may be provided as the last tab. As another example, if a user chats about a specific application (e.g., an e-mail application) during a call, an execution screen of the e-mail application may be preferentially provided to the first tab menu of the panel region 1120. As another example, if a user continuously chats about a specific place name during a call while a map screen is being provided to the panel region 1020, information related to a position ('first position') indicated by the specific place name and a current position ('second position'), e.g., a distance between the first and second positions, may be displayed on the map screen of the panel region 1020.

A type and an arrangement order of tab menus provided to the panel region 1120 during a call, may be dynamically changed during the call.

FIG. 11B shows a detailed example to control information provided to a plurality of tab menus, during a call. While a call screen 1101 is being displayed, if a photo tab is selected from a plurality of tab menus provided to a panel region 1120 (e.g., a moving bar 1120b moves to a third tab menu), a plurality of images shared with another party, or a plurality of images stored in a gallery application of the mobile terminal are provided to the panel region 1120 in the form of thumbnails.

If a specific image 1131 among the displayed thumbnail images is touched, a detail view 1131v of the specific image 1131 is displayed on the panel region 1120.

While a specific content is being displayed on the panel region 1120, if a preset touch gesture (e.g., an upward drag input starting from the lower end of the touch screen 151, or a flicking input) is applied once more, a sub panel region 1132 which provides function icons related to the information output to the panel region 1120 is withdrawn from the lower end of the panel region 1120. In this case, it may be expressed that the sub panel region 1132 is layered on a part of the panel region 1120. And it may be expressed that a part of the panel region 1120 is layered below the sub panel region 1132.

A plurality of function icons, related to a specific contact displayed on the panel region 1120 (i.e., the detail view 1131v of a specific image), may be provided onto the sub panel region 1132. If a drag input is applied to the sub panel region 1132 right and left, the plurality of function icons may be scrolled such that other function icons may be displayed along a path of the drag input. If a downward drag input is applied from an upper end of the sub panel region 1132 or any point of the panel region 1120 towards the lower end of the touch screen 151, the sub panel region 1132 may disappear with a visual effect that the sub panel region 1132 is being introduced to the lower end of the touch screen 151.

If a touch input is applied to a specific icon (e.g., a message application icon 1132b) included in the sub panel region 1132, the detail view 1131v displayed on the panel region 1120 is transmitted to another party's terminal through a message application. Then, the sub panel region 1132 disappears, and a message transmission result 1141 is displayed within the panel region 1120. In this case, if the message transmission result 1141 is displayable on one of the plurality of tab menus generated on the panel region 1120, a current tab menu ('second tab menu') of the panel region 1120 is automatically converted into another tab menu ('first tab menu') which can display the message transmission result 1141, as shown in FIG. 11B.

In an embodiment, if the call corresponding to the call screen 1101 is terminated, the various tab menus provided to the panel region 1120 may disappear. That is, the tab menus provided to the panel region 1120 may be provided while the call is maintained, and information related to a screen (e.g., a recent call recording screen) displayed before the call starts may be provided to the panel region 1120 when the call is terminated.

In this embodiment, while the displayed state of the call screen is maintained, information related to another party or a call content during a call may be checked, or relevant information may be immediately processed during the call. This may be very advantageous to a video call, especially.

Figure 12A:
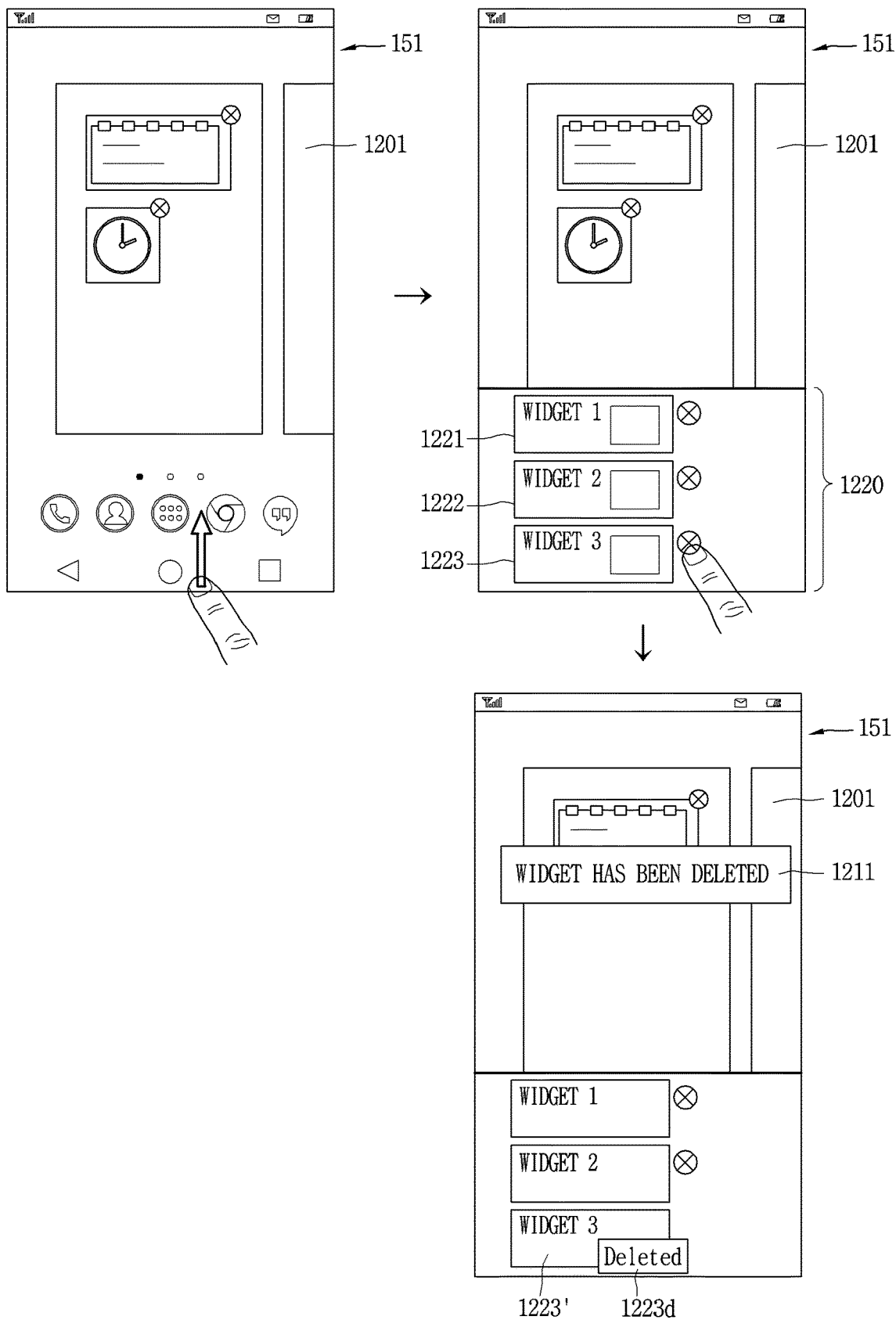
FIGS. 12A and 12B are conceptual views illustrating a method of editing objects included in a home screen, by using a panel region, according to an embodiment of the present invention.
Figure 12B:
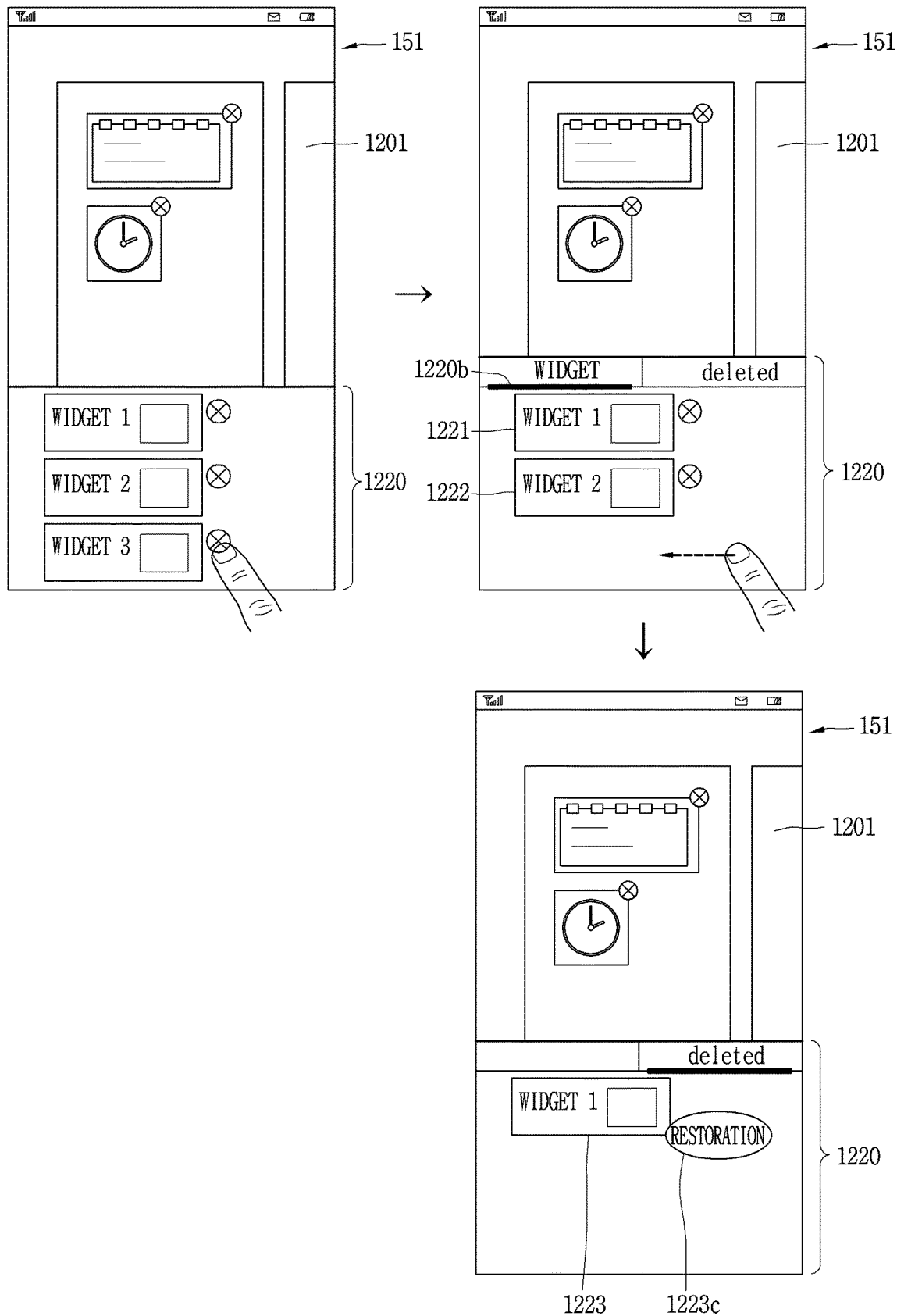

FIGS. 12A and 12B are conceptual views illustrating a method of editing objects included in a home screen, by using a panel region, according to another embodiment of the present invention.

Referring to FIG. 12A, while an edition screen 1201 of a home screen is being displayed on the touch screen 151, if an upward drag touch input starting from the lower end of the touch screen 151 (a flicking input or a swipe input) is applied, a plurality of deletable objects included in the edition screen 1201 of the home screen may be displayed within a withdrawn panel region 1220. That is, a user may edit the objects of the home screen disposed at an upper side of the touch screen 151 by using the panel region 1220, while holding the mobile terminal with one hand.

More specifically, a plurality of erasable objects (e.g., widget icons 1221, 1222, 1223) may be displayed on the panel region 1220 in the form of a list, and each of the plurality of objects may be provided with a deletion icon ('x'). A user may rapidly delete a desired object among the plurality of objects provided to the panel region 1220, with one hand, by touching the deletion icon attached to the desired object. In this case, if a swipe input is applied to the panel region 1220 right and left or up and down in order to search a desired object to be deleted, the objects provided to the panel region 1220 may be scrolled along a direction of the swipe input, and other objects of the home screen may be displayed.

If a touch input is applied to the deletion icon attached to a specific object (e.g., widget 3 icon) among the plurality of objects (e.g., widget icons 1221, 1222, 1223) provided to the panel region 1220, the widget 3 icon is deleted from the panel region 1220 and the edition screen 1201 of the home screen. As a result, an indicator 1211 indicating that the deletion of the widget 3 icon may be displayed on the edition screen 1201, and then may disappear. Further, the widget 3 icon displayed on the panel region 1220 may be provided with deletion information 1223d differentiated from the other icons 1221, 1222. The deleted widget 3 icon may be provided to the panel region for a preset time (e.g., 24 hours), and the deleted state thereof may be cancelled based on a touch input applied to the panel region.

As another example, referring to FIG. 12B, as a touch input is applied to a specific object (e.g., widget 3 icon) among the plurality of objects (e.g., widget icons 1221, 1222, 1223) provided to the panel region 1220, a deletion tab may be generated within the panel region 1220. That is, if a touch input is applied to the deletion icon of the widget 3 icon, the other deletable icons 1221, 1222 remain in a first tab menu. And the deleted widget 2 icon is moved to a newly generated second tab menu. A user may move a moving bar 1220b provided at a lower end of the first tab menu, to a lower end of the second tab menu. Alternatively, as shown in FIG. 12B, the user may apply a swipe touch input to the panel region 1220 to check the deleted widget 3 icon 1223 or to restore the deleted widget 3 icon by using a restoration icon 1223c. As a result, the widget 3 icon 1223 in the second tab menu is moved back to the first tab menu. If one of the widgets is additionally deleted later, the deleted widget is moved to the second tab menu from the first tab menu.

Figure 13A:
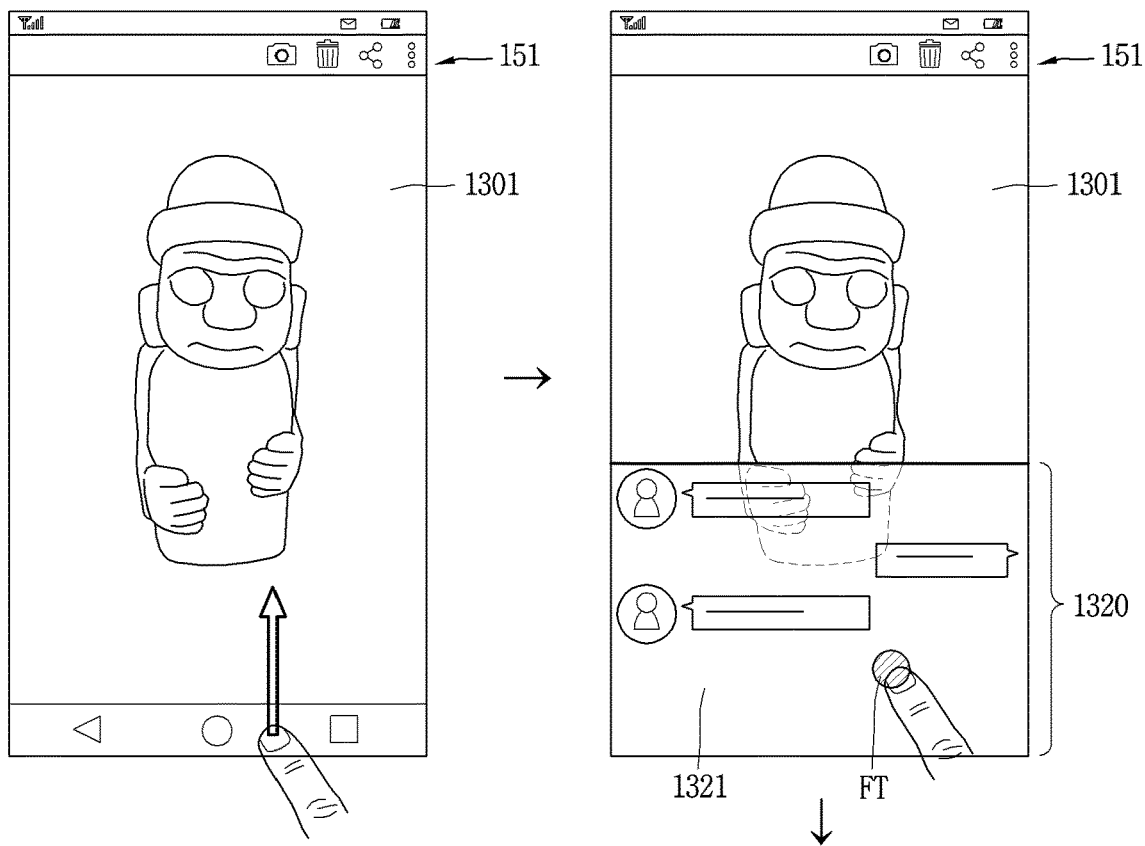
FIGS. 13A, 13B, 14 and 15 are conceptual views illustrating various examples of a method for rapidly processing content output to a touch screen, by using a panel region, according to an embodiment of the present invention.
Figure 13A:
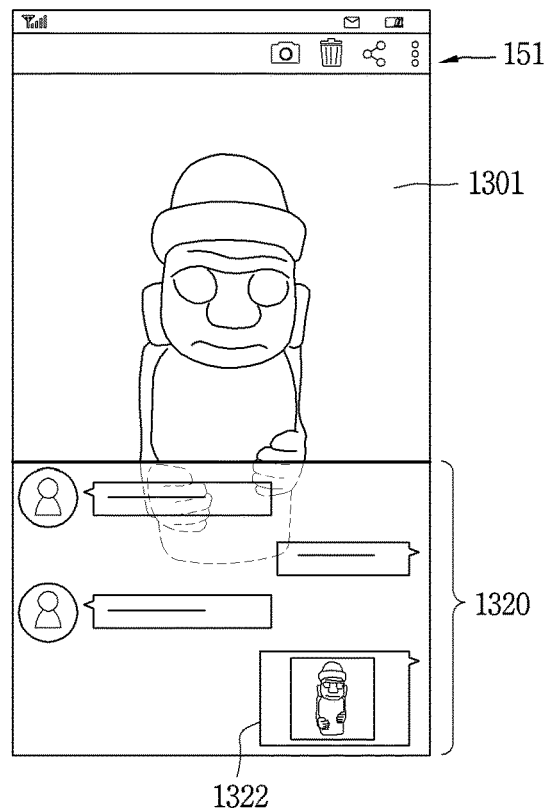
Figure 13B:
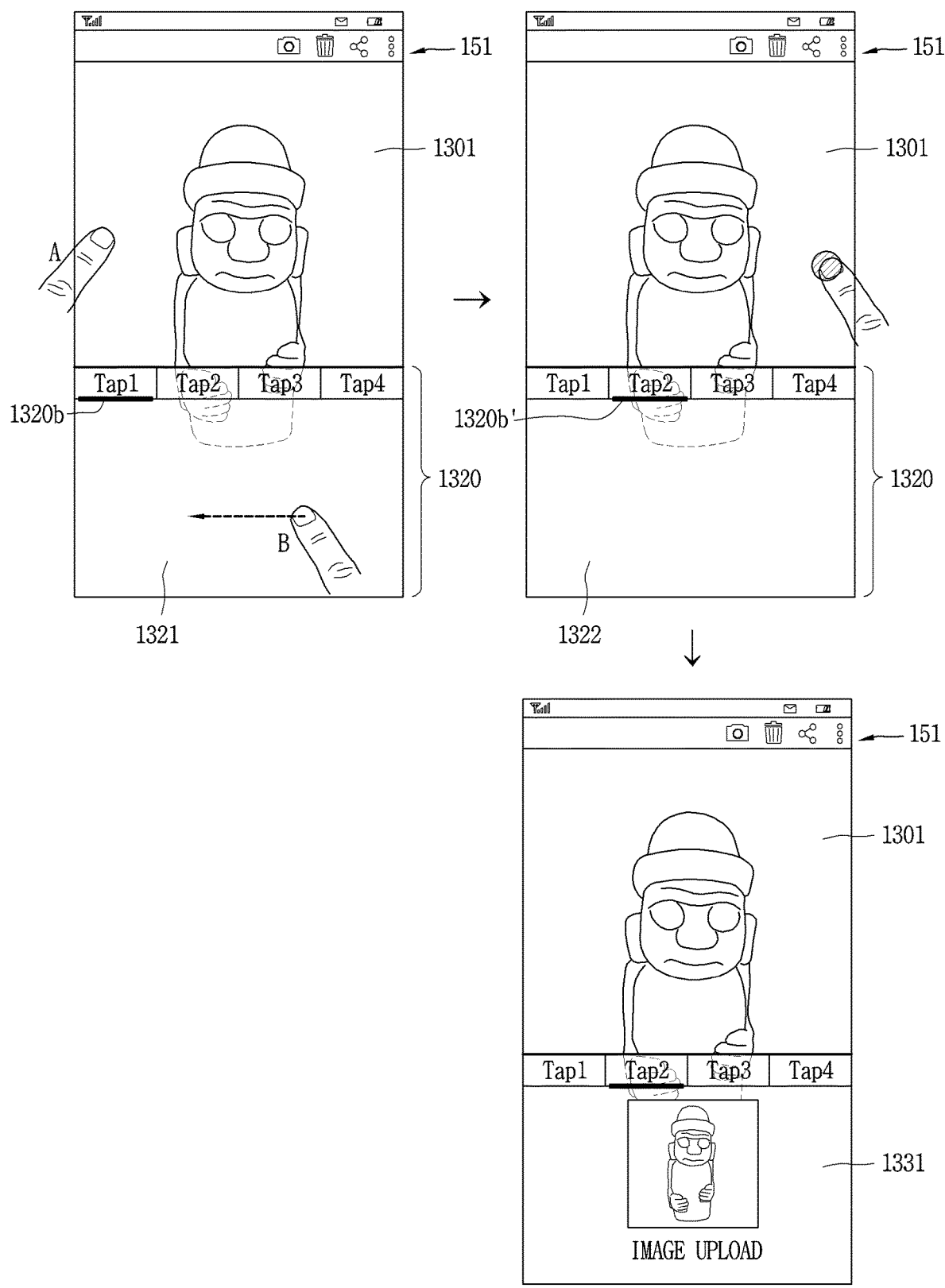

FIGS. 13A and 13B are examples to recognize a specific person's face from an image selected from a gallery application, and to provide a processing related to the selected image to a panel region. More specifically, while a specific image 1301 selected as a gallery application is executed is being displayed on the touch screen 151, the specific image 1301 may be rapidly processed by using a panel region 1320. For this, while the specific image 1301 is being displayed, if the aforementioned touch gesture is applied to the lower end of the touch screen 151, the controller 180 may recognize a type of the displayed content, and may extract a face region from the specific image 1301 for recognition. As a result, the controller 180 may provide a recent chatting room 1321 with a specific person, corresponding to the recognized face region, within the panel region 1320.

While the recent chatting room 1321 with a specific person is being displayed on the panel region 1320, if a touch input exceeding a reference pressure is applied to a background region of the recent chatting room 1321 or a region where the specific image 1301 has been output, the specific image 1301 may be transmitted to a mobile terminal of the specific person through the recent chatting room 1321. If the transmission is completed, a transmission result 1322 is output to the recent chatting room 1321 displayed on the panel region 1320. Such an operation may be also applied when a selected image is a video or when a video is being played. With such a configuration, a user may rapidly transmit a corresponding image by using the panel region having a short fingering distance (fingering distance), while a current content is being played.

As another example, as shown in FIG. 13B, while a specific content is being displayed, a plurality of tab menus related to a processing of the specific content may be generated on a panel region 1320. While the plurality of tab menus are provided to the panel region 1320, if the panel region 1320 is swiped right and left (B) while a touch input (A) applied to the specific image 1301 displayed on the touch screen 151 is maintained, the tab menus displayed on the panel region 1320 are switched from each other while the displayed state of the specific image 1301 is maintained. As a result, a moving bar displayed on a lower end of the tab menus on the panel region 1320 is moved from a first position 1320b to a second position 1320b'. And information 1321 corresponding to the tab 1 displayed on the panel region 1320 is changed into information 1322 corresponding to the tab 2.

After one of the tab menus displayed on the panel region 1320 is selected, if a touch input or a long-touch input exceeding a reference pressure is applied to the specific image 1301 displayed on the touch screen 151, the controller 180 may apply a representative function included in an execution screen of an application provided from the selected tab menu, to the specific image 1301. For instance, as shown in FIG. 13B, the displayed specific image 1301 may be uploaded through a specific SNS application, and an image upload result 1331 may be provided to the panel region 1320.

Figure 14:
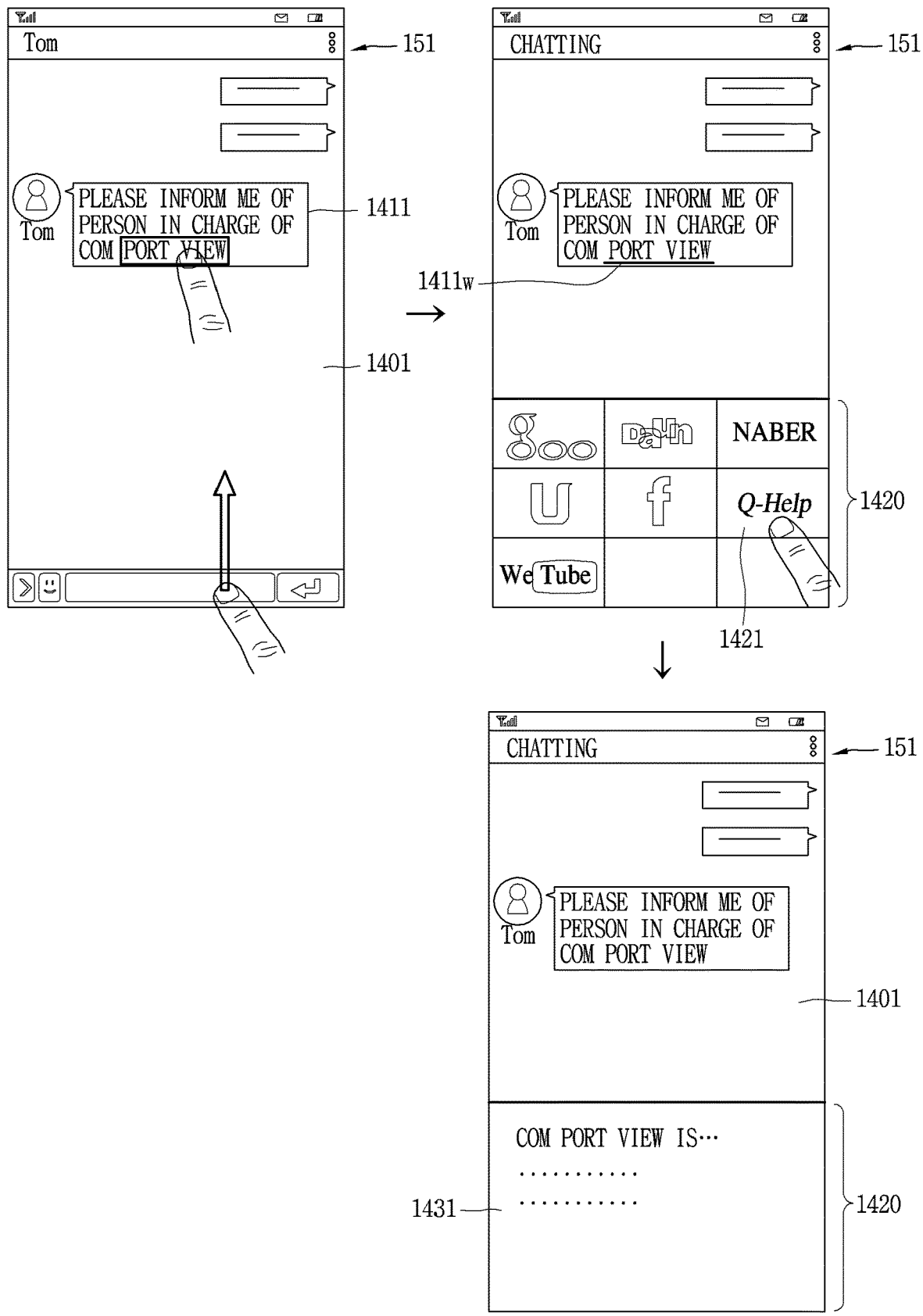

As another example, FIG. 14 shows an example to search a text selected from a touch screen, through a plurality of search engines provided to a panel region 1420.

Referring to FIG. 14, while a message-based chatting screen 1401 is being displayed, a specific text (e.g., 'COM port view') may be selected from a specific message 1411 by a long-touch input. In the selected state of the specific text (e.g., 'COM port view'), if a preset touch gesture is applied to the touch screen 151, the controller 180 may recognize the selected specific text as an input keyword. Then, the controller 180 provides a plurality of search engines for executing a search by inputting the selected specific text as a keyword, to the panel region 1420. For this, as shown in FIG. 14, the panel region 1420 may be divided into a plurality of search engine regions.

If a specific search engine 1421 is selected from the panel region 1420, the selected specific text is automatically input as a key word. Then, a search result 1431 of the specific search engine 1421, e.g., a definition of the input key word, is provided to the panel region 1420. In this case, if a swipe touch input is applied to the panel region 1420 right and left, a search result by another search engine may be provided to the panel region 1420.

Figure 15:
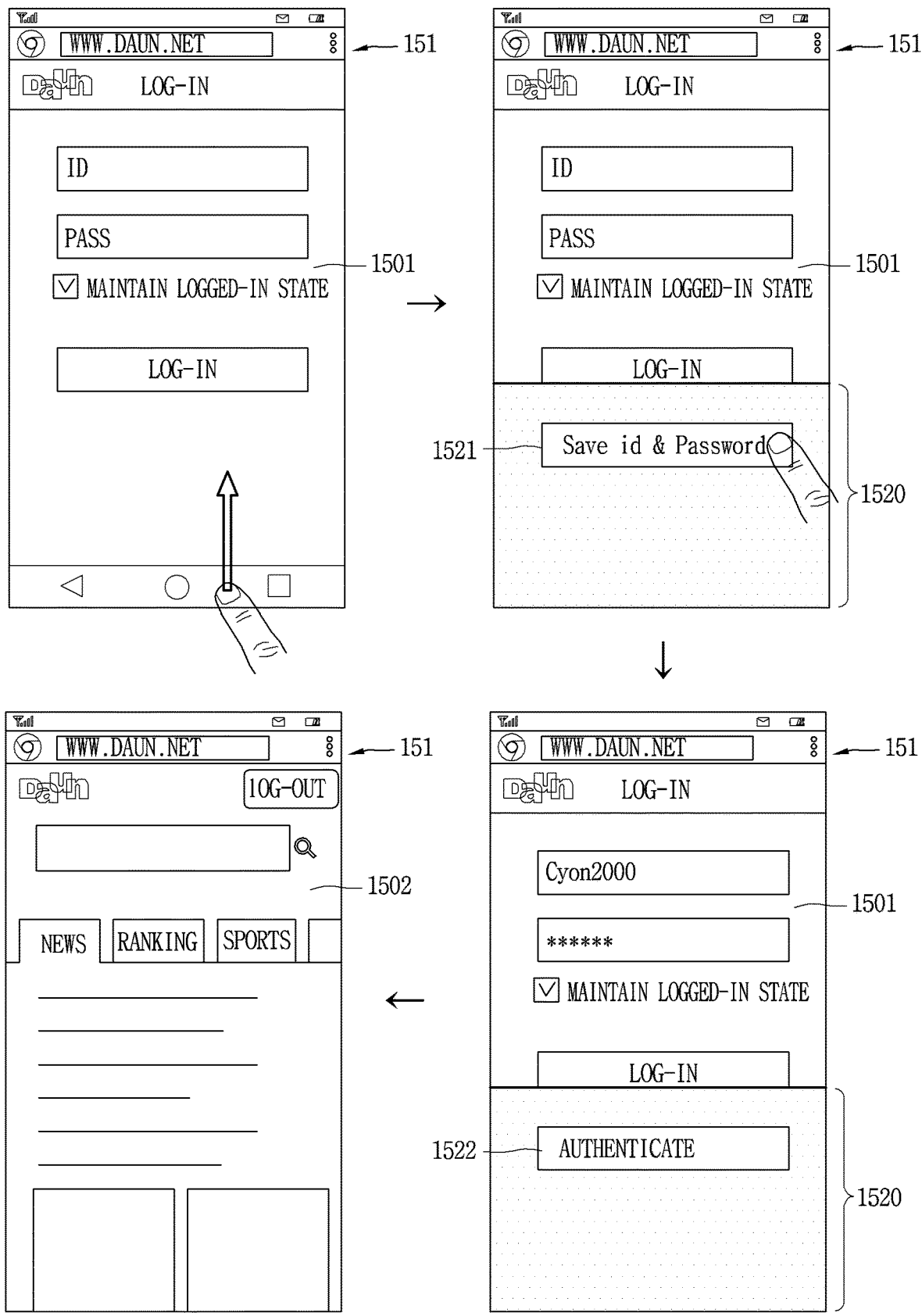

As another example, FIG. 15 illustrates an example to rapidly provide user's log-in information by using a panel region. While a log-in screen 1501 of a specific web page (e.g., search site, account searching page of financial application, etc.) is being displayed on the touch screen 151, if the aforementioned preset touch gesture is applied to the touch screen 151, the controller 180 may search log-in information (e.g., ID and password information) corresponding to the displayed log-in screen 1501, from the memory 170. Then, the controller 180 may provide the log-in information to a panel region 1520 in the form of an icon 1521. For this, when the log-in information is firstly input by using a virtual keyboard, the panel region may be called to rapidly store the input log-in information.

On the icon 1521 provided to the panel region 1520, the log-in information may be displayed in the form of a password (e.g., a symbol of *). If a large amount of log-in information is stored in the memory 170, all of the log-in information may be provided in the form of a list. In this case, a nickname (e.g., Shinhan Bank), additionally input when the log-in information is stored in the memory 170, may be displayed together with the log-in information.

Then, if specific log-in information is selected from the panel region 1520, guide information 1522 for performing a user's authentication procedure is provided to the panel region. The user's authentication procedure may be implemented in various forms such as a fingerprint authentication and a password input, which will not be explained in more detail. Once the user's authentication procedure is completed, the specific log-in information selected from the panel region 1520 is automatically input to the log-in screen 1501 layered below the panel region 1520, and the panel region 1520 automatically disappears. Accordingly, a logged-in screen 1502 of a specific web site is displayed on an entire region of the touch screen 151.

Figure 16A:
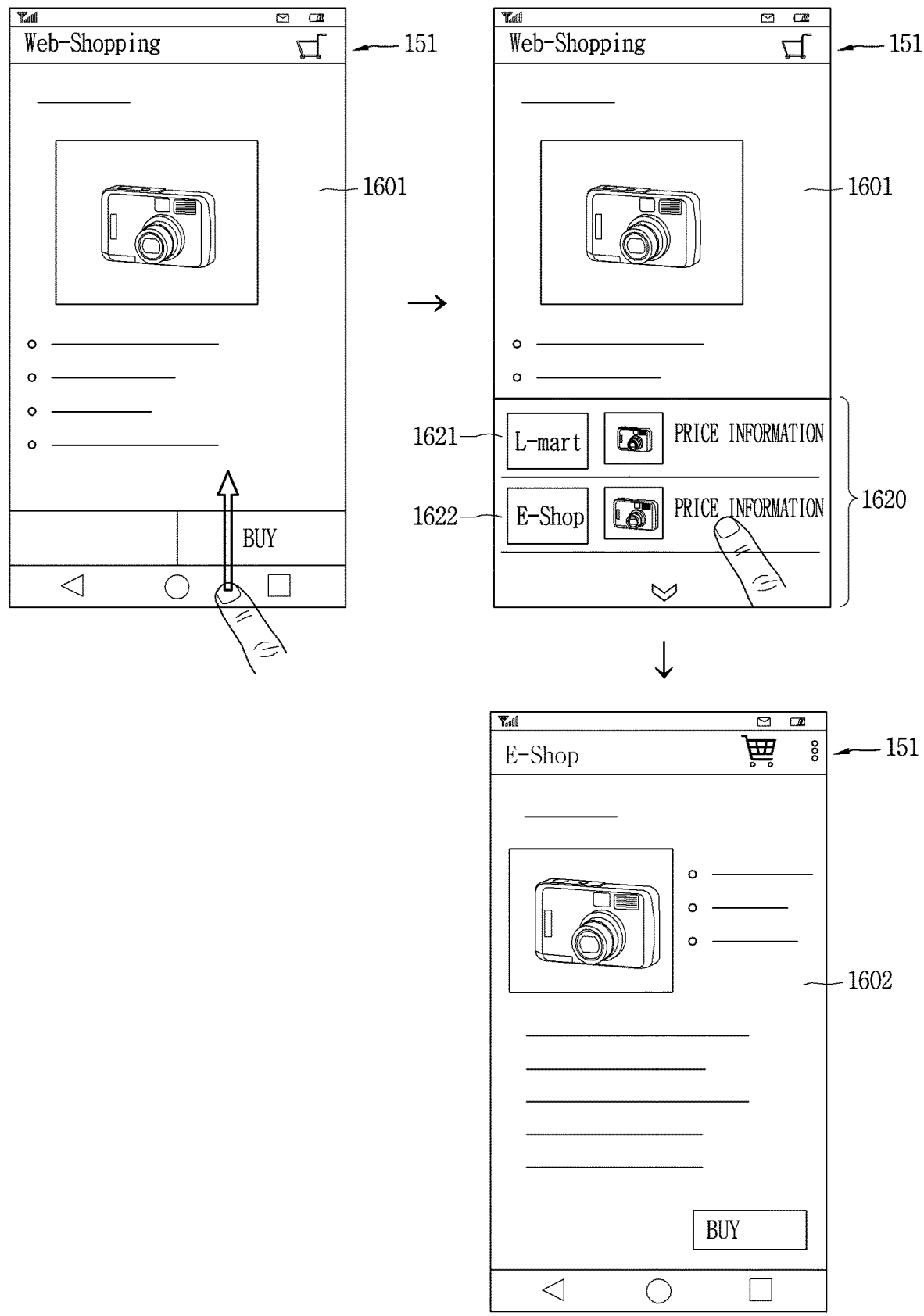
FIGS. 16A and 16B are conceptual views illustrating a method of providing other comparison sites by using a panel region, while product information is being displayed on a touch screen, according to an embodiment of the present invention.
Figure 16B:
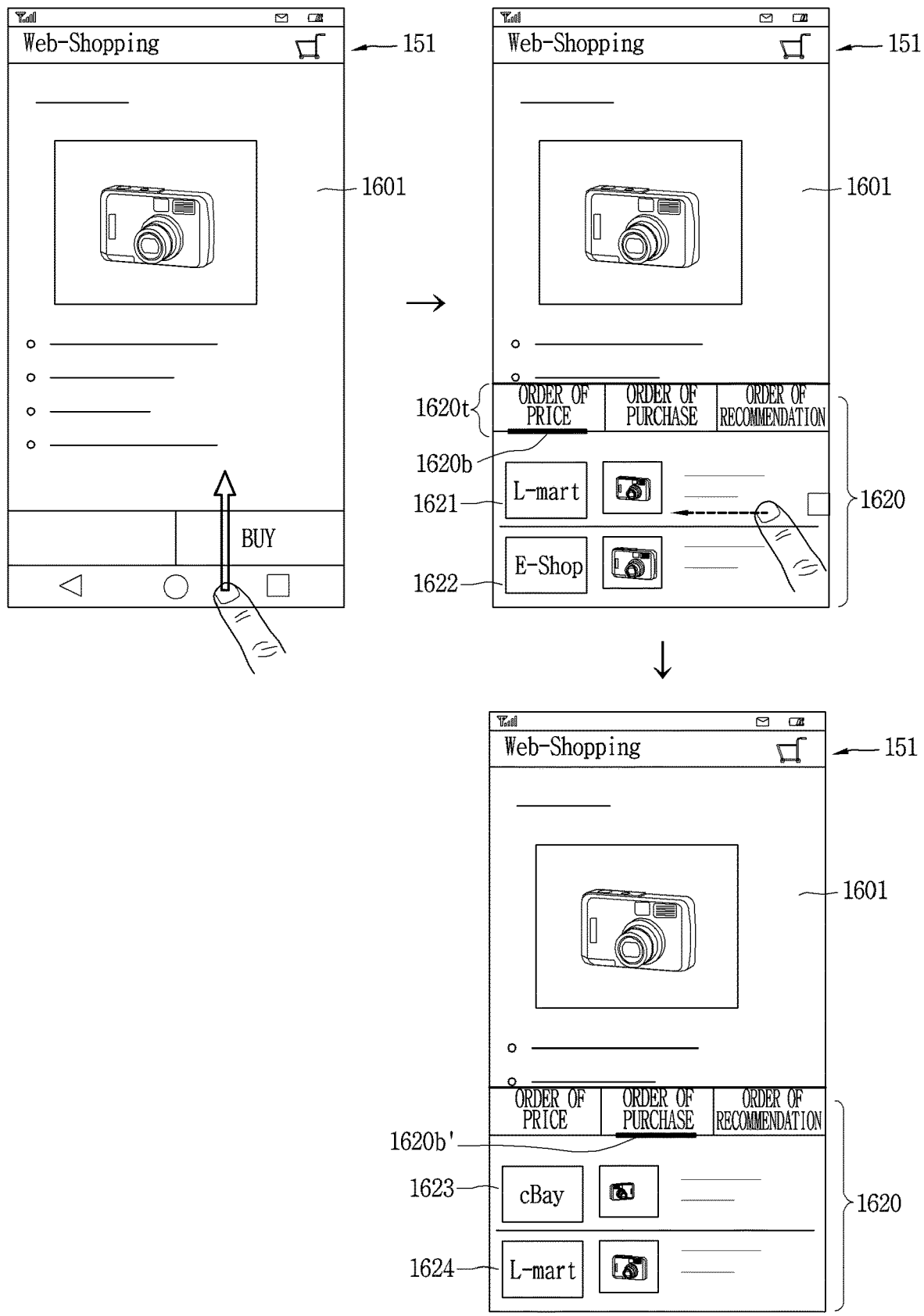

As another example, FIGS. 16A and 16B are conceptual views illustrating a method of rapidly comparing and selecting purchase information of a user's interested product, by using a panel region. A user of the mobile terminal may enter a purchase screen of an interested product, by using a specific site, a specific social commerce, etc.

For instance, as shown in FIG. 14A, while a purchase screen 1601 of a specific site or a specific social commerce is being displayed on the touch screen 151, if an upward drag touch input (or a flicking touch input or a swipe touch input) starting from the lower end of the touch screen 151 is applied, the controller 180 may call a panel region 1620 gradually withdrawn from the lower end of the touch screen 151.

In response to the aforementioned preset touch gesture applied to the touch screen 151, the controller 180 may recognize information on a purchase product displayed on the purchase screen 1601 displayed on the touch screen 151, and may automatically search the same purchase product on other site or other social commerce stored in the mobile terminal, based on the recognized information. For this, the controller 180 may transmit, through the wireless communication unit 110, the recognized information on the purchase product, to a database (DB) interworked with a plurality of sites or social commerce stored in the mobile terminal.

As a result, a plurality of other purchase information 1621, 1622 on the same purchase product, searched from other sites or other social commerce, are displayed on the withdrawn panel region 1620, in a comparable manner. The purchase information may include product information, price information, purchasable site (or social commerce) information, an image of a purchase product, user's review information. Such purchase information may be provided within the panel region 1620 in the form of a list. In this case, the purchase information on the same purchase product, displayed on the panel region 1620, may be displayed in order corresponding to a preset reference (e.g., in order of low price, in order of high purchase rate, etc.).

If there are a large number of searched purchase products which can be compared with each other, a purchase product to be compared may be searched based on an up and down scroll or a right and left scroll applied to the panel region 1620.

As shown in FIG. 16A, if a touch input is applied to one of the plurality of purchase information provided to the panel region 1620, the current purchase screen 1601 is converted into a page 1602 of a corresponding site (or social commerce) which provides the purchase information selected from the panel region 1620. For this, the plurality of purchase information provided to the panel region 1620 may include link information for moving a current page to a corresponding site (or social commerce). And each of the plurality of purchase information is implemented to perform a corresponding link when a touch input is applied thereto.

As another example, as shown in FIG. 16B, a plurality of tab menus 1620*t* may be generated on the panel region 1620, such that purchase information on the same purchase product may be compared with each other in more detail. For instance, a plurality of tab menus 1620*t*, such as a menu indicating a price order, a menu indicating a purchase order and a menu indicating a recommendation order, may be generated on an upper end of the panel region 1620. As a drag touch input is applied to the panel region 1620, a moving bar 1620*b* has a position change (1620*b*') such that comparison results on the same purchase product are checked according to a comparison reference (e.g., purchase order) provided from other tab menu. As a result, a plurality of purchase information 1623, 1624 displayed in order of online users' purchase is provided on the panel region 1620, the purchase information 1623, 1624 about the same product as the purchase product displayed on the purchase screen 1601 layered below.

In the aforementioned embodiments, since the display unit having a bezel-less structure or a thin bezel portion provides a supplementary region having a short fingering distance (fingering distance), information output to the display unit may be rapidly controlled by one hand. Further, since information output to the display unit and the supplementary region interact with each other, a multi-tasking related to the information output to the display unit may be performed more easily. Further, while the displayed state of the current screen is maintained, the supplementary region having a short fingering distance (fingering distance) is used to rapidly check and control detailed information of specific information. This does not require an additional page conversion or a frequent conversion between applications. Further, the supplementary region is withdrawn like a drawer only when necessary, and is inserted when not necessary. Accordingly, an advantage of the display unit having a bezel-less structure or a thin bezel portion may be maintained.

Figure 17:
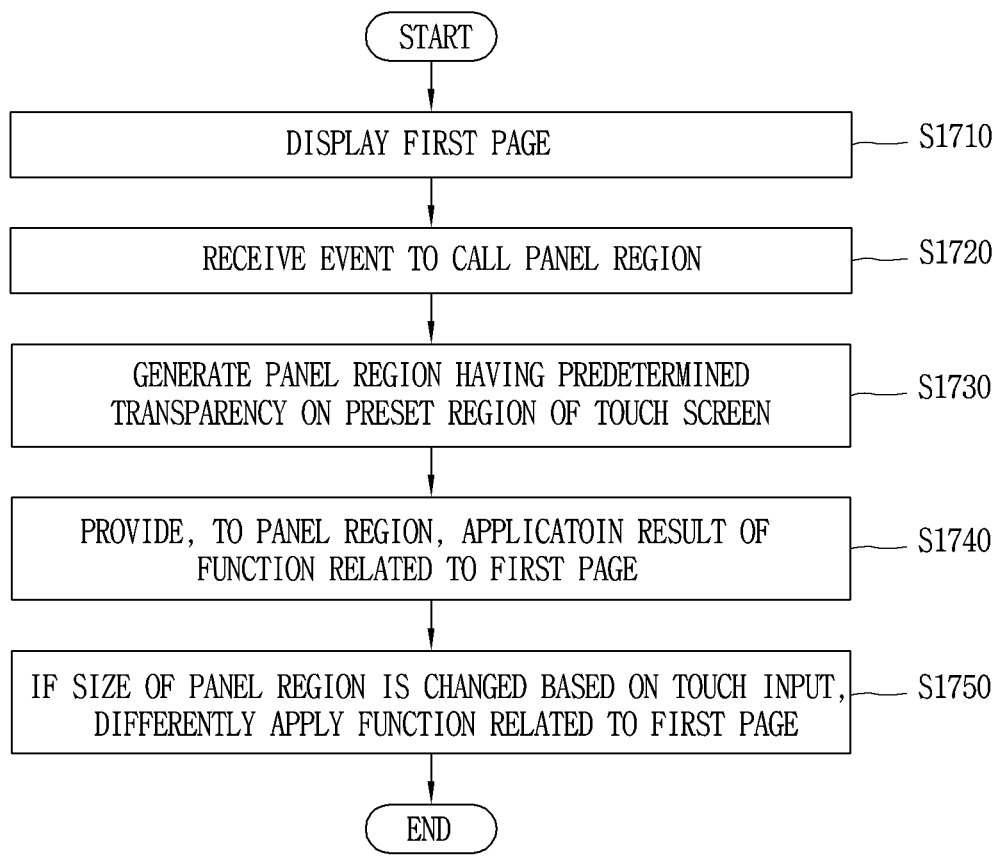
FIG. 17 is a representative flowchart for explaining an operation of a mobile terminal according to an embodiment of the present invention.

FIG. 17 is a representative flowchart for explaining an operation of a mobile terminal according to another embodiment of the present invention.

Firstly, a first page is displayed on the touch screen 151 of the mobile terminal 100 according to the present invention (S1710). Here, the first page may have any type. The first page may be an initial screen of a specific application, a screen of a specific execution step, or a home screen. Alternatively, the first page may be a screen corresponding to one of a plurality of tabs.

While the first page is being displayed on the touch screen 151, the mobile terminal 100 may sense occurrence of an event to call a panel region (S1720).

Here, the panel region may be defined as a supplementary screen region for providing information related to a screen displayed on the touch screen 151. And the event to call a panel region may be generated in response to a preset touch gesture applied to the touch screen 151, for example. Alternatively, the event to call a panel region may be generated in response to a preset other type of user input (e.g., a voice command, a hard key push input, or a specific gesture input), or occurrence of other type of event (e.g., sensing a connection with a specific terminal, etc.). Hereinafter, all types of user inputs to generate such an event may be referred to as 'inputs to call a panel region'.

If an event to call a panel region occurs, the controller 180 generates a panel region having a predetermined transparency on one region of the touch screen 151 (S1730).

More specifically, as a drag touch input is applied to the touch screen 151, a panel region may be generated at a lower part of the touch screen 151 while an image is being gradually withdrawn from the lower end of the touch screen 151. Once the panel region is generated, a part of the first page being output to the touch screen 151 may be viewed semi-transparently, or may be scarcely viewed. If a soft key such as a home key or a back key was being displayed on the lower end of the touch screen 151 before the panel region is generated, the soft key such as a home key or a back key may be also viewed semi-transparently on a lower end of the panel region, or an interaction may be performed by a touch input. The displayed state of the first page may be maintained on a region of the touch screen 151 rather than the panel region.

Then, the controller 180 may provide, onto the generated panel region, an application result (applying result) of a function related to the first page (S1740). Here, the function related to the first page may mean a specific function frequently used when the first page or an application corresponding to the first page is used. For this, the controller 180 may record and learn a user's usage pattern while the first page or an application corresponding to the first page is being executed. Then, if the first page or the application corresponding to the first page is re-executed, the controller 180 may immediately execute a specific function frequently used, based on the user's usage pattern, as soon as an input to call a panel region is applied. The specific function may be applied to a part of the first page, e.g., information displayed on a region covered by the panel region among the first page.

While the panel region is being displayed, if the size of the panel region is changed based on a touch input, the controller 180 may differently control an application of the function related to the first page (S1750). That is, the controller 180 may change a type of a function to be applied, an application range of a function, and/or an object to which a function is to be applied.

If a drag touch input is applied from any point of the panel region up and down, the controller 180 may display the panel region by changing a vertical length of the panel region along a direction and a path of the drag touch input. Once the vertical length of the panel region is changed, a region of the first page covered by the panel region is increased or decreased, and information to be displayed on the panel region is also changed. For instance, if the panel region is upward pulled (moved), an application range of the function related to the first page may be also linearly increased by the upward-pulled degree. As another example, if the panel region is downward pulled (moved), an application range of the function related to the first page may be also linearly decreased by the downward-pulled degree. In this case, the part of the first page to which the specific function has been applied may be intuitively compared with the remaining part of the original first page.

Hereinafter, the processes shown in the flowchart of FIG. 17 will be explained in more detail with reference to FIG. 18.

Firstly, a specific web page 1801 where a foreign language (e.g., English) not a mother tongue is written may be displayed on the touch screen 151 of the mobile terminal 100. In this case, the controller 180 may pre-recognize, from a background, a program to execute a function frequently used at the specific web page 1801 or an application corresponding to the specific web page 1801, for example, a translation function. For this, the memory 170 of the mobile terminal 100 may store therein history and usage patterns of functions used through an interwork with the displayed specific web page 1801. If a usage pattern has not been formed, a table matching a specific function interworked according to each application or a specific step of each application may be utilized.

While the specific web page 1801 is being displayed, if an upward drag touch input (a flicking touch input/a swipe touch input) is applied to the lower end of the touch screen 151, the controller 180 recognizes the touch input as occurrence of an event to call a panel region. Accordingly, a panel region 1820 having a predetermined transparency may be generated on a preset region of the touch screen 151. In this case, the preset region may be implemented as a vertical length is formed as a predetermined height from the lower end of the touch screen 151, and as a horizontal length is formed to correspond to a horizontal length of the touch screen 151.

The controller 180 may immediately execute a function frequently used through an interwork with the displayed specific web page 1801, e.g. a translation program, in response to reception of an input corresponding to an event to call the panel region 1820. And a result 1802a obtained by translating the foreign language (e.g., English) into a mother tongue (e.g., Korean) may be displayed on the generated panel region 1820. In this case, an application range of the translation function may be the foreign language included in a web page semi-transparently covered by the panel region 1820.

Figure 18:
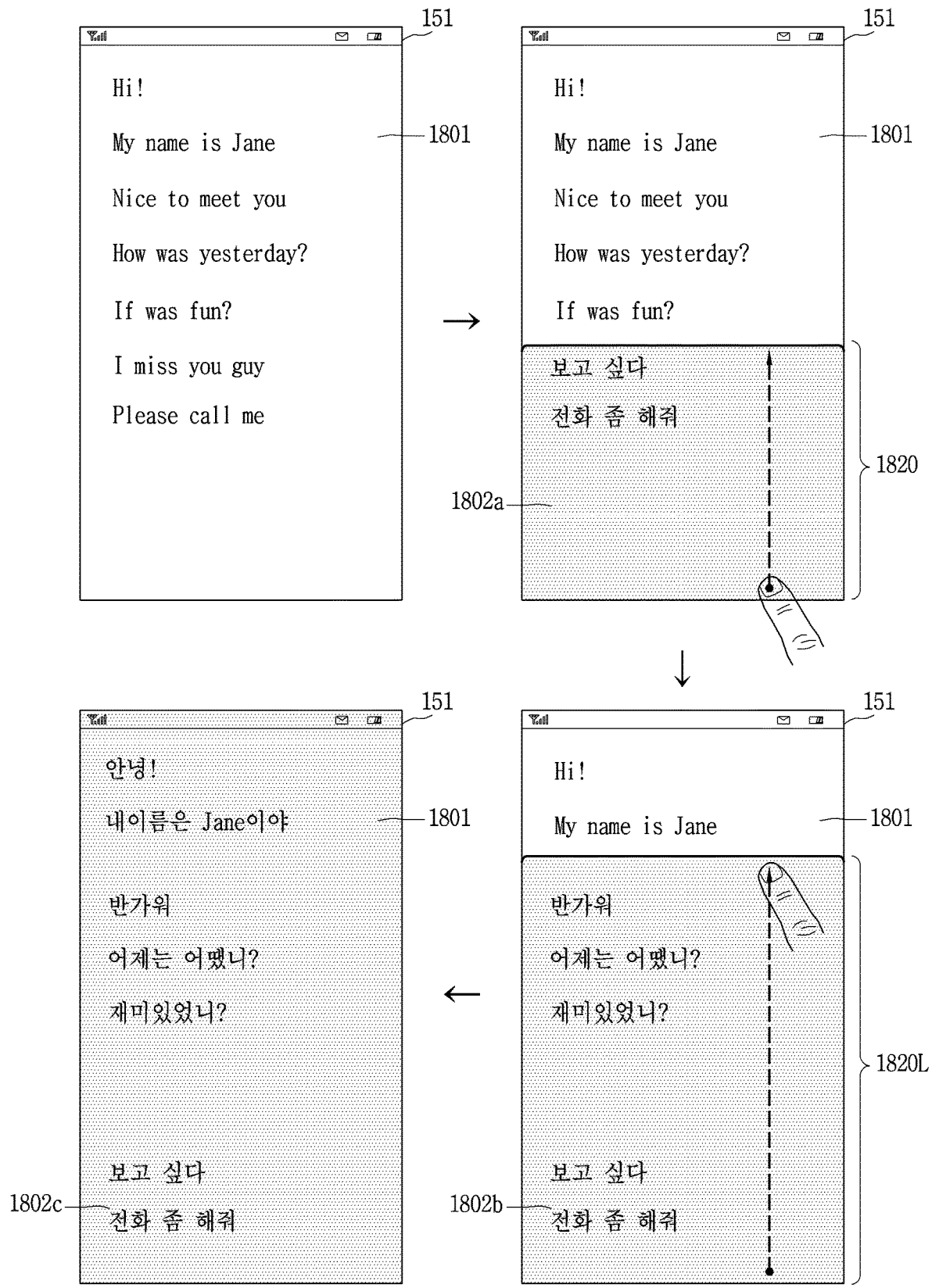
FIG. 18 is a conceptual view for explaining the processes of FIG. 17.

As a result, as shown in FIG. 18, a part of the specific web page 1801 translated into the mother tongue, is displayed on the panel region 1820 at a lower side of the touch screen 151. And the remaining part of the original web page 1801, written in the foreign language, is displayed at an upper side of the touch screen 151. Referring to FIG. 18, some translation results 1802a ('Korean sentences translated from the English sentence 'I miss you guy. Please call me.') are displayed on the panel region 1820. However, in an embodiment, the original English sentences ('I miss you guy. Please call me') may be displayed together with the Korean sentences.

Next, if the size of the panel region 1820 is changed based on a touch input, the controller 180 may differently control an application range of a function related to the displayed specific web page 1801, e.g., a translation function.

More specifically, if an upward drag input starting from any point on the panel region 1820 is applied, one end of the panel region 1820 is fixed to the lower end of the touch screen 151, and another end of the panel region 1820 is upward moved along a path of the drag input. That is, the size of the panel region is increased. Accordingly, a larger region of the web page 1801 is blocked by the expanded panel region 1820L.

The controller 180 continuously translates the English included in the web page 1801, which is linearly blocked along the path of the drag input. And the controller 180 provides further results of the translation (Korean sentences) within the expanded panel region 1820L (1802b). For this, if a drag input is applied to the panel region 1820, the controller 180 generates an image having its size gradually changed, within the panel region 1820, along a path of the drag input. Then, the controller 180 displays, within the image, an application result of a function related to the first page. In this case, a region of the original web page 1801, written in the foreign language (English), is gradually decreased. On the other hand, a region of the web page 1801 translated into the mother tongue, displayed on the expanded panel region 1820L, is gradually increased.

If a top line of the expanded panel region 1820L is positioned in the middle of the text lines of the original web page 1801, only text lines completely included in the expanded panel region 1820L may be translated, or text line positioned on an uppermost end of the expanded panel region 1820L may not be translated. A user may rapidly compare a state before the translation with a state after the translation, with sliding the panel region up and down.

The controller 180 may differently process the image according to a release point of the drag input applied to the panel region 1820.

For instance, if the drag input applied to the panel region 1820 is released on an upper end of the touch screen 151, as shown in FIG. 18, one end of the image may be continuously fixed to the lower end of the touch screen 151, and another end of the image may be fixed to the upper end of the touch screen 151. As a result, the expanded panel region 1820L is displayed in an entire window mode. A translation result 1802c of the entire specific web page 1801 into the mother tongue is displayed within the panel region in the entire window mode. Accordingly, if a scroll operation is applied to the touch screen 151, the automatic translation function may be continuously performed such that only text information translated into the mother tongue may be displayed. In this case, when a reference time lapses, the displayed specific web page 1801 may undergo a page conversion into a translation result displayed on the panel region in the entire window mode, and the display state of the panel region may be automatically terminated. Accordingly, a preset color (e.g., gray) indicating the panel region may disappear.

As another example, if the drag input applied to the panel region 1820 is released without exceeding the intermediate line of the touch screen 151, the expanded panel region 1820L may be converted into the original panel region 1820 after being displayed for a reference time (e.g., 2~3 seconds). In this case, may be output a visual effect that the expanded panel region 1820L is elastically reduced like a rubber band or has its size gradually decreased. Further, as the size of the expanded panel region 1820L is reduced, text lines on the web page 1801 exposed by the reduced degree may be converted into the original foreign language.

Although not shown, while the panel region 1820 (or the expanded panel region 1820L or the panel region in an entire window mode) is being displayed, if a touch input applied to the panel region is downward dragged, the displayed state of the panel region may be terminated regardless of a size. Then, all of the translation results of the specific web page 1801 may disappear, and the web page 1801 written in the foreign language may be displayed in an entire window mode.

In response to a change of a part of the specific web page 1801 covered by the panel region along a path of a drag input applied to the panel region, the controller 180 may gradually apply a translation function interworked with the specific web page 1801 to the part, or may release the applied function.

Accordingly, while the drag input applied to the panel region is dragged up and down, the translation applied to the part of the specific web page 1801 may be linearly converted into a translation in the original foreign language, or may be linearly (rapidly) converted into a translation in the mother tongue. As a result, a region where the foreign language is written, and a region where the mother tongue is written may be rapidly compared with each other line by line. Then, if a downward drag input starting from one point of the panel region is released, the controller 180 may terminate the displayed state of the panel region.

In the aforementioned embodiment, while a specific screen is being displayed, a function frequently used through an interwork with the specific screen may be immediately performed by withdrawing a panel region. Further, an application range and an application object of the function may be controlled by sliding the panel region up and down, and a state before applying the function and a state after applying the function may be rapidly compared with each other.

FIGS. 19A~19B, 20A~20B, 21A~21B, 22A~22C, 23 and 24 show various embodiments to control an application (applied state) of a function related to a page, by changing a size of a panel region, according to an embodiment of the present invention.

Figure 19A:
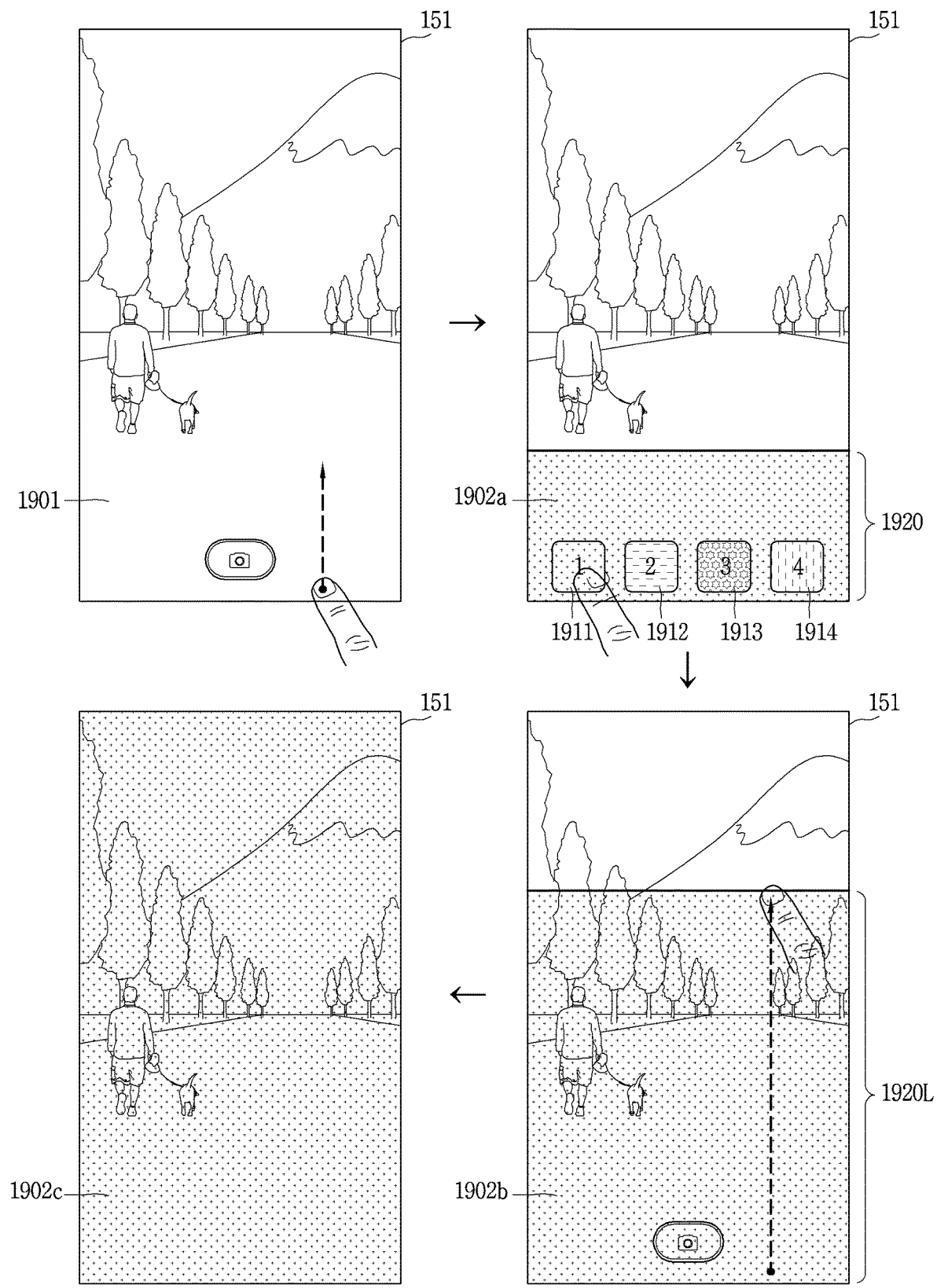
FIGS. 19A~19B, 20A~20B, 21A~21B, 22A~22C, 23 and 24 are conceptual views illustrating various embodiments to control application of a page-function by changing a size of a panel region, according to an embodiment of the present invention.

FIG. 19A shows an example to apply a specific filter value to a camera preview screen by a desired amount, by changing a size of a panel region. Referring to FIG. 19A, while a preview screen 1901 corresponding an executed camera application is being displayed on the touch screen 151, if a touch gesture to call a panel region is received, icons 1911, 1912, 1913, 1914 corresponding to various filter values related to the preview screen 1901 are displayed within the panel region 1902. In this case, if there is no desired filter value, a swipe touch input may be applied to the panel region right and left such that a desired filter value may be searched.

If the icon 1911 of a desired filter value is selected, an application result of the desired filter value is immediately displayed on an entire part of the panel region 1920. The filter value is applied to a part 1902a of the preview screen 1901, which corresponds to the panel region 1920, and the remaining part maintains the original state. Accordingly, a state before applying the desired filter value, and a state after applying the desired filter value may be immediately compared with each other. If another filter value is to be applied to the preview screen 1901 in a different manner, one of the other icons 1912, 1913, 1914 may be selected.

If an upward drag input to upward move the panel region 1920 is applied, an application region of a desired filter value on the preview screen may be increased. More specifically, if a touch input applied to a top line of the panel region 1920 is dragged upward, the size of the panel region is gradually increased (1920L) along a path of the touch input, and a region (1902b) on the preview screen where a corresponding filter value is applied is also gradually increased. In this case, if the drag input is applied up to the upper end of the touch screen 151, the corresponding filter value may be applied to an entire region of the preview screen (1902c).

Figure 19B:
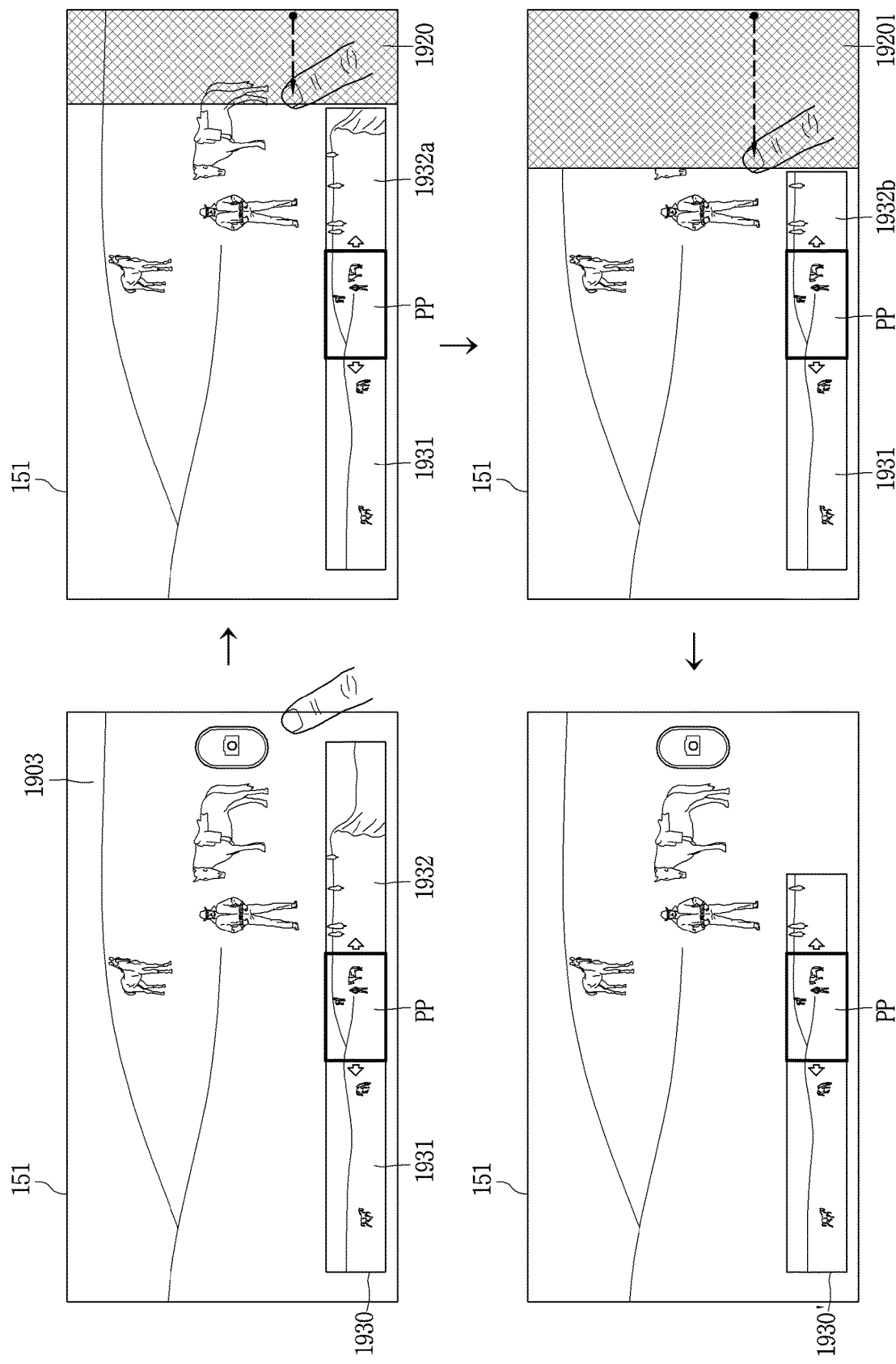

FIG. 19B shows an example to control a panorama length of a camera by changing a size of a panel region. Referring to FIG. 19B, while the touch screen 151 is being displayed in a horizontal direction in a camera panorama mode, if a drag input is leftward applied from a right end of the touch screen 151, a panel region is withdrawn from the right end of the touch screen 151, and a panorama length control function is immediately interworked.

In this case, while a specific scene 1903 of a panorama is being displayed, a thumbnail image 1930 indicating a previous scene 1931 and a next scene 1932 based on a current position (PP) may be provided to the touch screen 151. As the panel region 1920 is withdrawn, the next scene on the thumbnail image 1930 is reduced (1932a) by a length corresponding to the withdrawn length of the panel region.

Next, if the panel region is more extended (1920L) along a path of the drag input applied to the withdrawn panel region, the next scene on the thumbnail image 1930 is more reduced (1932b) by a length corresponding to the extended length of the panel region. On the other hand, if the panel region is pushed toward the right end of the touch screen 151, the shortened length of the panorama may be increased again. If the drag input applied to the panel region is released, the panorama length is fixed to a corresponding length (1930') and the panel region disappears automatically.

Although not shown, a length of the previous scene based on the current position of the panorama may be controlled by withdrawing a panel region from a left end of the touch screen 151. The aforementioned operation may be similarly applied at the time of controlling a length of a consecutively-captured image by a camera burst shot.

Figure 20A:
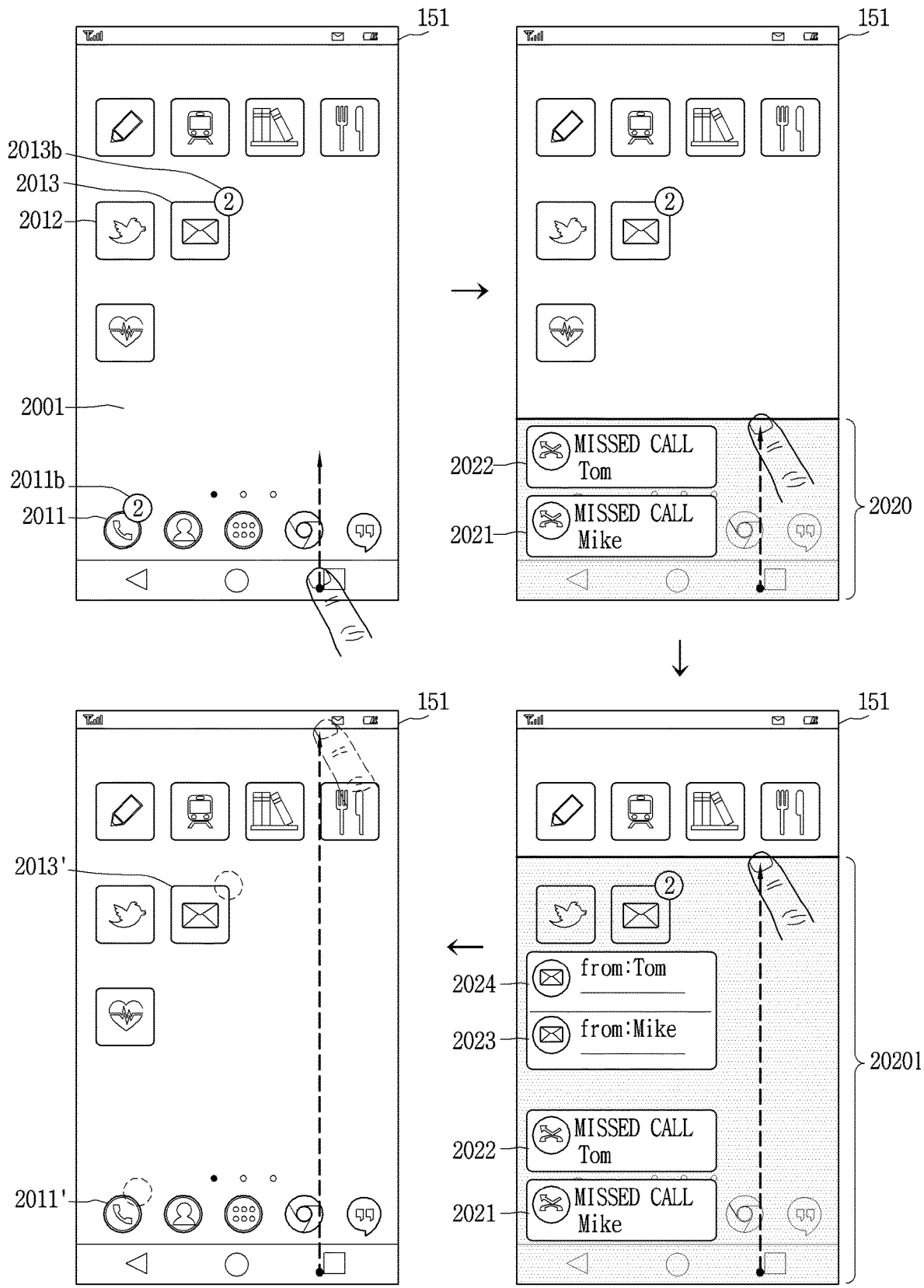
Figure 20B:
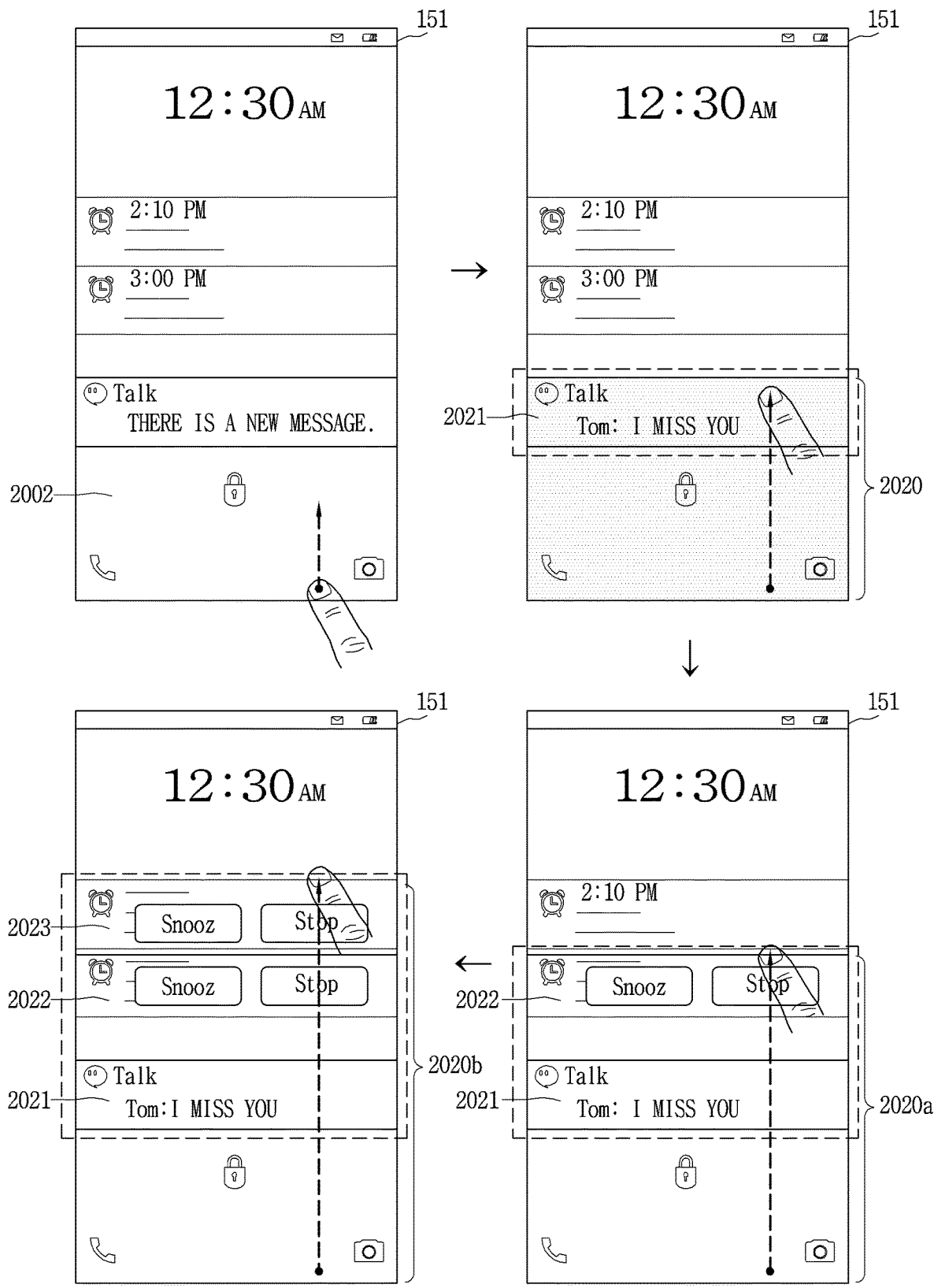

FIGS. 20A and 20B illustrate examples to rapidly check content of a desired event by changing a size of a panel region.

Referring to FIG. 20A, a home screen including a plurality of objects may be displayed on the touch screen 151. The plurality of objects may include icons of applications, widgets, buttons, menus, files, folders, images, links, etc. One or more badge-type graphic objects indicating that there is an unchecked event at a corresponding application may be displayed at one or more of the plurality of objects. The event means occurrence of an event which influences on an operation of at least one application installed at the mobile terminal, occurrence of an event which changes an item of database (or a data file) related to at least one application, or occurrence of an event which transmits data to an external terminal or an external network through the at least one application. For instance, the event may be a call reception, a message reception, or the like. Accordingly, the unchecked event may be an unchecked state of a completed update, no reply to a call reception, a reception of an unchecked message, etc.

Referring to FIG. 20A, a first icon 2012 having no event is displayed with no graphic object, and a call application icon 2011 is displayed with a first graphic object 2011b indicating that there are two missed calls. And an e-mail application icon 2013 is displayed with a second graphic object 2013b indicating that there are two e-mails unchecked.

In this case, if an input to call a panel region is received, the controller 180 may recognize whether there exists an object displayed within a home screen 2001 covered by a withdrawn panel region, and may recognize whether an event has occurred from the corresponding object. If there is an event corresponding to an object covered by the panel region, the controller 180 may provide event information of the corresponding object to the panel region. Accordingly, as shown in FIG. 20A, information related to two missed calls (e.g., missed calls from Tom and Mike) 2021, 2022 is provided within the panel region 2020.

Then, if an upper end of the panel region 2020 is more moved upward (2020l) based on the drag input such that the e-mail application icon 2013 is included in the panel region **2020*l*, information related to two unchecked e-mails 2023, 2024 is further provided within the panel region 2020*l*. In this case, the event-related information provided within the panel region 2020 or 2020*l*** may be provided with not only content of a corresponding event, but also a menu icon for an immediate reply or a menu icon for immediately entering a corresponding application step.

If the upper end of the panel region **2020*l* is upward moved up to the upper end of the touch screen 151, all of event information corresponding to the objects displayed on the home screen 2001 may be displayed, and the panel region may disappear when a reference time lapses. In this case, the graphic objects indicating the unchecked events and displayed on the home screen 2001 disappear, and the corresponding objects are displayed with graphic objects indicating an event checked state (2013', 2011'**).

As another example, referring to FIG. 20B, while a locked screen is being displayed on the touch screen 151, notification icons indicating occurrence of events may be displayed on the locked screen 2002. In this case, for protection of user's private information, only minimum information related to an event (e.g., message arrival information and notification information of a corresponding application) may be provided onto the locked screen 2002.

If an input to call a panel region is received in such a locked state, event information (e.g., 'I miss you'.) 2021 corresponding to a first notification icon may be immediately displayed on a withdrawn panel region 2020. In this case, the event information 2021 is displayed on a region corresponding to the position of the notification icon on the locked screen. Further, the event information 2021 may be a preview of an occurred event (e.g., a preview of a received message).

If the panel region 2020 is upward moved gradually, event information 2022 corresponding to a second notification icon and event information 2023 corresponding to a third notification icon, may be further displayed within extended panel regions **2020*a*, 2020*b*, in addition to the event information 2021 corresponding to the first notification icon. In case of the event information 2022 and the event information 2023** related to a setting of a specific operation, command buttons (e.g., 'snooze' and 'stop') to change a set specific operation or to set a next operation may be provided.

Although not shown, if the extended panel region **2020*a* or 2020*b* is downward moved, the displayed event information 2023, 2022, 2021 may be provided with notification icons (unchecked state) or may disappear in a checked state, in reverse order to the display order. Then, if the panel region is upward moved on the locked screen, it may be determined that there is no event information to be displayed. And an application result of another function related to the locked screen may be provided to the panel region, or the operation shown in FIG. 20**B may be repeatedly performed.

Hereinafter, examples to rapidly change or add information inputting means by changing a size of a panel region will be explained with reference to FIGS. 21A and 21B.

Figure 21A:
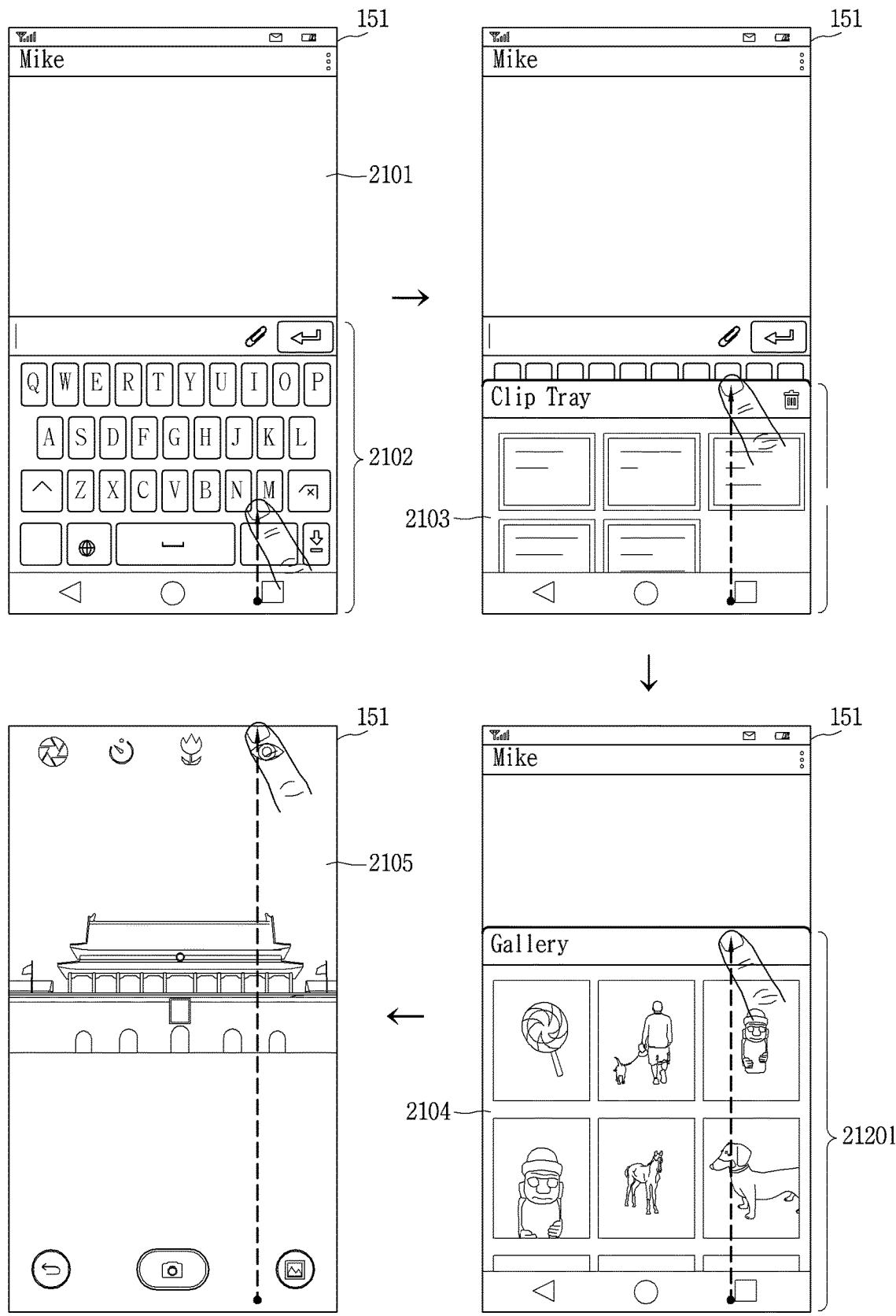

Referring to FIG. 21A, while a first page 2101 is being displayed on the touch screen 151, a virtual keyboard 2102 for inputting information to the first page 2101 may be popped-up on a lower side of the touch screen 151. In this case, in order to use a function of another application as an information inputting means, an addition icon should be selected from the virtual keyboard, and then an additional input process for entering a desired application should be performed. Especially, in order to change a selected function, a backward operation should be performed, and then the aforementioned processes should be performed from the beginning. This may cause a user's inconvenience.

In order to solve such problems, FIG. 21A proposes an example to rapidly change information inputting means corresponding to various applications, by changing a size of a panel region. More specifically, while the virtual keyboard 2102 is being displayed, if an input to call a panel region is received, a clipboard region 2103 may be immediately provided within a panel region. For instance, when an input to call a panel region is received, the clipboard region 2103 may be gradually withdrawn from the lower end of the touch screen 151.

If the size of the panel region is changed, the controller 180 may provide an extended information inputting means. In this case, the controller 180 may change the information inputting means step by step, based on a changed degree of the size of the panel region.

More specifically, if the clipboard region 2103 is moved upward, a thumbnail list 2104 of a gallery application is displayed within an extended panel region 2120L. A scroll operation may be applied to the thumbnail list 2104 to search for a desired image. And if a specific image is selected, the image is input as information. If the extended panel region 2120L is upward moved up to the upper end of the touch screen 151, the thumbnail list 2104 is converted into a preview screen 2105 of a camera application. Once a capturing is performed through the preview screen 2105, a captured image is input as information.

On the other hand, if a downward drag input starting from an upper end of the preview screen 2105 is applied, the aforementioned different information inputting means 2104, 2103, 2102 are displayed according to a drag degree of the drag input, in reverse order to the display order. Accordingly, a user may rapidly search and select information inputting means of various applications, by merely dragging the panel region up and down.

Figure 21B:
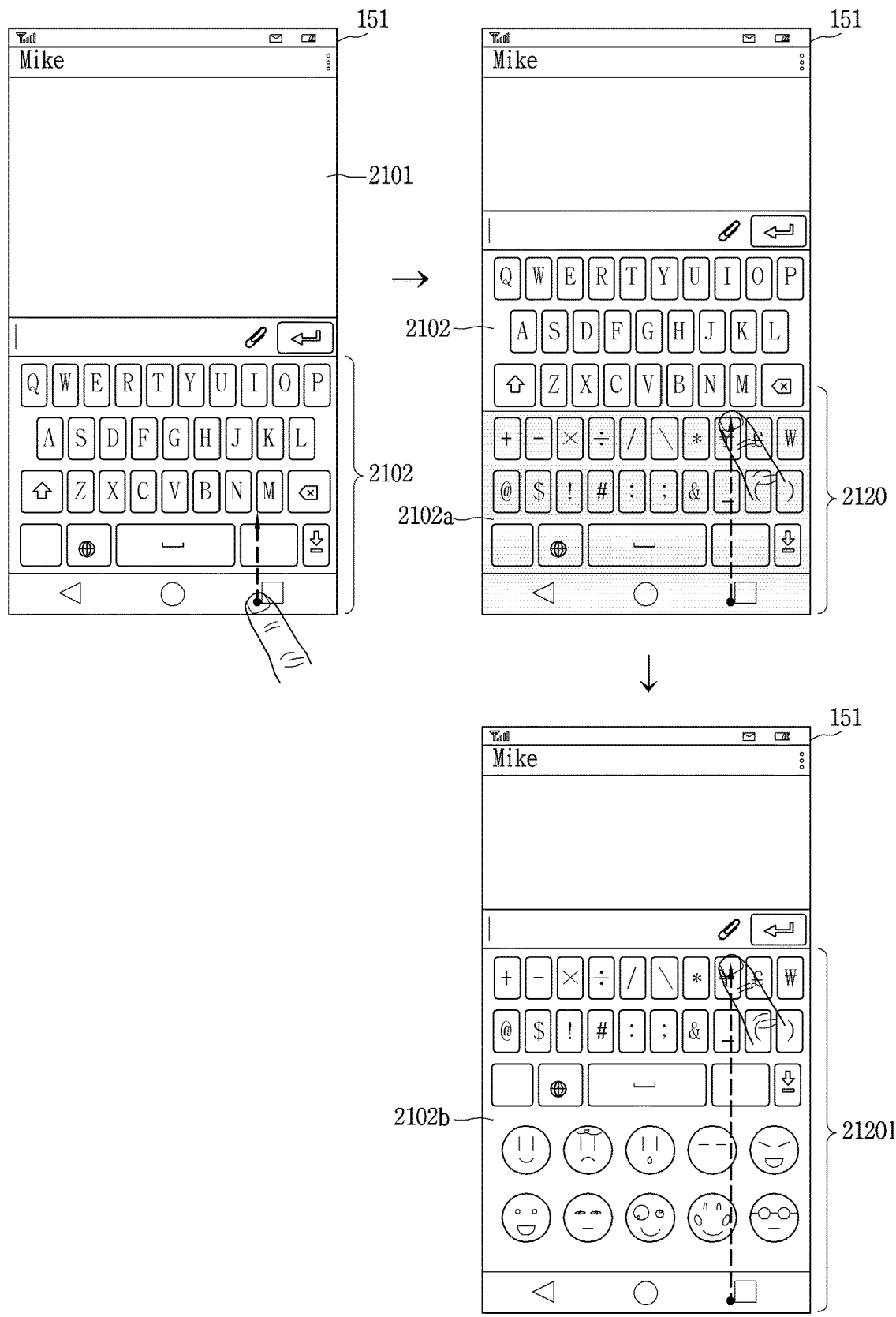

As another example, as shown in FIG. 21B, while a specific type (e.g., English) of virtual keyboard 2102 is being displayed on the touch screen 151, if an input to call a panel region is applied, another type of virtual keyboard may be added rapidly. For instance, in case of frequently repeating English and symbols when inputting information to a displayed page 2101, a swipe input should be performed right and left on the virtual keyboard 2102 every time in a conventional manner, or a symbol/character key should be toggled to change a keyboard type every time. This may cause user's inconvenience.

In order to solve such a problem, as shown in FIG. 21B, while a specific type (e.g., English) of virtual keyboard 2102 is being displayed on the touch screen 151, if an input to call a panel region 2120 is applied, the displayed specific type of virtual keyboard 2102 may be upward moved while another type of virtual keyboard (e.g., symbols) **2102*a* may be added to a region below the specific type of virtual keyboard 2102**. This may allow a user to input English texts and symbols in a consecutive manner.

The controller 180 may control a scrolled degree of keys on the specific type of virtual keyboard 2102 (hereinafter, 'first type keyboard') and keys on the new virtual keyboard **2102*a*** displayed on the panel region (hereinafter, 'second type keyboard'), according to a drag degree of a drag touch input applied to the panel region.

In this case, a range of keys to be scrolled may be changed according to a release point of the drag touch input. For instance, as shown in FIG. 21B, if a drag touch input starting from the lower end of the touch screen 151 is released on an upper end of the first type keyboard 2102, the panel region 2120 is extended (2120*l*), and all of the keys on the first type keyboard and the second type keyboard are converted into other type of keys (2102*b*). On the other hand, if the drag touch input starting from the lower end of the touch screen 151 is released on a region within the second type keyboard 2102*a*, or if a drag touch input starting from a lower end of the second type keyboard 2102*a* is released on the upper end of the first type keyboard 2102, only keys of one of the first type keyboard and the second type keyboard which is included in a path of the drag touch input may be converted into another type of keys. In this case, keys of another of the first type keyboard and the second type keyboard which is not included in the path of the drag touch input may be maintained.

Hereinafter, examples to rapidly check detailed information of a plurality of displayed items by moving a top line of a panel region, will be explained with reference to FIGS. 22A and 22B.

Figure 22A:
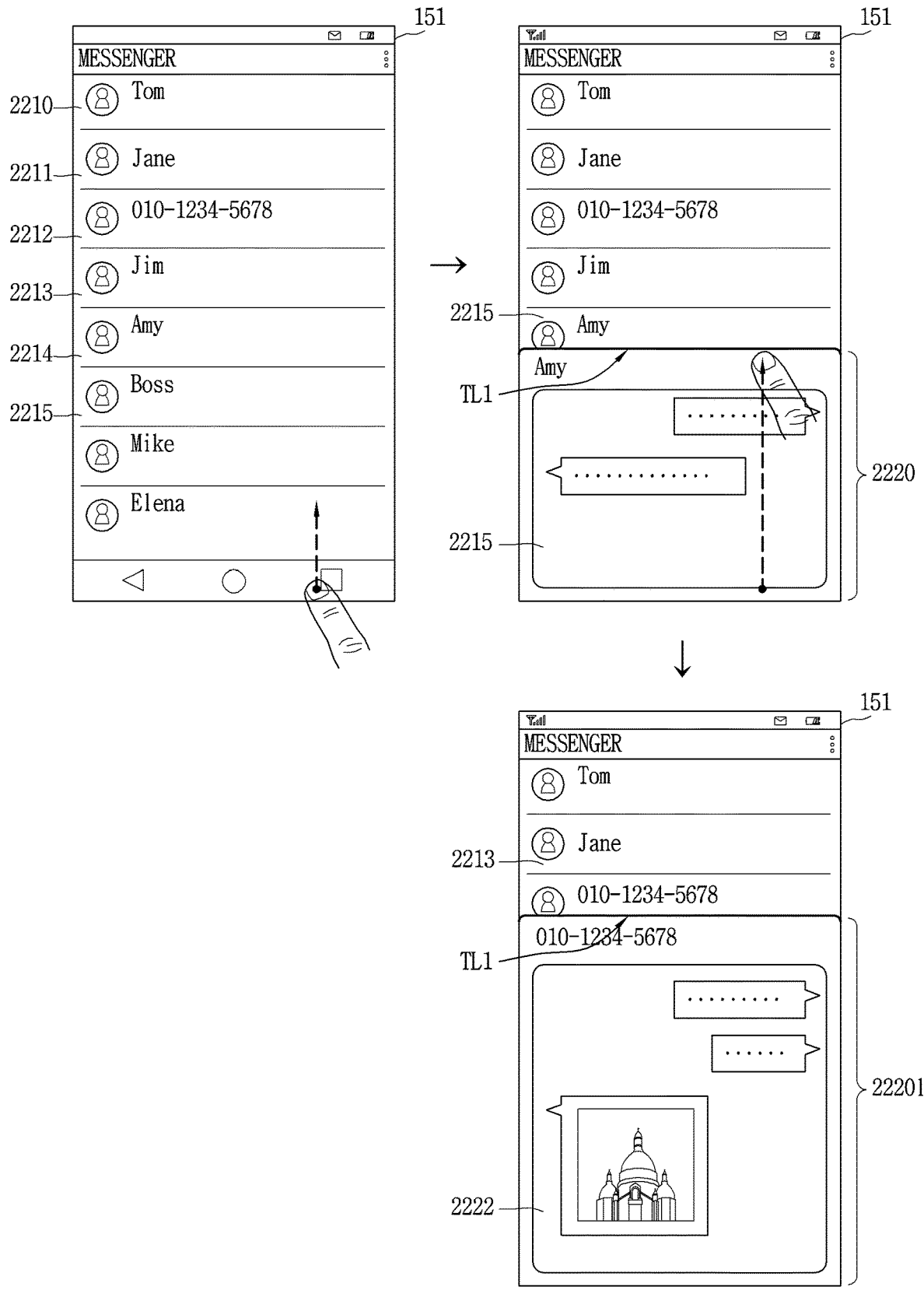

Firstly, referring to FIG. 22A, a list 2210 of a plurality of message room items 2210, 2211, 2212, 2213, 2214, 2215 corresponding to an executed message application, may be displayed on the touch screen 151 of the mobile terminal 100. While the list 2210 is being displayed, if an input to call a panel region is received, the controller 180 may recognize an item contacting a top line of a panel region 2220. Then, the controller 180 may provide detailed information of the recognized item, within the panel region 2220.

Since the panel region 2220 is firstly generated to have a preset size, a part 2221 of a chatting screen of the message room item 2215 ('Amy') contacting the top line (TL1) of the panel region 2220, is displayed within the panel region. In this case, if an up and down flicking touch input is applied onto any point rather than the top line (TL1) of the panel region 2220, a scroll signal is generated to search for another part of the chatting screen. If the touch point of the touch input applied to the top line (TL1) of the panel region 2220 is upward moved, the panel region is extended (2220*l*) and the position of the top line (TL1) is changed.

A user may rapidly check corresponding detailed information by moving the top line (TL1) of the panel region 2220*l* to a position of a desired item, without entering the desired item. For instance, if the top line (TL1) of the panel region 2220*l* is moved to the message room item 2213 indicating a phone number of '010-1234-4567', a part of a chatting screen corresponding to the message room item 2213 is provided within the panel region 2220*l*. With such a configuration, a user may rapidly search and check detailed information of a plurality of items, while a list including the plurality of items is maintained.

Figure 22B:
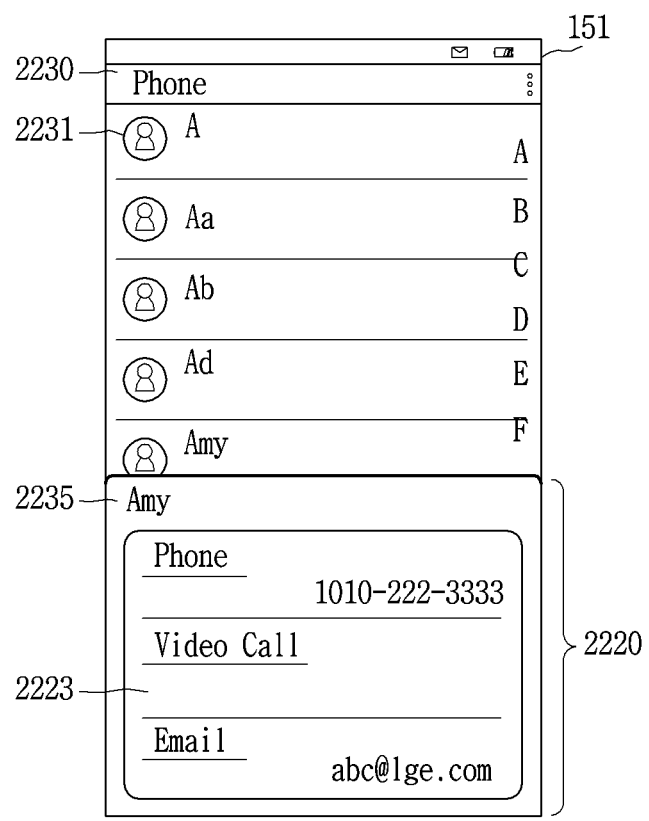

FIG. 22B shows an example to rapidly check contact information of a specific person within a contact information list 2230 by moving a position of a top line of a panel region 2220, in a case where the contact information list 2230 corresponding to an executed call application is displayed on the touch screen 151. As shown in FIG. 22B, contact information corresponding to Amy's contact information item 2235 may be displayed within the panel region 2220. In this case, the same person's contact information (e.g., e-mail, other contact information means, profile information, etc.) recorded in other applications interworked with the call application may be further displayed within the panel region 2220. Further, execution menus to send a call to 'Amy' or to send a message to 'Amy' may be provided together within the panel region 2220. In the aforementioned embodiment, a user may rapidly search and check detailed information of an item contacting an upward or downward-moved top line of a panel region, by sliding the panel region up and down.

Figure 22C:
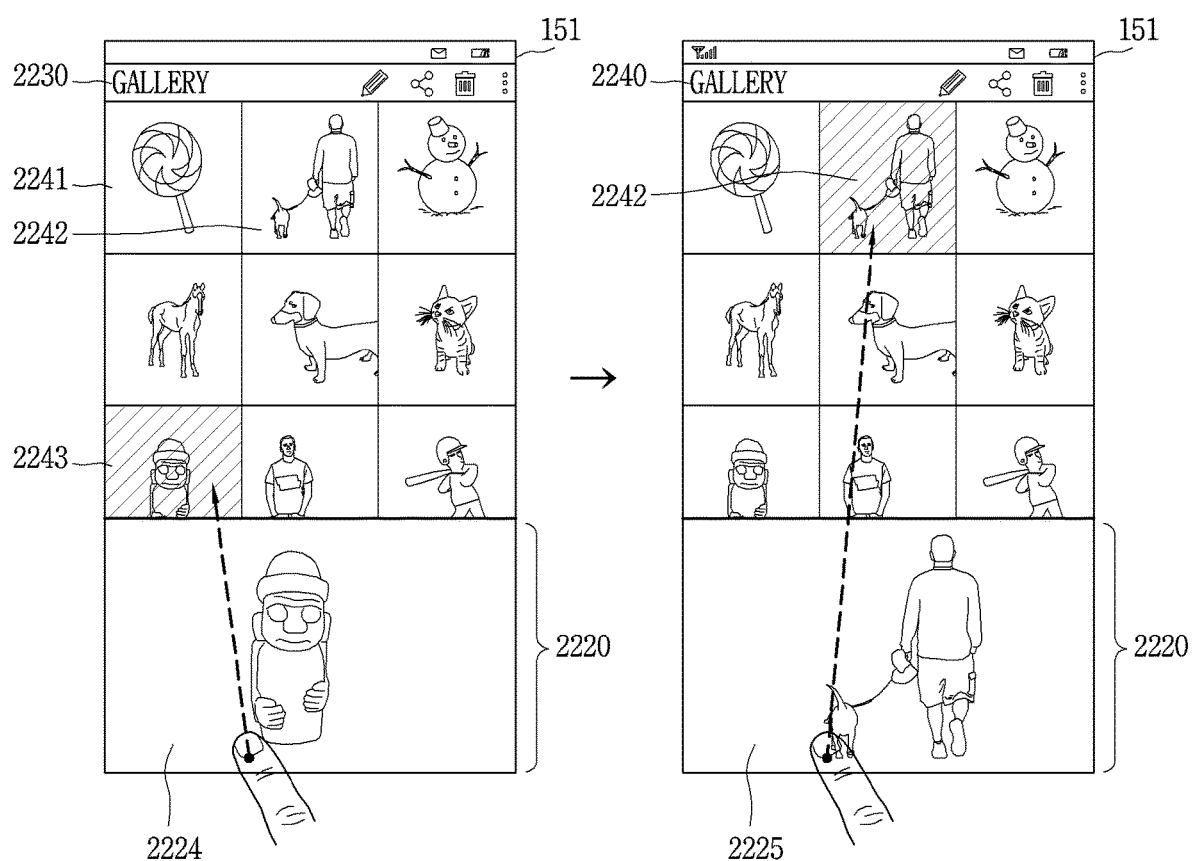

As another example, FIG. 22C shows an example to differently process information provided to a panel region based on a release point of a drag touch input, without changing a size of the panel region.

As shown in FIG. 22C, a plurality of images 2241, 2242, 2243 corresponding to an executed gallery application may be displayed on the touch screen 151, as a list 2230 in the form of a grid view. While the list 2230 is being displayed, if an input to call a panel region is received, a panel region 2220 may be withdrawn, and the withdrawn panel region 2220 may be used as an image editing region. In this case, an image output to a region where a drag touch input starting from any point on the panel region 2220 is released, is an object to be edited.

More specifically, a detailed view 2224 of a first image 2243 is displayed on the panel region 2220 while a drag touch input is fixed to the first image 2243 included in the list 2230. Then, if the drag touch input is released on the corresponding position, an edition mode of the detailed view 2224 is immediately executed. As a result, various tool boxes corresponding to the edition mode may be provided to the panel region 2220, and a user may perform an editing operation such as drawing, cutting and coloring with respect to the detailed view 2224 by using the provided tool boxes.

If a drag touch input starting from any point on the panel region 2220 is released on a second image 2242 displayed on an upper end of the list, a detailed view of the second image 2242 is provided within the panel region 2220. In this case, while the drag touch input is maintained, the size of the panel region may be maintained. Further, while the drag touch input is maintained, an up and down scroll operation on the list 2230 may undergo a breaking process.

If a video image is included in the list 2230, or if a drag touch input is fixed to a specific video or is released on the specific video, moving images not still images of the corresponding video may be continuously played on the panel region 2220. Even if a drag touch input is fixed to a burst shot or a panorama image included in the list 2230 or is released on the burst shot or the panorama image, all consecutive images of the burst shot or entire panorama images may be provided to the panel region 2220, similar to the aforementioned embodiment.

Figure 23:
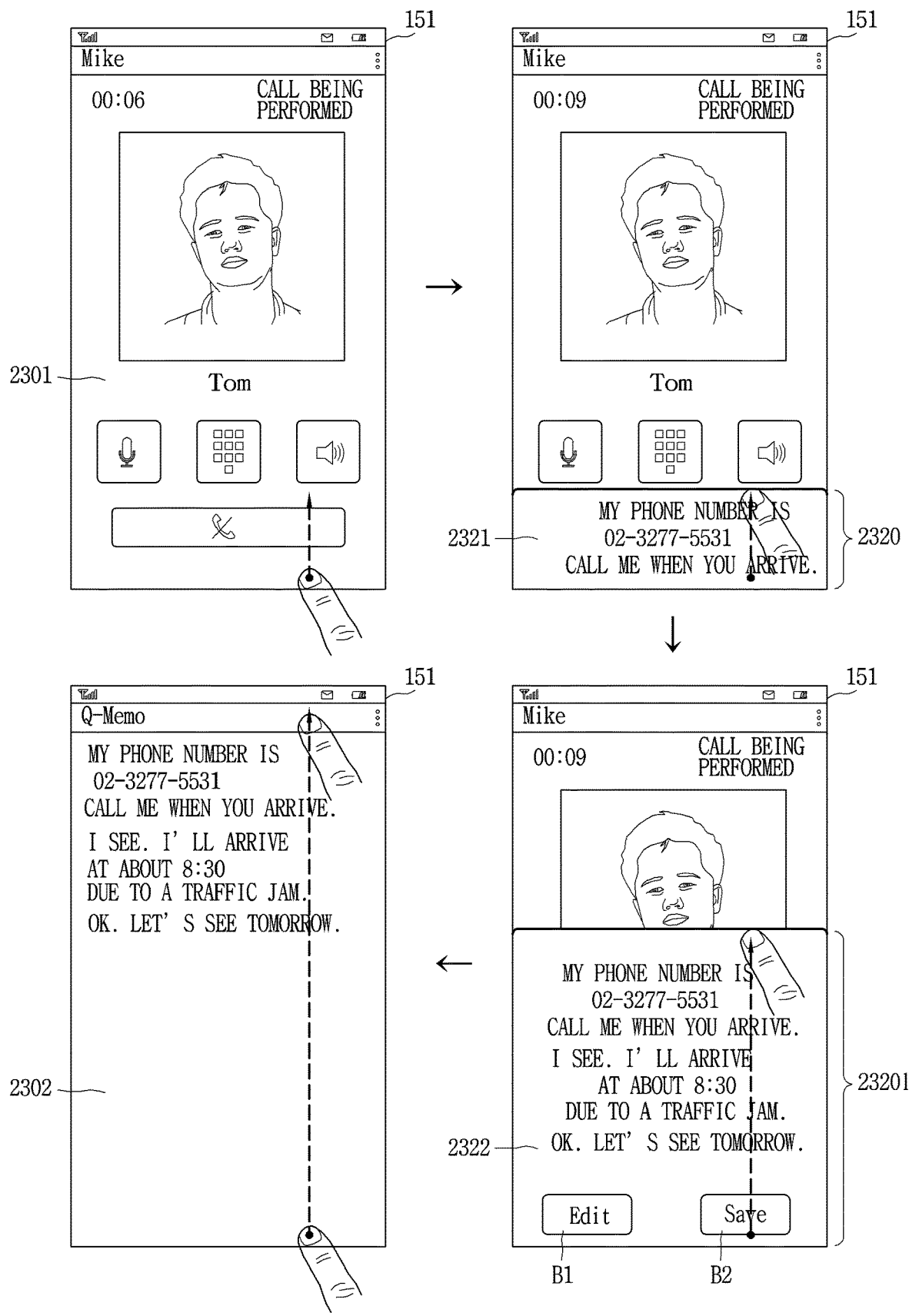

FIG. 23 shows an example to automatically record and store call content by calling a panel region during a call.

Referring to FIG. 23, if an input to call a panel region is received during a voice call or a video call, the controller 180 may immediately enter a voice recognition mode. In the voice recognition mode (speech to text: STT), the controller 180 may convert voices of a user and another party who are performing a voice call or a video call, and then may provide the converted text 2321 in real time, within a panel region 2320 layered on a screen 2301 during a call. In this case, in order to easily distinguish the user's voice from the another party's voice visually, different colors may be displayed on the panel region 2320, or call content may be displayed on different regions (e.g., one is displayed on the left and another is displayed on the right). Further, recorded call content may be rapidly searched during a call, by applying a flicking touch input right and left or up and down, within the panel region 2320 (or 2320*l*). Once the voice call or the video call is terminated, the activated voice recognition mode may be automatically terminated.

If a drag touch input to upward move the panel region 2320 is applied, the size of the panel region 2320 is increased (2320*l*) and a larger number of texts are provided within the extended panel region 2320*l*. If the panel region 2320*l* is upward moved by more than a reference range, menus related to a processing of recorded call content (e.g., 'Edit' and 'Save') (B1, B2) may be provided to a lower end of the panel region 2320*l*. If the drag touch input applied to the panel region 2320*l* is applied up to the upper end of the touch screen 151, the voice recognition mode is terminated, and all call content recorded on the panel region 2320*l* is immediately stored. Then, if a voice call is being performed, the screen 2301 is converted into an execution screen 2302 of a specific application (e.g., a Q-memo application) for checking and editing the stored call content. On the other hand, if a video call is being performed, the screen 2301 may be continuously displayed.

Figure 24:
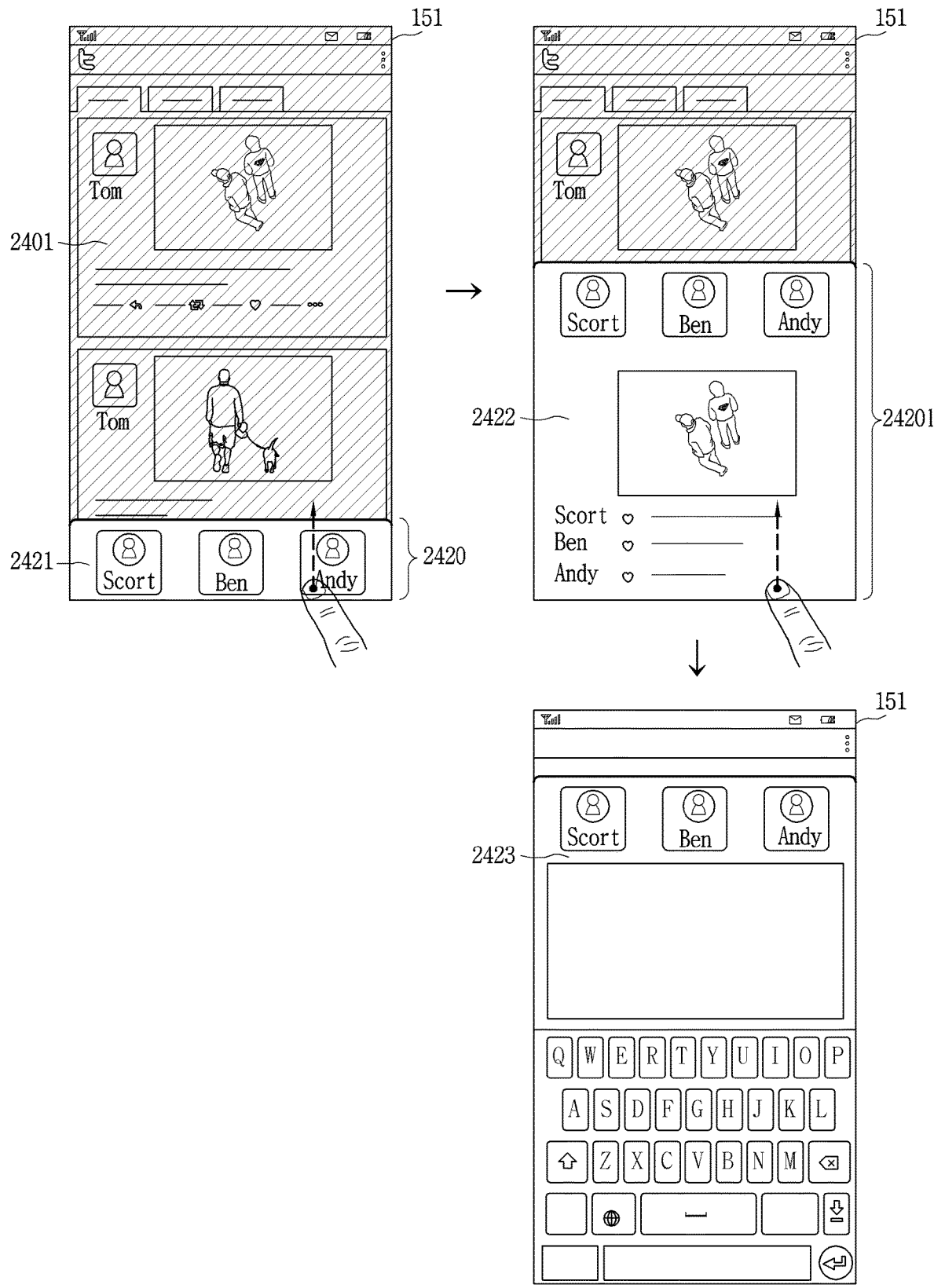

FIG. 24 shows an example to apply a sub function of a specific function step by step, by changing a size of a panel region.

Referring to FIG. 24, an execution screen 2401 of an SNS application may be displayed on the touch screen 151. While the execution screen 2401 is being displayed, if an input to call a panel region is received, buddy information 2421 bookmarked in the SNS application is provided to a panel region 2420, in the form of execution icons, for example.

In this case, the controller 180 may detect a sub function of a function related to a first page, if the size of the panel region is changed based on a drag touch input applied to the panel region. And the controller 180 may provide, to the panel region, a result obtained by applying the detected sub function to the first page. For instance, as a sub function of the buddy information 2421 bookmarked in FIG. 24, a recent update information aggregator function with respect to the bookmarked buddies may be detected. And a collected recent update information view 2422 may be further provided to an extended panel region 2420*l*.

If the extended panel region 2420*l* is upward moved up to the upper end of the touch screen 151, a screen 2423 to write a reply or a comment with respect to the collected recent update information is displayed on the panel region in an entire window mode. With such a configuration, a user may rapidly enter a sub function of a current page step by step, by using the panel region, without entering an application.

If the extended panel region 2420*l* is downward moved based on a drag touch input, the aforementioned collected recent update information view 2422 and the bookmarked buddy information 2421 may be displayed in reverse order to the display order. Then, if the drag touch input is released, the displayed state of the panel region is terminated. With such a configuration, a user may rapidly enter or be out of a sub step or a high step of a current page, by merely sliding the panel region up and down.

So far, have been explained various examples to rapidly control an application (an applied state) of a specific function by changing a size of a panel region. Hereinafter, will be explained various examples to utilize a user's usage pattern when determining such a specific function.

Figure 25:
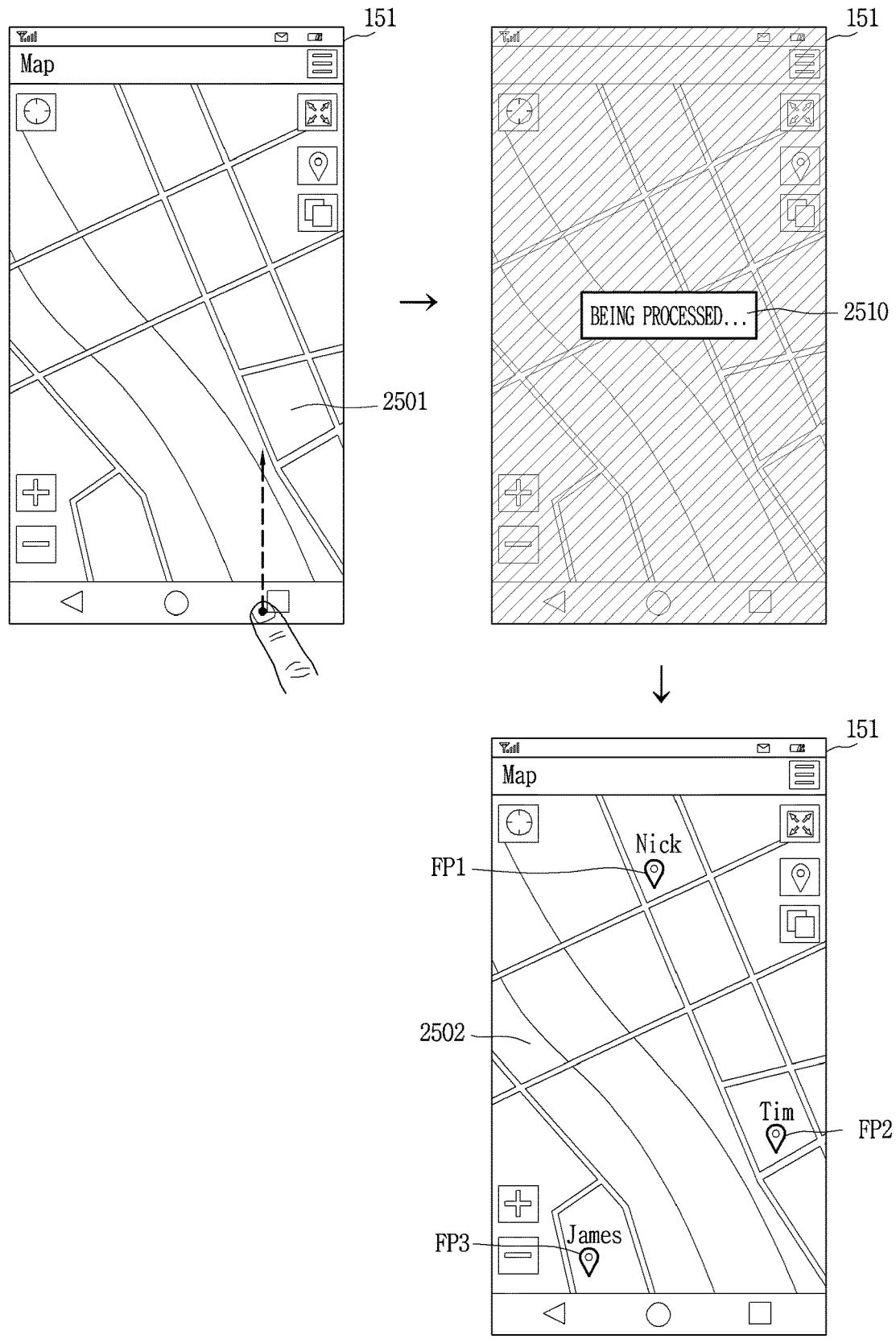
FIGS. 25, 26, 27, and 28A~28C are views illustrating various examples of a method of rapidly executing a proper function based on a usage pattern on a page, by using a panel region, according to an embodiment of the present invention.

FIG. 25 illustrates an example to automatically execute a related specific function based on a user's usage pattern, while an execution screen 2501 of a map application is being displayed on the touch screen 151.

More specifically, while the execution screen 2501 of a map application is being displayed, if an input to call a panel region is received, the controller 180 may immediately search for a related function on the displayed execution screen 2501, based on a previously-repeated usage pattern. And the controller 180 may immediately execute the searched function while a panel region is being withdrawn.

For instance, a graphic object indicating a panel region being withdrawn is output (not shown in FIG. 25), and an indicator 2510 informing that the searched function (e.g., buddy search function) is being executed is popped-up.

The controller 180 may generate and store a usage pattern repeated on the execution screen 2501 of the map application or repeated on the map application. Here, the usage pattern may be generated when a specific menu, a function, or call or execution of another application is repeated on a corresponding page, a predetermined number of times (e.g., at least 5 times). Alternatively, the usage pattern may be generated with consideration of environment conditions (e.g., a position of the mobile terminal, a current time, an operation state of the mobile terminal, etc.) when a specific menu, a function, or call or execution of another application is repeated on a corresponding page. For instance, FIG. 25 illustrates an example to repeatedly use a buddy search function by a user when a map application is executed. In a case where a navigation function has been mainly used when a map application is executed, if an input to call a panel region is received, the navigation function to guide a specific destination (e.g., home) may be immediately executed.

The controller 180 may continuously learn and update the usage pattern based on a processing of information displayed on the panel region.

Next, an execution result of the buddy search function is displayed on a map screen 2502 where buddies' positions (FP1, FP2, FP3) have been displayed. In this case, the execution result on the panel region may not be displayed or may be output in an entire window mode. In the latter case, a background color of the map screen 2502 may be changed. If a downward drag touch input starting from the upper end of the touch screen 151 is applied, the buddy search function is terminated, and the execution screen 2501 of the map application is displayed again.

Figure 26:
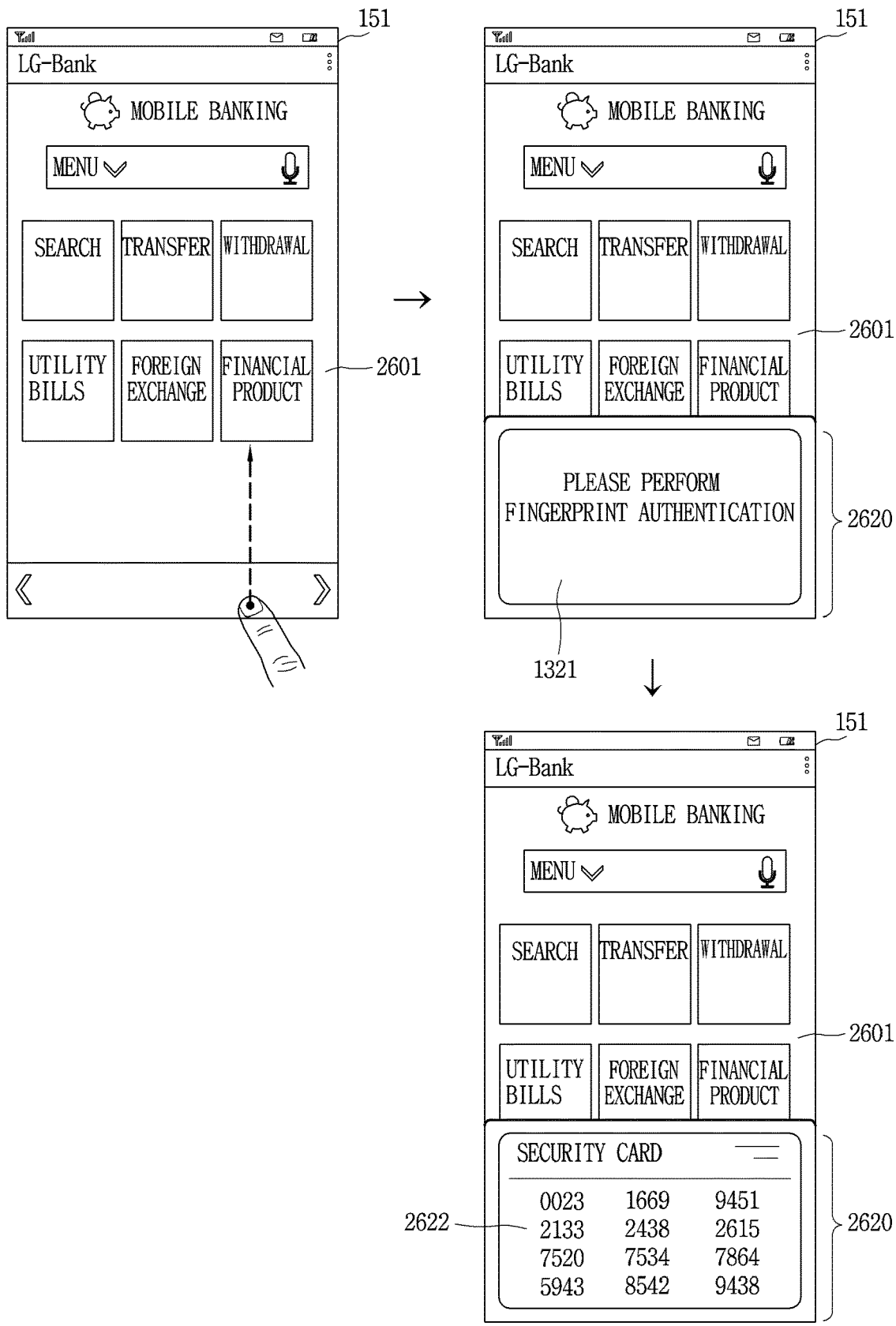

As another example, FIG. 26 illustrates an example to rapidly call security card information from an account transfer screen 2601 of a finance application, based on a usage pattern.

More specifically, while the account transfer screen 2601 is being displayed, if an input to call a panel region is received, the controller 180 may detect a usage pattern which has been used to search for a security card image, by mainly executing a gallery application on the account transfer screen 2601. Accordingly, a process to provide a security card image 2622 stored in the gallery application to a withdrawn panel region 2620 may be immediately executed.

In this case, for protection of user's private information, a fingerprint recognition screen 2621 may be firstly displayed on the panel region 2620 as a procedure to authenticate a user. Once a fingerprint recognition is completed, the called security card image 2622 is immediately provided within the panel region 2620. If there are a plurality of called security card images, it is possible to apply a swipe input to the panel region 2620 right and left and to search for a suitable security card image.

Figure 27:
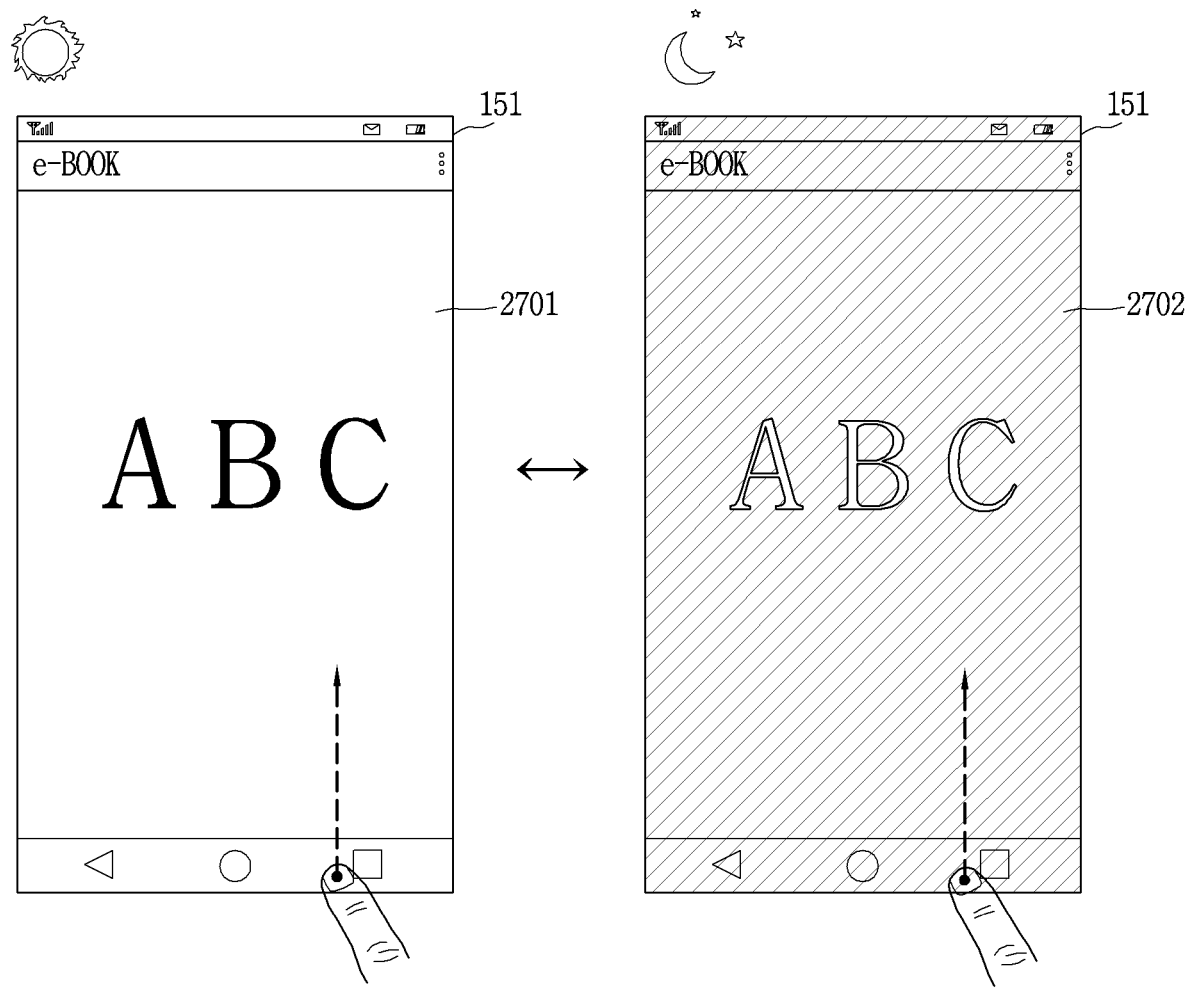

As still another example, FIG. 27 illustrates an example to automatically execute a specific function with consideration of environment conditions (e.g., illumination information) at the time of calling a panel region.

More specifically, as shown in FIG. 27, if an illumination value around the mobile terminal is less than a reference value (it is dark) or if the mobile terminal is positioned outdoors at a nighttime at a time point when a panel region is generated, a screen filter value may be applied to a page displayed on the touch screen 151 (2702). For this, the controller 180 may activate an illumination sensor while a first page is being displayed, and may search for a screen filter value suitable to enhance a visibility, based on an illumination value obtained through the illumination sensor at a time point when an input to call a panel region is received.

On the other hand, if an illumination value around the mobile terminal is much more than the reference value (it is bright) or if the mobile terminal is positioned outdoors at noon, approximately, at a time point when a panel region is generated, a screen filter value set to prevent blue light may be applied to a page displayed on the touch screen 151.

Figure 28A:
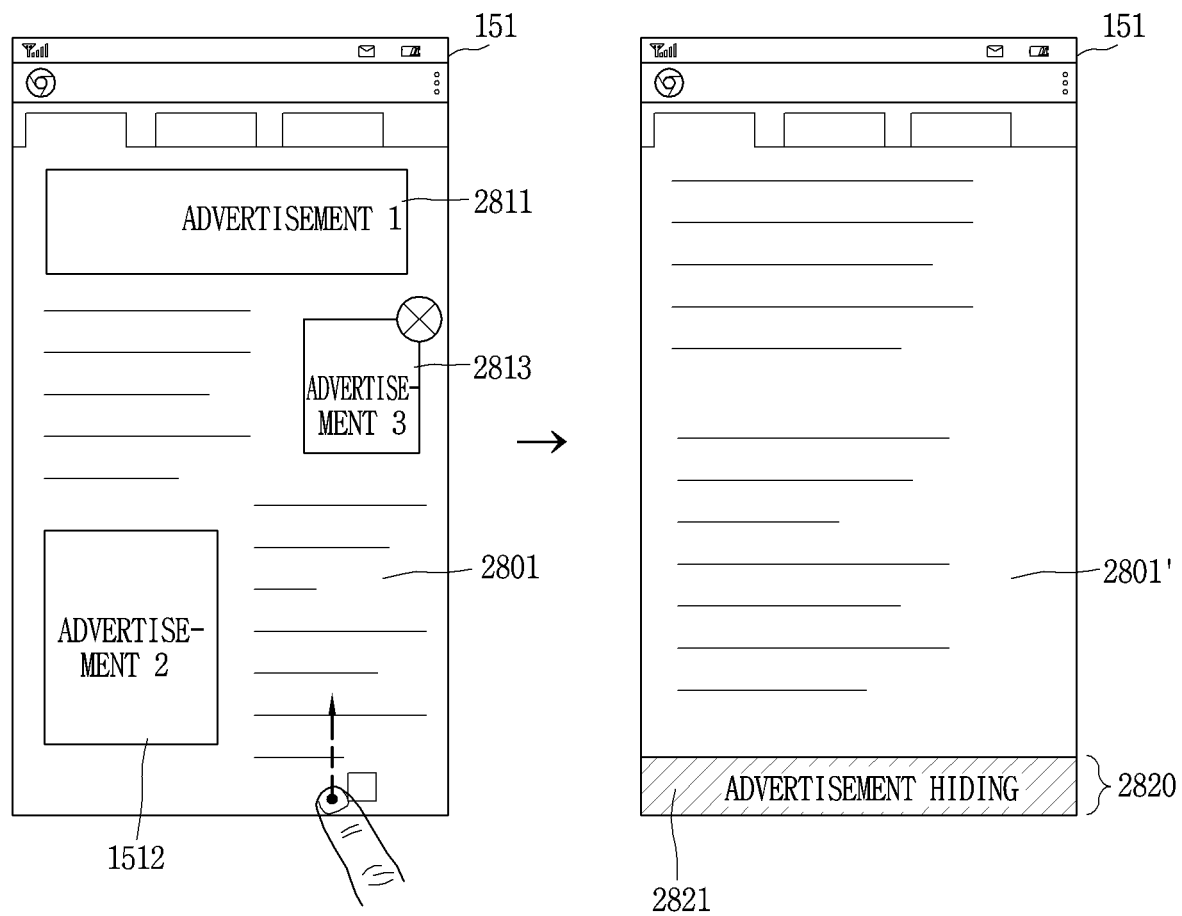
Figure 28B:
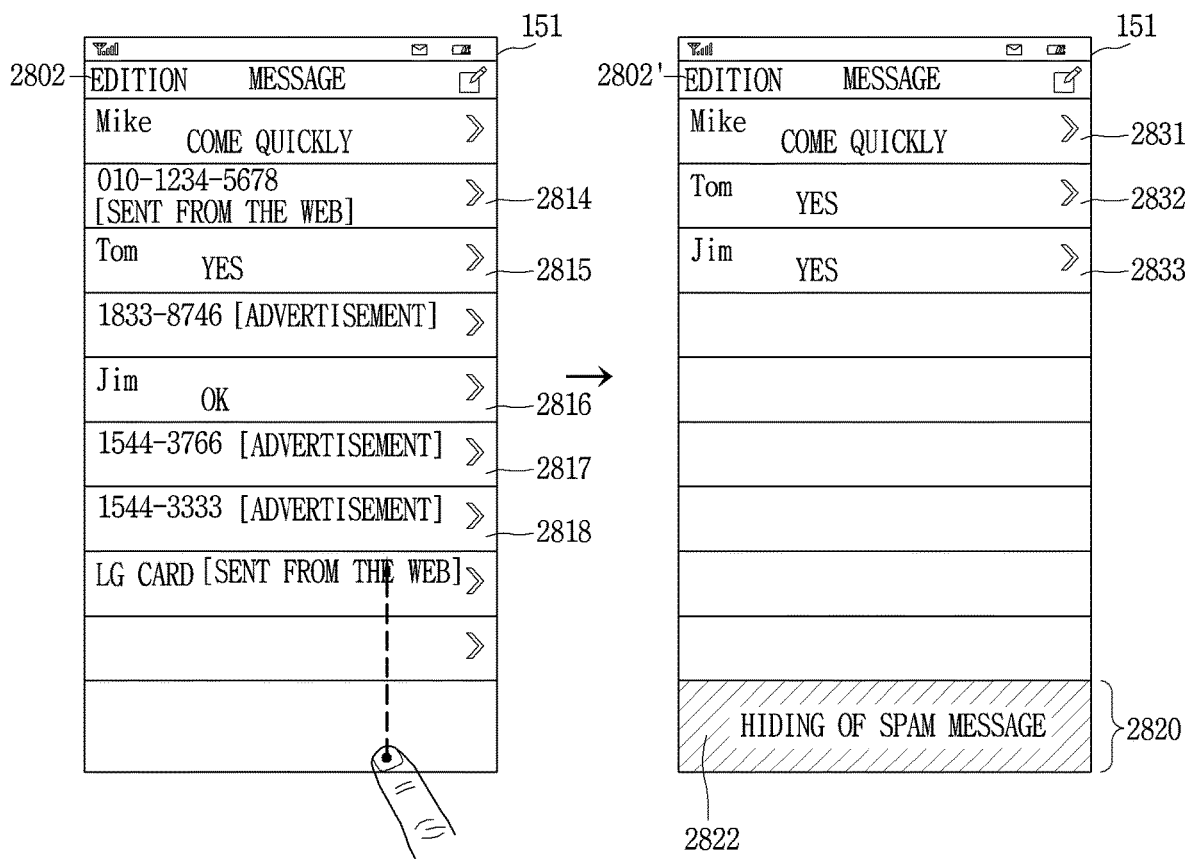
Figure 28C:
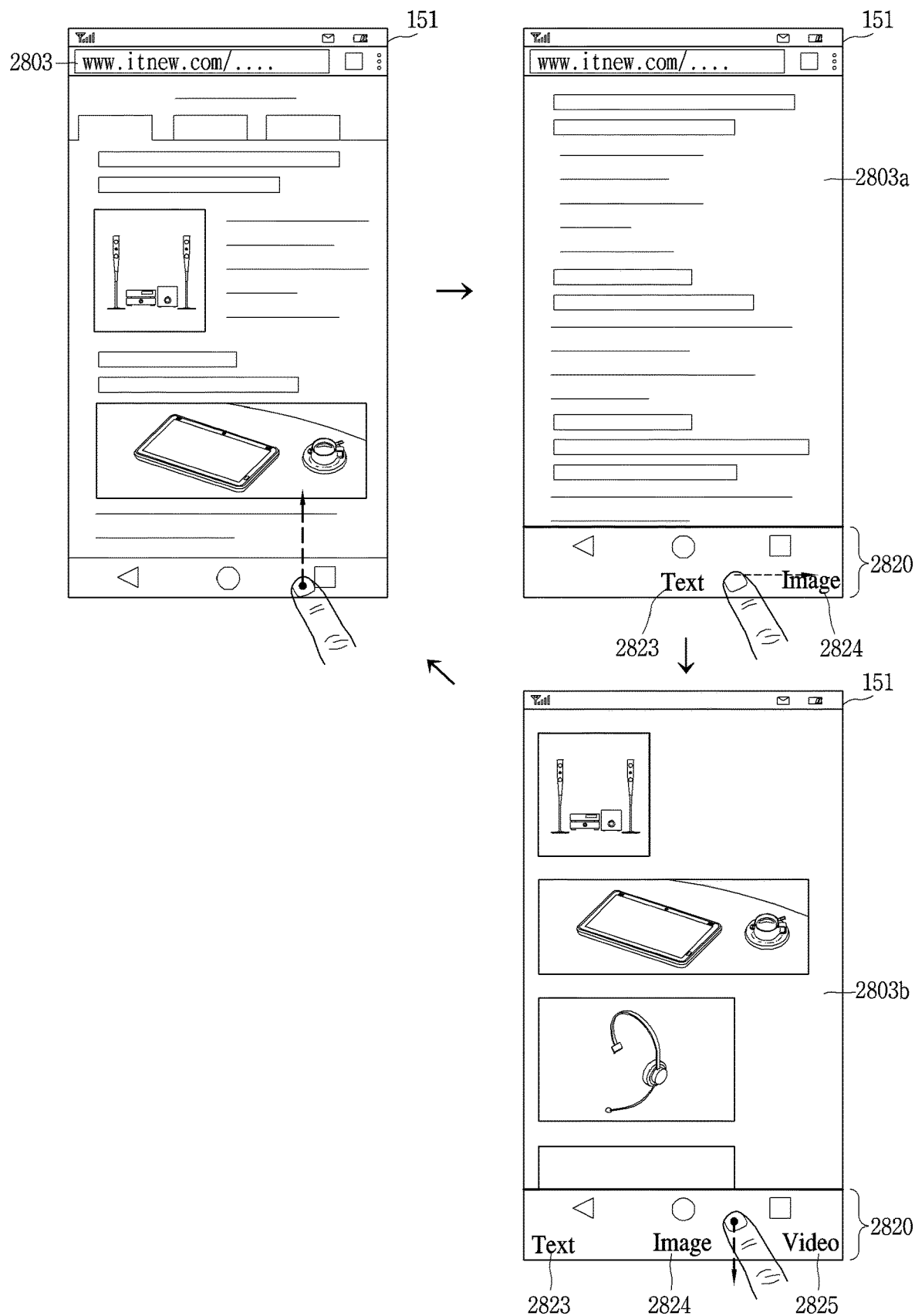

FIGS. 28A, 28B and 28C illustrate examples to rapidly reconfigure a displayed page according to a user's preference, by calling a panel region.

Referring to FIG. 28A, a web page 2801 may be displayed on the touch screen 151, and the web page 2801 may include one or more advertisement contents 2811, 2812, 2813 on any positions. In this case, a user may remove the advertisement contents 2811, 2812, 2813 from the web page 2801 by applying an input to call a panel region.

More specifically, while the web page 2801 is being displayed, if an input to call a panel region is received, the controller 180 may extract a specific type of information from the displayed web page 2801. The specific type of information may be advertisement content, and the specific type may be determined based on the aforementioned usage pattern. Then, the controller 180 may reconfigure the displayed state of the web page 2801, based on the extracted specific type of information. As a result, other information included in the web page 2801 may be filled in empty spaces from which the advertisement contents have been removed, and information shown by a scroll operation or information displayed on another page may be arranged in spaces of other information.

In this case, notification information (e.g., hidden advertisement) indicating a reconfigured state of the displayed web page (2801') may be displayed on a withdrawn panel region 2820. If the displayed panel region 2820 is terminated while the panel region 2820 is downward moved, the reconfigured web page 2801' is converted into the original web page. As a result, the web page 2801 including the advertisement contents 2811, 2812, 2813 may be displayed.

FIG. 28B illustrates an example to rapidly remove a spam message item from a list 2802 corresponding to an executed message application. More specifically, while the list 2802 including a plurality of message items 2814, 2815, 2816, 2817, 2818 is being displayed, if an input to call a panel region is received, the controller 180 may recognize spam message items on the list 2802. Then, the controller 180 may remove the recognized message items from the list 2802, and may display a reconfigured list 2802'. In this case, a message 2822 indicating a hidden state of spam messages may be displayed on a withdrawn panel region 2820. A reconfigured list 2802' includes only message items 2831, 2832, 2833 related to persons stored in a phone number directory.

FIG. 28C illustrates an example to rapidly view only a specific type of information, on a web page 2803 formed of various types of information (i.e., multimedia information). Referring to FIG. 28C, the web page 2803 formed of various types of information such as texts, images, and videos may be displayed on the touch screen 151. While the web page 2803 is being displayed, if an input to call a panel region is received, a reconfigured web page 2803a including only text type information is displayed. And first notification information (e.g., Text) 2823 indicating a type of currently displayed information may be displayed on a withdrawn panel region 2820. In this case, second notification information which guides conversion into another type (e.g., Image) 2824 may be displayed on the right side of the first notification information. If a user applies a flicking input to the panel region 2820 along a display direction of the second notification information, the web page 2803a reconfigured with text type information is converted into a web page 2803b reconfigured with image type information corresponding to the second notification information 2824.

In this case, the second notification information 2824 is arranged on the panel region 2820, at the region where the first notification information has been displayed. And the first notification information 2823 is moved to the left side of the panel region 2820. Third notification information (e.g., Video) 2825 which guides conversion into still another type may be displayed on the right side of the panel region 2820. A user may rapidly check a page reconfigured with only a desired type of information, by flicking the panel region 2820 right and left.

Under such a state, if the panel region 2820 is downward moved, the panel region 2820 is terminated, and the original web page 2803 including all multimedia information is displayed again.

Although not shown, if a panel region is executed on a list including a plurality of items, the controller may display a list reconfigured by extracting only items having unchecked events. In this case, a user needs not repeat a scroll operation to search for items having unchecked events. Further, a user may perform the operation aforementioned with reference to FIGS. 22A and 22B on the reconfigured list, thereby rapidly checking a specific event by using a panel region without entering items having unchecked events.

Hereinafter, various embodiments to provide a function related to a specific object included in a displayed page, to a panel region will be explained with reference to FIGS. 29A-29B, 30A-30C, and 31A-31B.

If a specific object is selected from a displayed first page, the controller 180 may apply a function related to the first page only to the selected specific object, and may provide an application result of the function to a panel region.

In an embodiment, the controller 180 may differently determine a type of the function related to the first page, based on a type of information included in the selected specific object. For instance, a function executed through a panel region when an image object is selected from a specific page, may be completely different from a function executed through the panel region when a text object is selected from the specific page.

In an embodiment, a search range of a function may be changed according to whether an object selection from a first page is performed before or after a panel region is generated. For instance, if an object is selected before a panel region is generated, it may be determined that a user wishes to be further provided with detailed information on the object. As a result, a relevant function may be limitedly searched, with consideration of a purpose to display the object on the page, a sharing intention, and entire contents output to the displayed page. That is, a search range of a function to be applied to a specific object may be limited to entire contents of the page, a purpose to display the object on the page, or a sharing intention. On the other hand, if an object is selected after a panel region is generated, it may be determined that a user has not wished to select the object at first. Accordingly, a search range of a function may not be limited.

Figure 29A:
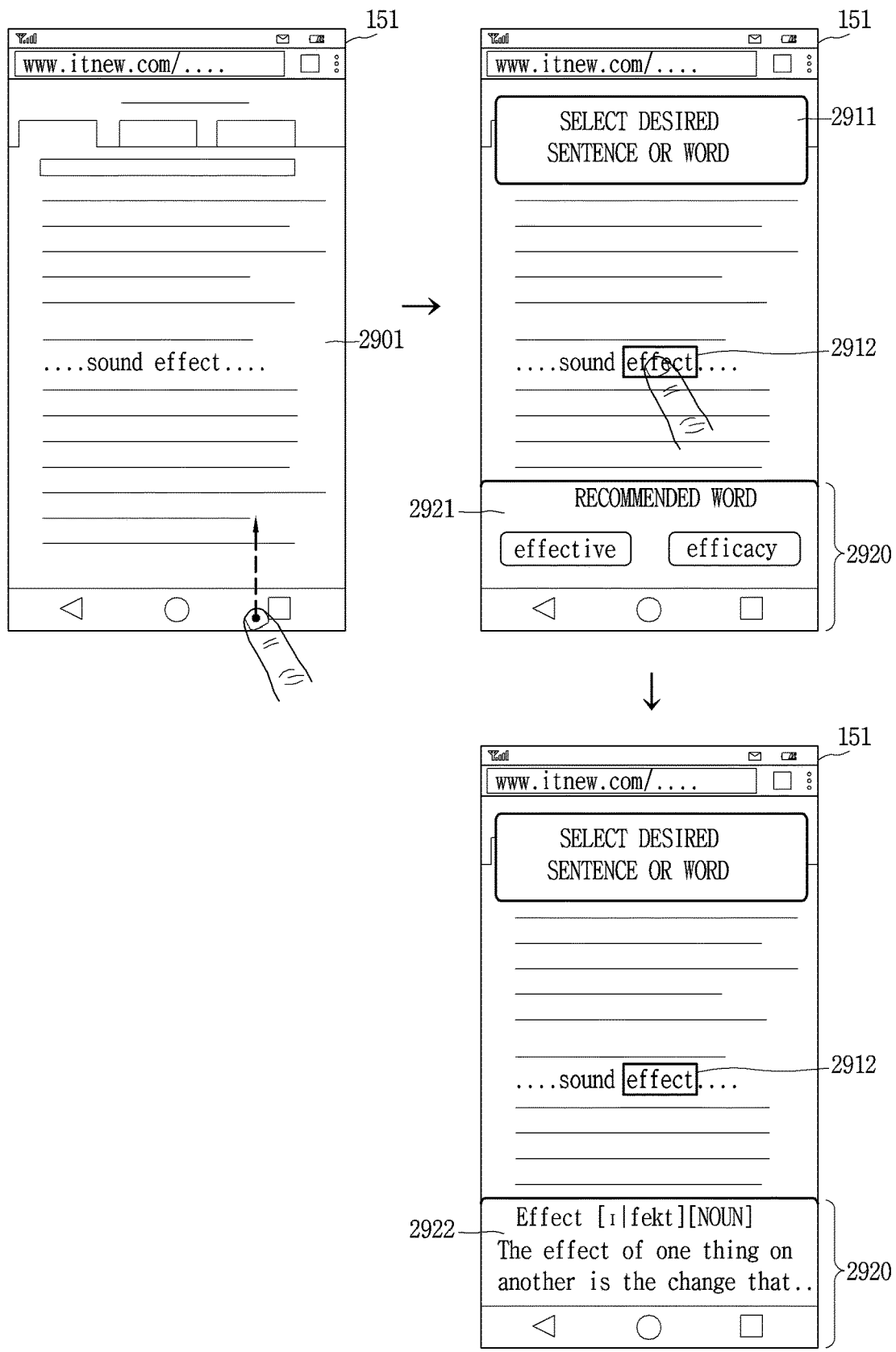
FIGS. 29A~29B, 30A~30C, and 31A~31B are views illustrating various embodiments of a method of providing a function related to an object selected from a page, through a panel region, according to an embodiment of the present invention.
Figure 29B:
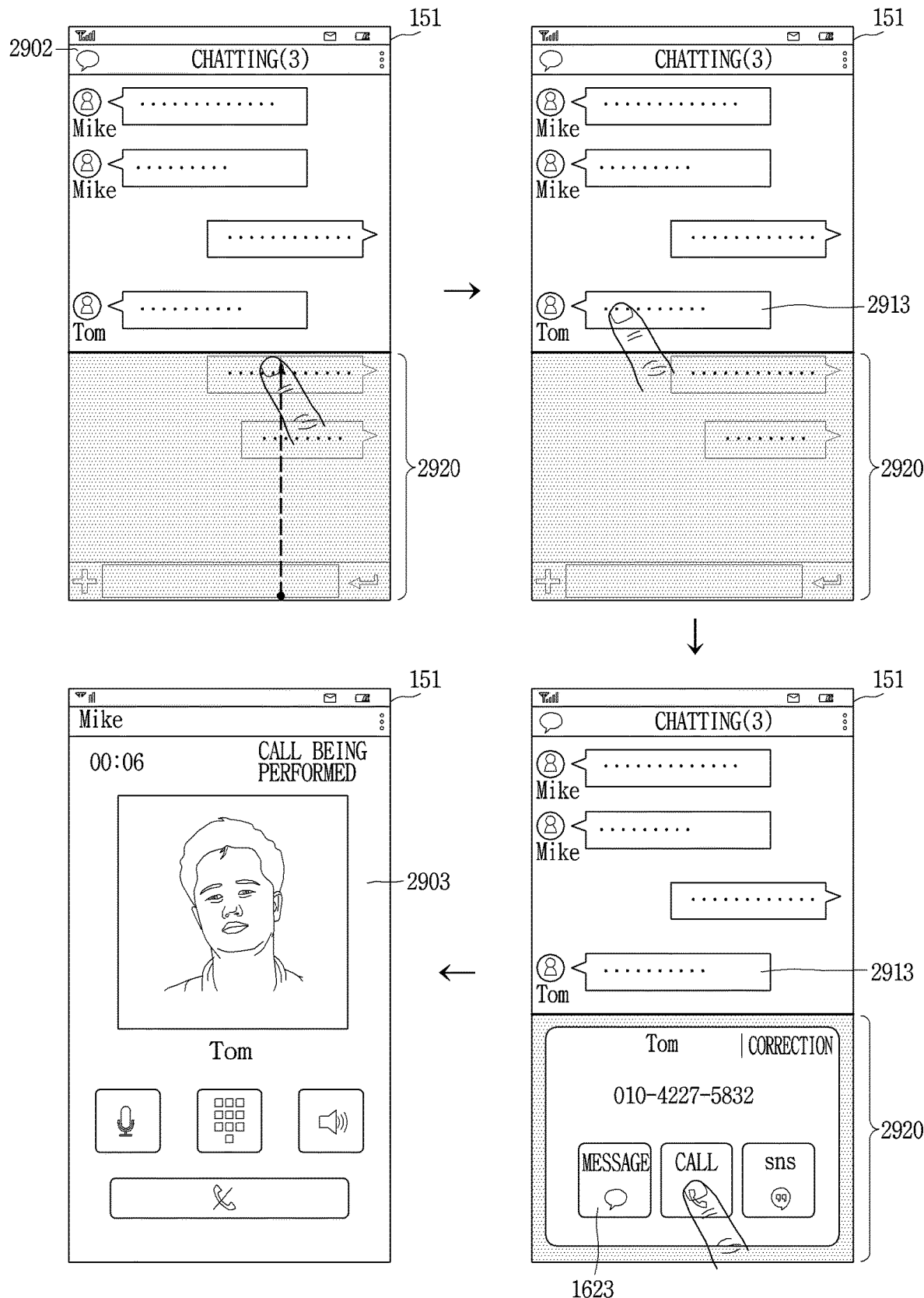

FIGS. 29A and 29B show examples to firstly generate a panel region and then to select a specific object, in a case where a user has not wished to select the specific object.

FIG. 29A illustrates an example to provide a dictionary search result of a specific object to a panel region. While a web page 2901 is being displayed on the touch screen 151, if an input to generate a panel region 2920 is received, an application result (e.g., translation in Korean) of a function related to the web page 2901 may be provided to the panel region 2920, although not shown. In this case, if a user performs a proximity touch to the web page 2901, a dictionary search function, one of general functions, may be searched. As a result, a notification icon 2911 which induces selection of a specific object is popped-up on an upper end of the web page 2901.

If a specific word (e.g., 'effect') 2912 is selected as a response to the popped-up notification icon 2911, a recommended word screen 2921 to check whether the selected specific word is correct or not, may be provided to the panel region 2920. If a word ('effect') to be searched from a dictionary is selected from the recommended word screen 2921, the controller 180 searches a meaning of the word ('effect') from a dictionary, and immediately provides a search result to the panel region 2920. If a touch input is consecutively applied to another word on the web page 2901, a dictionary search result of the touched another word may be provided to the panel region 2920.

As another example, FIG. 29B illustrates an example to provide a result of searching for contact information of a specific person corresponding to a specific object. For instance, while a message chatting screen 2902 with a specific person is being displayed, if a panel region is called, special information may not be provided within a withdrawn panel region 2920, as shown in FIG. 29B.

In this case, if a preset touch input (e.g., a long touch input or a touch input having a high pressure) is applied to a specific person message region 2913 on the message chatting screen 2902, contact information 2923 of the specific person who has sent the specific person message region 2913, may be provided to the panel region 2920. In this case, if a call icon on the contact information 2923 is touched, a call is immediately performed as the message chatting screen 2902 is converted into a call screen 2903.

Figure 30A:
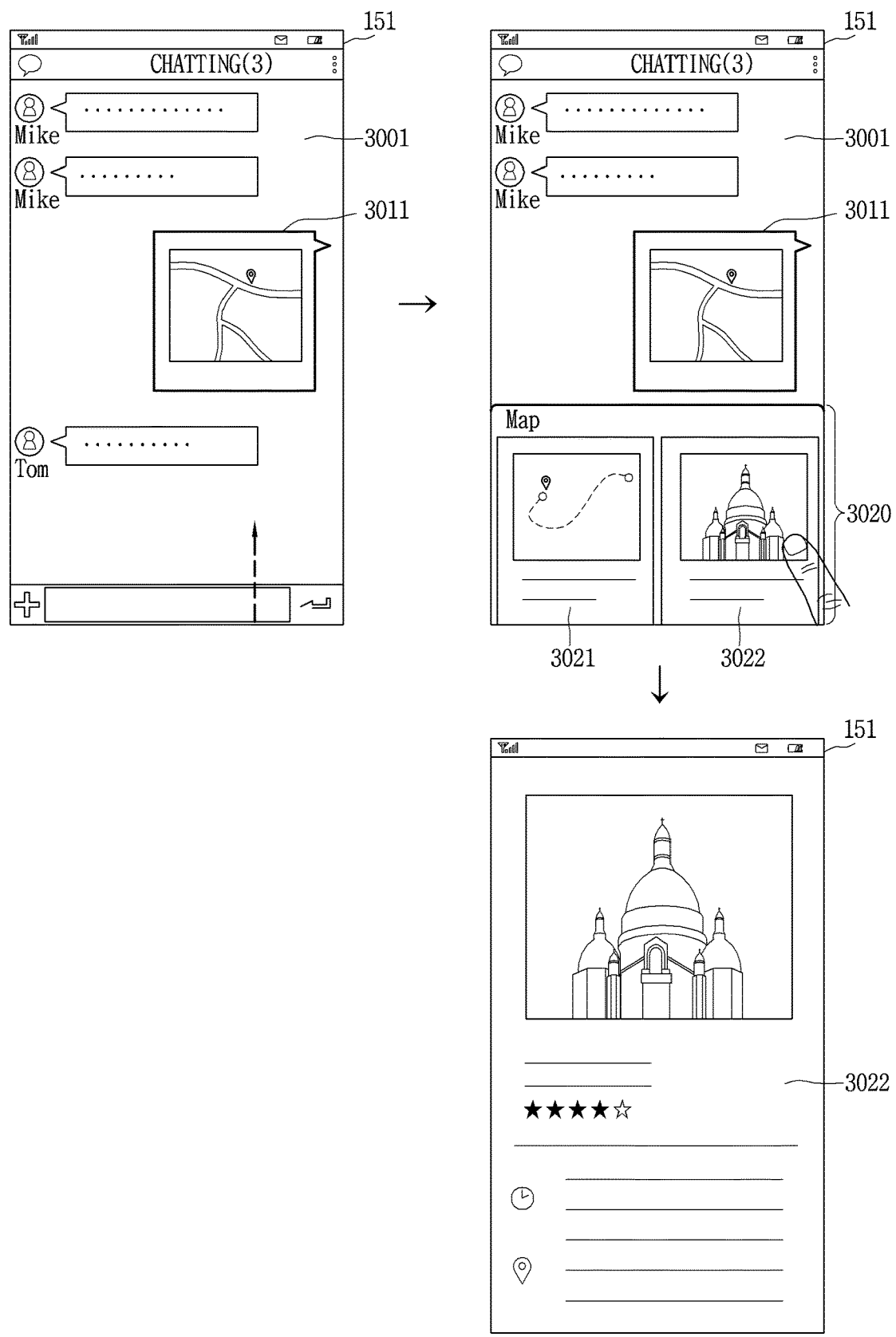
Figure 30B:
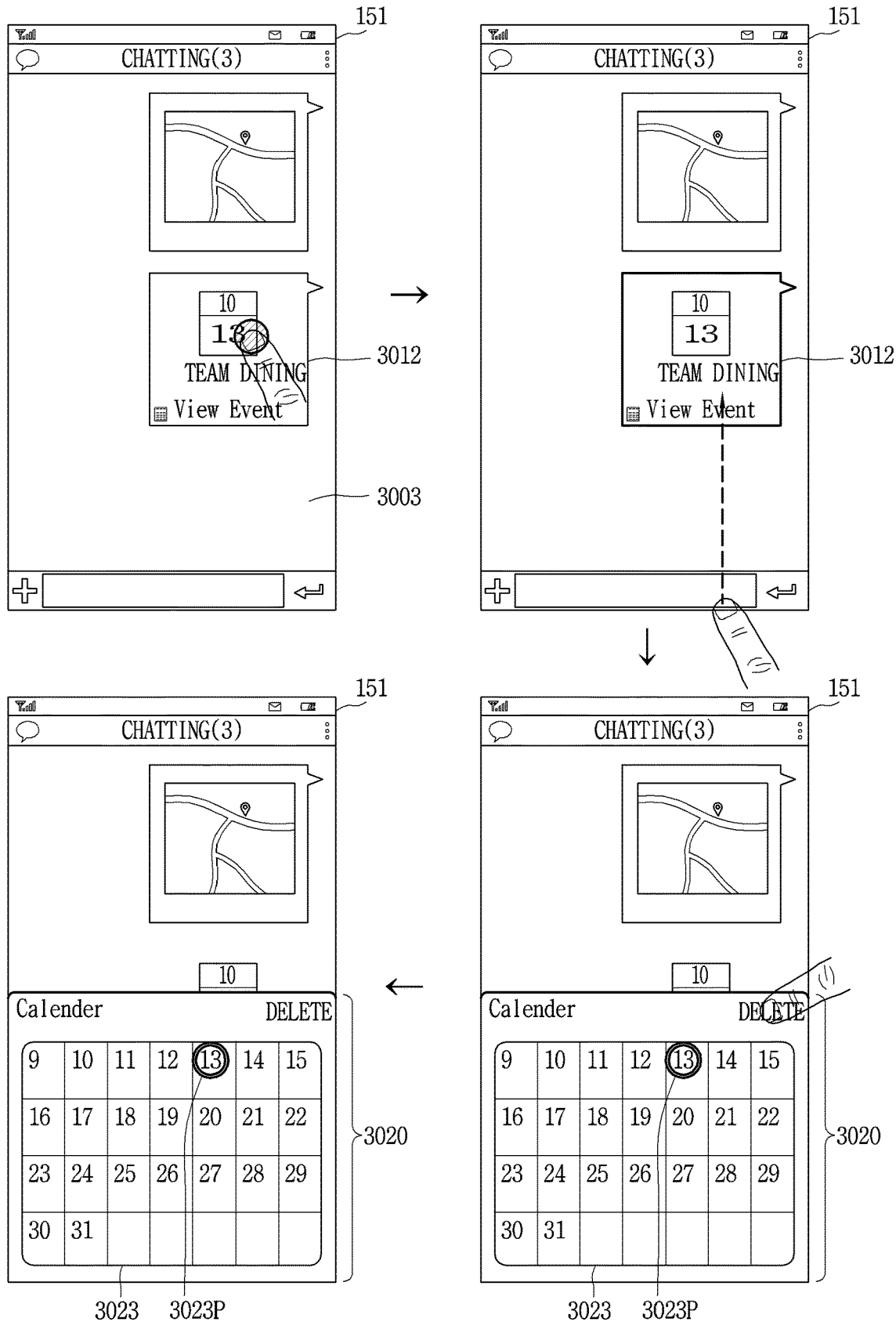
Figure 30C:
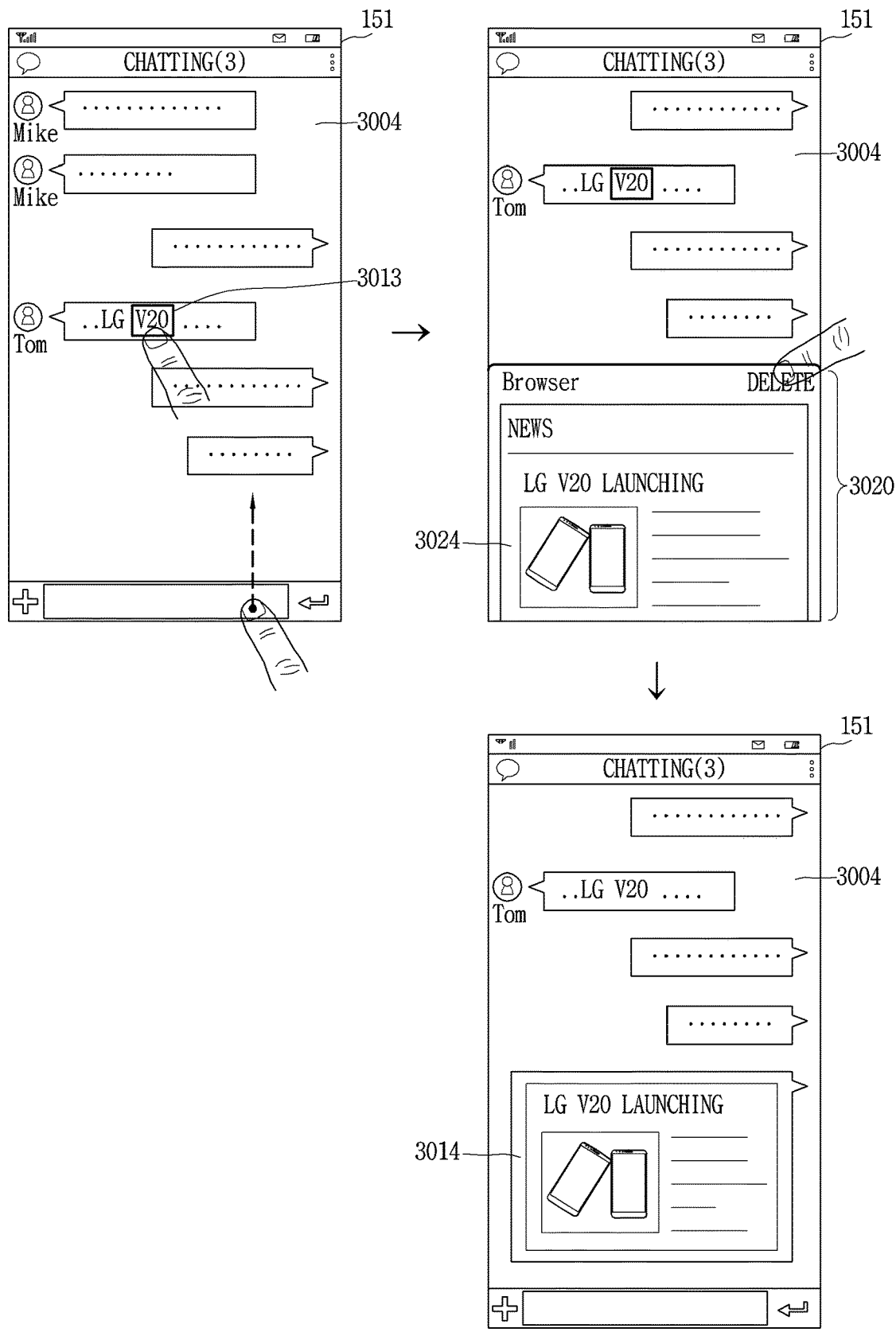

FIGS. 30A~30C show examples to firstly select a specific object and then to generate a panel region, in a case where a user has an intention to limitedly apply a function to the specific object.

Referring to FIG. 30A, map information 3011 shared on a message chatting screen 3001 may be selected as an object. In this case, the object selection may be performed as a user applies a touch input exceeding a reference pressure, to a message region where the map information 3011 has been output. Then, if an input to call a panel region is received, the controller 180 may recognize a sharing purpose of the map information 3011 (e.g., a notification of a meeting place), and may provide detailed information 3021, 3022 on a withdrawn panel region 3020. Here, the detailed information is related to the sharing purpose, and may be navigation information from a current position of the mobile terminal to a meeting place displayed on the sharing content, lodging information near the meeting place displayed on the sharing content, etc. If the specific information 3021 is selected from the panel region 3020, a detailed view of the specific information 3021 is displayed in an entire window mode (3002).

As another example, FIG. 30B illustrates an example to call a panel region, after meeting date information 3012 shared on a message chatting screen 3003 is selected as an object. More specifically, if an input to call a panel region is received, the controller 180 may recognize a sharing purpose of the meeting date information 3012 (e.g., a notification of a meeting date), and may call a screen of an application related to the sharing purpose, e.g., a calendar screen 3023 of a calendar application. Then, the controller 180 may provide the called screen to a panel region 3020. A schedule mark 3023P on the meeting date may be automatically displayed on the calendar screen 3023. A user may select a 'save' button provided on an upper end of the panel region 3020 to immediately store the meeting date as a schedule.

As another example, FIG. 30C illustrates an example to call a panel region, after a word (e.g., 'V20') 3013 included in a specific message on a message chatting screen 3004 is selected as an object. More specifically, if an input to call a panel region is received, the controller 180 may recognize the selected word, and may understand a selection purpose of the word with consideration of entire chat contents on the message chatting screen 3004. For instance, if the entire chat contents on the message chatting screen 3004 are related to a new mobile phone, the controller 180 may limit a web search range of the selected word ('V20') to a new mobile phone. As a result, V20 launching news information 3024 may be provided to a withdrawn panel region 3020. In this case, if a user pushes a sharing button provided on an upper end of the panel region 3020, the V20 launching news information 3024 provided to the panel region 3020 may be immediately shared with another party on the message chatting screen 3004 (3014).

Figure 31A:
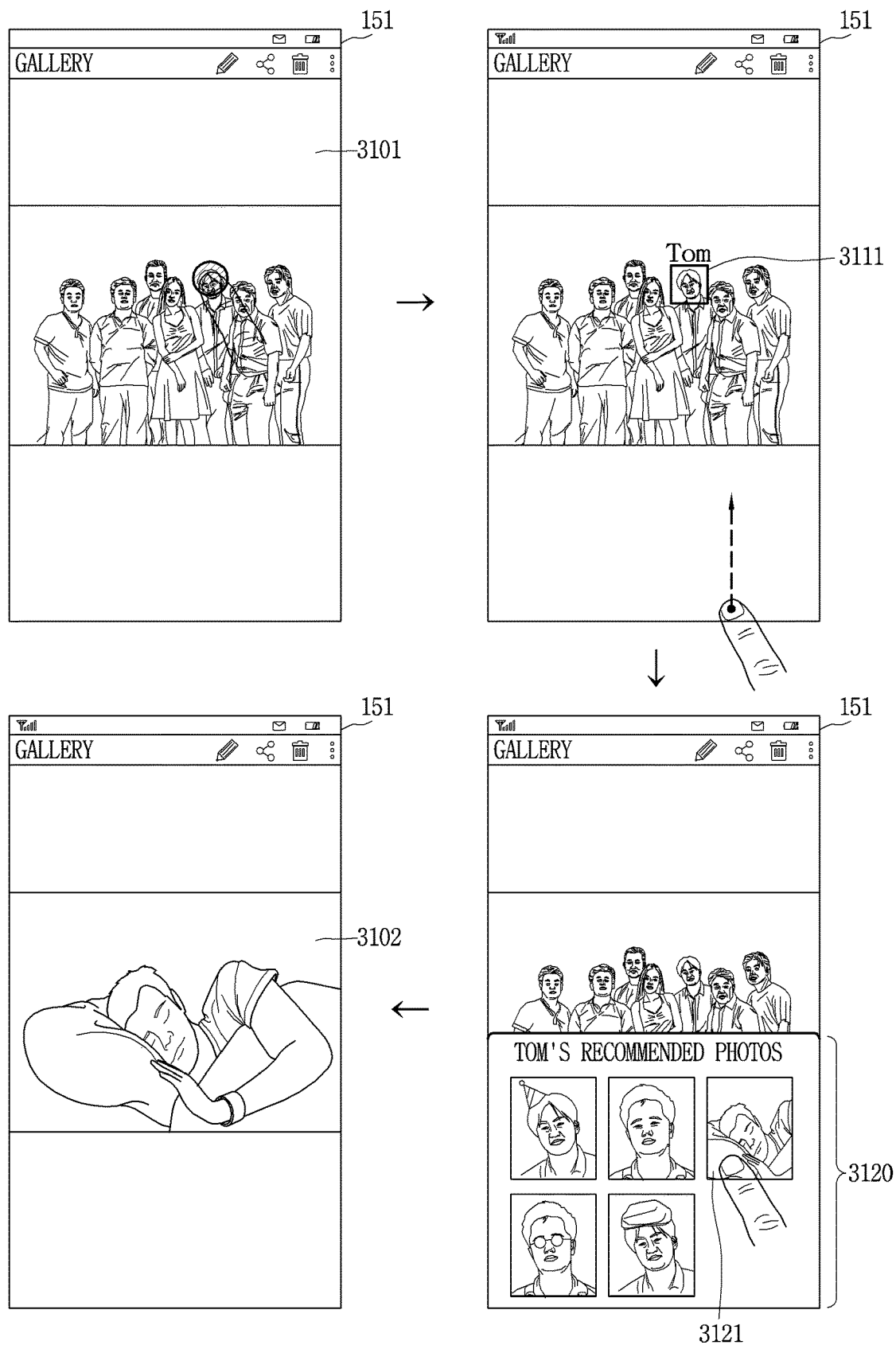
Figure 31B:
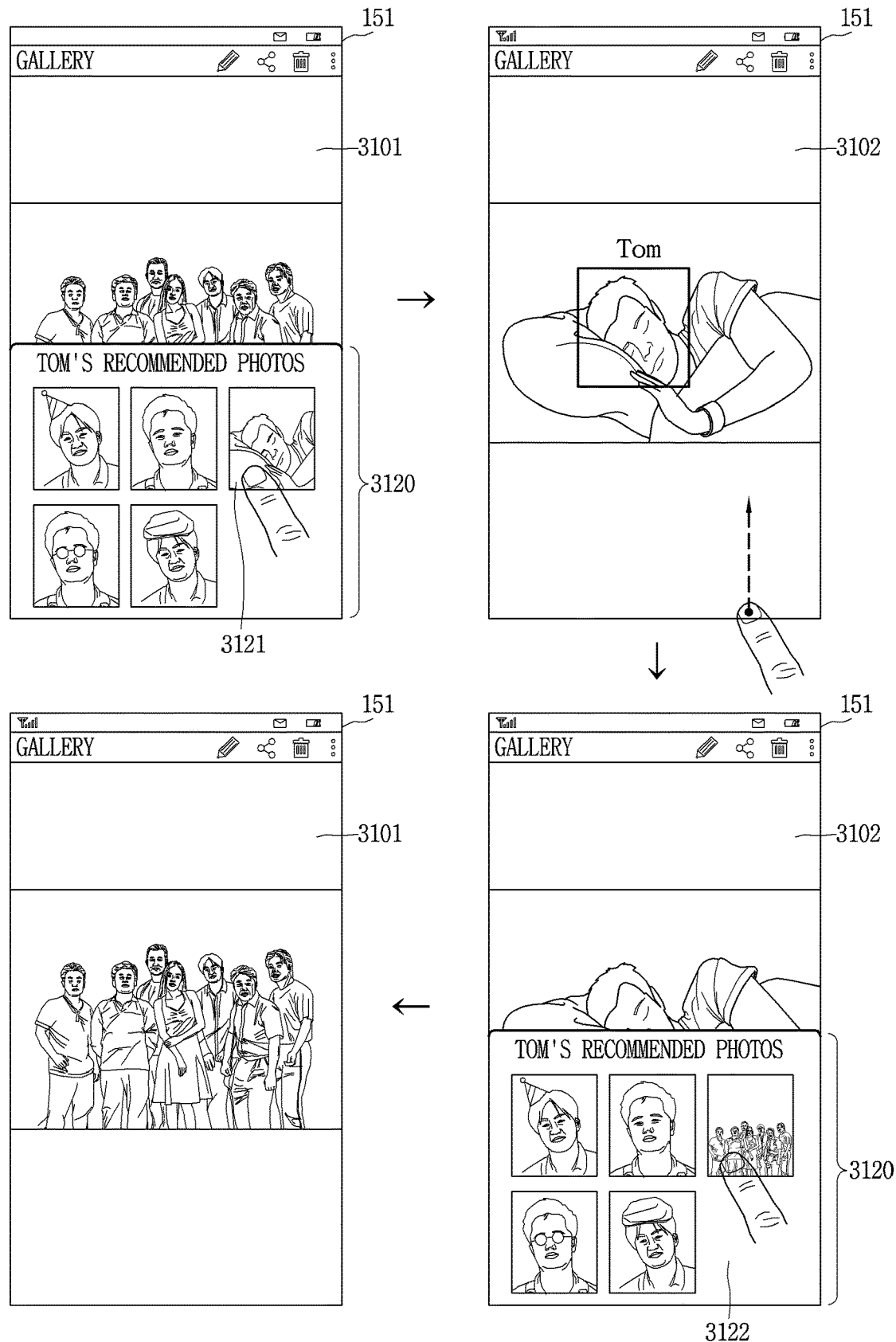

FIGS. 31A and 31B are examples to rapidly search and align relevant images by using a panel region, in a case where a specific person is selected as an object from images stored in a gallery application.

Referring to FIG. 31A, if a specific image 3101 is displayed on the touch screen 151 and a facial region is selected from the specific image 3101 based on a touch input, the controller 180 may recognize a specific person corresponding to the selected facial region. As a result, a mark (e.g., 'Tom') 3111 indicating the recognized specific person may be displayed around the selected facial region. Then, if an input to call a panel region is received, the controller 180 may search for images including the recognized specific person from a gallery application, and may provide the searched images to a panel region 3120. Accordingly, a user may immediately check the images including the specific person and captured in different places at different times. If one (3121) of the images provided to the panel region 3120 is selected, the panel region is terminated, and the displayed specific image 3101 is converted into a detailed view 3102 of the selected image 3121.

Referring to FIG. 31B, if a panel region is called again while a gallery application is being executed, most recent images, i.e., images including 'Tom' are provided to a panel region 3120 again. Then, if a specific image 3121 is selected from the images provided to the panel region 3120, a detailed view 3102 of the selected image 3121 is displayed in an entire window mode, and the panel region 3120 is terminated. In this case, the controller 180 may store therein path information and a display order of the image displayed in the entire window mode. Accordingly, if the panel region 3120 is called again, not only the images including 'Tom', but also an image 3101 displayed in an entire window mode before the specific image 3121 is selected may be provided to the panel region 3120. As a result, a user can rapidly select the lastly-viewed image by using the panel region.

Although not shown, while the specific image 3101 or 3102 is being displayed in the entire window mode, if a touch input exceeding a reference pressure is applied to a background region, the controller 180 may recognize a capturing place of the corresponding image based on a GPS. Then, if an input to call the panel region is received, images captured at the same place may be aligned on the panel region.

In the aforementioned embodiments, in the display unit having a bezel-less structure or a narrow bezel portion, information output to the display unit and a supplementary screen region interact with each other. This may allow a multi-tasking with respect to the information output to the display unit, to be performed more easily. Further, an application range or an application object of a specific function may be rapidly changed by sliding the supplementary screen region up and down. This may allow a state before the specific function is applied and a state after the specific function is applied, to be immediately compared with each other. Further, when the supplementary screen region is called, a function which has been frequently used may be directly executed without undergoing a plurality of steps.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a touch screen configured to display a first page; and
a controller configured to:
in response to a preset gesture being applied to the touch screen while the first page is being displayed, generate a panel region having a predetermined transparency on a preset region of the touch screen, the panel region including at least one first function icon corresponding to information displayed on the first page, and
in response to the first page being converted into a second page, change the at least one first function icon displayed on the panel region to at least one second function icon corresponding to information displayed on the second page,
wherein while an editor screen for a home screen including a plurality of icons is being displayed on the first page, the plurality of icons are displayed on the panel region in a deletable manner,
wherein when a touch input is applied to a specific icon among the plurality of icons on the panel region, the controller controls the touch screen to delete the specific icon from both the panel region and the first page, and display an indicator indicating the deleted state of the specific icon from the home screen, on the first page, and
wherein the controller is further configured to:

when the specific icon is deleted from both the panel region and the first page, generate a deletion tab in the panel region, and
display information of the deleted specific icon on the panel region according to a user selection to the deletion tab.

2. The mobile terminal of claim 1, wherein if a scroll signal is received on the panel region while one of the first and second pages is being displayed, the displayed page and the at least one function icon displayed on the panel region are simultaneously scrolled.

3. The mobile terminal of claim 1, wherein if one of the at least one first and second function icons is selected while the panel region is being displayed, the controller maintains the panel region, and applies an execution result of a menu corresponding to the selected function icon to one of the at least one first and second pages.

4. The mobile terminal of claim 1, wherein the controller displays an indicator indicating a number of detailed setting items adjacent to the first icon displayed on the panel region.

5. The mobile terminal of claim 1, wherein while a plurality of application icons are being displayed on the first page, application icons having unchecked events among the plurality of application icons displayed on the first page are displayed on the panel region.

6. The mobile terminal of claim 1, wherein if a touch input applied to the at least one first function icon is dragged into the first page out of the panel region, an image having its size changed gradually is generated on the panel region, and an execution screen corresponding to the first function icon is displayed within the image.

7. The mobile terminal of claim 1, wherein if a preset touch gesture is applied while the first page is being displayed, the controller displays, on the panel region, first search information obtained by searching information included in the first page according to a first reference,
wherein if a touch input in one direction is applied to the panel region while the first search information is being displayed, the first search information is changed to second search information obtained by searching the information included in the first page according to a second reference, and
wherein while the first search information and the second search information are being displayed on the panel region, the controller maintains the displayed state of the first page.

8. The mobile terminal of claim 1, wherein if a part of the first page covered by the panel region is changed along the path of the drag input, the function related to the first page is gradually applied to the part of the first page, or the applied function is released.

9. The mobile terminal of claim 8, wherein the first page includes a plurality of objects, and at least part of the objects is provided with a notification object indicating occurrence of an event, and
wherein if the part of the first page is changed along the path of the drag input so as to include the object having the notification object, the controller provides event information corresponding to the notification object to the panel region.

10. The mobile terminal of claim 1, wherein the first page corresponds to a list including a plurality of items, and
wherein the controller slides the panel region up and down based on a drag input applied to the panel region, recognizes a specific item included in the list and contacting a top line of the slid panel region which slides, and provides detailed information of the recognized specific item to the panel region.

\* \* \* \* \*